United States Patent
Sychev

(10) Patent No.: US 12,063,369 B2
(45) Date of Patent: Aug. 13, 2024

(54) ENCODER AND DECODER WITH PICTURE ORDER COUNTER DERIVATION BASED ON LAYER ID IN VIDEO CODING

(71) Applicant: HUAWEI TECHNOLOGIES CO., LTD., Shenzhen (CN)

(72) Inventor: Maxim Borisovitch Sychev, Moscow (RU)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 205 days.

(21) Appl. No.: 17/701,834

(22) Filed: Mar. 23, 2022

(65) Prior Publication Data

US 2022/0295073 A1    Sep. 15, 2022

Related U.S. Application Data

(63) Continuation of application No. PCT/RU2020/050245, filed on Sep. 24, 2020.

(30) Foreign Application Priority Data

Oct. 1, 2019    (WO) ................ PCT/EP2019/076650
Sep. 24, 2020   (WO) ................ PCT/RU2019/000667

(51) Int. Cl.
  *H04N 19/146*   (2014.01)
  *H04N 19/172*   (2014.01)
  *H04N 19/184*   (2014.01)
  *H04N 19/46*    (2014.01)
  *H04N 19/70*    (2014.01)

(52) U.S. Cl.
  CPC ........ *H04N 19/146* (2014.11); *H04N 19/172* (2014.11); *H04N 19/184* (2014.11); *H04N 19/46* (2014.11); *H04N 19/70* (2014.11)

(58) Field of Classification Search
  None
  See application file for complete search history.

(56) References Cited

U.S. PATENT DOCUMENTS

2013/0089152 A1*   4/2013   Wang ............... H04N 19/187
                                                      375/240.23
2013/0142256 A1    6/2013   Wang et al.
(Continued)

FOREIGN PATENT DOCUMENTS

JP    6556894 B2       8/2019
WO    2013052843 A1    4/2013

OTHER PUBLICATIONS

Document: JCTVC-I0345, Rajan L. Joshi et al, Temporally adaptive POC coding, Joint Collaborative Team on Video Coding (JCT-VC) of ITU-T SG16 WP3 and ISO/IEC JTC1/SC29/WGII 9th Meeting: Geneva, CH, Apr. 27-May 7, 2012, 7 pages, XP030112108.

(Continued)

*Primary Examiner* — Xiaolan Xu
(74) *Attorney, Agent, or Firm* — Rimon PC

(57) ABSTRACT

A method of coding implemented by an encoding device for encoding video data is disclosed. The method comprises reducing at least part of Least Significant Bits of Picture Order Counter (POC_LSB) in the video data by omitting one bit of the POC_LSB or by omitting a number of bits of the POC_LSB depending on the layer IDs of the video data. The method further includes coding the reduced POC_LSB.

17 Claims, 14 Drawing Sheets

(56) References Cited

U.S. PATENT DOCUMENTS

2013/0188881 A1* 7/2013 Zhao ............... H04N 19/463
382/233
2014/0301439 A1 10/2014 Chen et al.

OTHER PUBLICATIONS

ITU-T H.261 (Mar. 1993), Line Transmission of Non-Telephone Signals, Video Codec for Audiovisual Services at p x 64 kbits, total 29 pages.

ITU-T H.262 (Feb. 2012), Series H: Audiovisual and Multimedia Systems, Infrastructure of audiovisual services—Coding of moving video Information technology—Generic coding of moving pictures and associated audio information: Video: Frame packing arrangement signalling for 3D content, total 238 pages.

ITU-T H.263(Jan. 2005), Series H: Audiovisual and Multimedia Systems, Infrastructure of audiovisual services—Coding of moving video, Video coding for low bit rate communication, total 226 pages.

ITU-T H.264(Jun. 2019), Series H: Audiovisual and Multimedia Systems, Infrastructure of audiovisual services—Coding of moving video, Advanced video coding for generic audiovisual services, total 836 pages.

ITU-T H.265(Jun. 2019), Series H: Audiovisual and Multimedia Systems, Infrastructure of audiovisual services—Coding of moving video, High efficiency video coding, total 696 pages.

Document: JVET-L1001-v7, Benjamin Bross et al, Versatile Video Coding (Draft 3), Joint Video Experts Team (JVET) of ITU-T SG 16 WP 3 and ISO/IEC JTC 1/SC 29/WG 11, 12th Meeting: Macao, CN, Oct. 3-12, 2018, 226 pages.

Document: JVET-O2001-vE, Benjamin Bross et al, Versatile Video Coding (Draft 6), Joint Video Experts Team (JVET) of ITU-T SG 16 WP 3 and ISO/IEC JTC 1/SC 29/WG 11, 15th Meeting: Gothenburg, SE, Jul. 3-12, 2019, 455 pages.

\* cited by examiner

ENCODER AND DECODER WITH PICTURE ORDER COUNTER DERIVATION BASED ON LAYER ID IN VIDEO CODING

CROSS-REFERENCE TO RELATED APPLICATIONS

This application is a continuation of International Application No. PCT/RU2020/050245, filed on Sep. 24, 2020, which claims priority to International Patent Application No. PCT/RU2019/000667, filed on Sep. 24, 2019 and International Patent Application No. PCT/EP2019/076650, filed on Oct. 1, 2019. All of the aforementioned patent applications are hereby incorporated by reference in their entireties.

TECHNICAL FIELD

Embodiments of the present application generally relate to video coding, and more specifically, coding of a Picture Order Counter (POC) for video coding in a Versatile Video Coding (VVC) and other video coding standards.

BACKGROUND

Video compression techniques perform spatial (e.g., intra-picture) prediction and/or temporal (e.g., inter-picture) prediction to reduce or remove redundancy inherent in video sequences. For block-based video coding, a video slice (e.g., a video picture or a portion of a video picture) may be partitioned into video blocks, which may also be referred to as treeblocks, coding tree blocks (CTBs), coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal predictions results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, that are initially arranged in a two-dimensional array, may be scanned in order to produce a one-dimensional vector of transform coefficients, and entropy coding may be applied to achieve even more compression.

Based on these technologies, a series of video coding standards have been developed and continue to be developed and includes international telecommunications union telecommunication standardization sector (ITU-T) H.261, international organization for standardization/international electrotechnical commission (ISO/IEC) motion picture experts group (MPEG)-1 Part 2, ITU-T H.262 or ISO/IEC MPEG-2 Part 2, ITU-T H.263, ISO/IEC MPEG-4 Part 2, Advanced Video Coding (AVC), also known as ITU-T H.264 or ISO/IEC MPEG-4 Part 10, and High Efficiency Video Coding (HEVC), also known as ITU-T H.265 or MPEG-H Part 2. AVC includes extensions such as Scalable Video Coding (SVC), Multiview Video Coding (MVC) and Multiview Video Coding plus Depth (MVC+D), and 3D AVC (3D-AVC). HEVC includes extensions such as Scalable HEVC (SHVC), Multiview HEVC (MV-HEVC), and 3D HEVC (3D-HEVC). There is a video coding standard, named Versatile Video Coding (VVC), being developed by the joint video experts team (JVET) of ITU-T and ISO/IEC. At the time of submitting this disclosure, the latest Working Draft (WD) of VVC included in JVET-L1001-v5, which is publicly available at: http://phenix.it-sudparis.eu/jvet/doc_end_user/documents/12_Macao/wg11/JVET-L1001-v11.zip.

SUMMARY

A layered (scalable) approach may be used in order to provide adaptation to variable channel bandwidth and for error resilience needs. Temporal sub-layers are part of such an approach and is supported by the Versatile Video Coding (VVC) standard's specification draft.

In most classic scenarios a dyadic structure is used for a Group of Pictures (GOP) with a corresponding temporal layer structure. Such a design is supported by a simple matching of Picture Order Counter (POC) values with corresponding output time delays that are coded and derived according to Video Usability Information (VUI). In these scenarios, picture timing information may define a parameter vui_poc_proportional_to_timing_flag to be equal to one. This means that the amount of pictures that are decoded and the amount of pictures that are displayed are the same quantity and the POC value of each picture corresponds to the appropriate picture output delay/time. The bitstream may include information that only parts of the decoded video are displayed.

Following these conventional scenarios with dyadic structure of the GOP, and where the parameter vui_poc_proportional_to_timing_flag is equal to one, a redundancy of coding of temporal identifications (IDs) and POC values can be observed. With more granularity in partitioning of the picture by slices, the overhead required using these conventional structures becomes higher.

It is therefore an object of the present disclosure to increase the efficiency in coding the Picture Order Counter (POC).

Embodiments of the present disclosure generally relate to derivation of POC based on Temporal Layer ID in video coding using Versatile Video Coding (VVC) coding standards and other video coding standards. In other words, this disclosure describes the usage of Temporal ID value (and/or Spatial ID or others or a combination thereof) for a derivation of the least significant bits (LSB) of POC. This derivation is controlled by a flag corresponding to dyadic partitioning of bit-streams using temporal sub-layers. The description of the techniques are based on the under-development video coding standard VVC by the joint video experts team (JVET) of ITU-T and ISO/IEC. However, the techniques may also apply to other video codec specifications.

According to embodiments of the present application apparatuses and methods for encoding and decoding according to the independent claims are provided. The foregoing and other objects are achieved by the subject matter of the independent claims. Further implementation forms are apparent from the dependent claims, the description, and the figures.

The relation of the pictures in terms of ordering may be expressed by the POC. The POC value is an index number that defines the output position of the current picture in the coded video sequence (CVS). The POC value is used to identify the picture in the decoded picture buffer. For identification purpose, the value of POC is required to increase with the output order of the coded pictures. The POC value of Instantaneous Decoding Refresh (IDR) pictures are specified to always be equal to 0.

For an efficient representation, the POC value may not be directly coded in the syntax. Instead, it may be represented by a least significant part parameter, POC_LSB, which may particularly be encoded in the slice segment header.

It is therefore provided in this disclosure, a method of coding implemented by an encoding device for encoding video data, comprising: reducing at least part of the Least Significant Bits of Picture Order Counter, POC_LSB in the video data, by omitting one bit or by omitting a number of bits depending on layer IDs associated with a picture; and coding the reduced POC_LSB.

Since the number of bits inserted into the bitstream for the POC_LSB, can be reduced by omitting one bit or by omitting a number of bits depending on layer IDs (in particular temporal layer IDs, particularly with more granularity in partitioning of the picture by slices), the effect on the coding budget may be significantly reduced.

According to a first aspect, the method may comprise using a dyadic coding structure of pictures. The redundancy of coding of temporal IDs and POC values can then be used to reduce the coding budget for the POC_LSB.

In a further possible implementation form of the first aspect, the method may further comprise reducing the POC_LSB by omitting the last bit or by omitting a number of last bits, the number depending on a difference between the highest temporal layer ID (MaxTID) in the coded video sequence (CVS) and the temporal layer ID (TID) of the picture. The term "difference" denotes the numerical difference, in other words, the value obtained by subtracting the TID from the MaxTID.

In a further possible implementation form of the first aspect, reducing the POC_LSB, by omitting a number of last bits, the number depending on the difference between the MaxTID and the TID may comprise, for TID>0, reducing the POC_LSB by omitting a number of last bits, the number obtained by the sum of 1 and the difference between the MaxTID and the TID in particular the number being derived by POC_by_TID_len=(MaxTID−TID+(TID>0)).

In a further possible implementation form of the first aspect, the method may further comprise coding a flag of dyadic temporal ID distribution denoted fixed picture rate for all sub-layers within a bit-stream or CVS.

In a further possible implementation form of the first aspect, the method may further comprise coding a flag of dyadic temporal ID distribution conditionally based on Sequence Parameter Set (SPS) flag of presence dyadic temporal ID distribution flag in the bit-stream.

In a further possible implementation form of the first aspect, coding a flag of dyadic temporal ID distribution may comprise coding dyadic_temporal_nesting_flag in general_hrd_parameters( ) syntax elements or in SPS and/or setting the dyadic_temporal_nesting_flag equal to a predefined default value when not coded.

In a further possible implementation form of the first aspect, the method may further comprise setting the value of a parameter vui_poc_proportional_to_timing_flag to 1 when the dyadic_temporal_nesting_flag is equal to 1 or as default.

In a further possible implementation form of the first aspect, the method may further comprise setting the value of a fixed_pic_rate_general_flag to 1 when the dyadic_temporal_nesting_flag is equal to 1 or as default.

In a further possible implementation form of the first aspect, the method may further comprise setting the value of a fixed_pic_rate_within_cvs_flag to 1 when the dyadic_temporal_nesting_flag is equal to 1 or as default.

In a further possible implementation form of the first aspect, dyadic_temporal_nesting_present_flag being equal to 1 may indicate that the dyadic_temporal_nesting_flag is present in the SPS raw byte sequence payload (RBSP) syntax, or that dyadic_temporal_nesting_present_flag being equal to 0 may indicate that dyadic_temporal_nesting_flag is not present in the SPS RBSP syntax.

In a further possible implementation form of the first aspect, dyadic_temporal_nesting_flag being equal to 1 may specify that the Temporal IDs are distributed hierarchically with dyadic dependencies, or that dyadic_temporal_nesting_ flag being equal to 0 may specify that the Temporal IDs are not distributed hierarchically with dyadic dependencies.

In a further possible implementation form of the first aspect, the method may further comprise reducing the bit budget of the POC_LSB, wherein the POC_LSB is a slice_pic_order_cnt_lsb.

In a further possible implementation form of the first aspect, sps_max_sub_layers_minus1 plus 1 may specify the maximum number of temporal sub-layers, the value of sps_max_sub_layers_minus1 may be in the range of 0 to 6, and the variable MaxTID may be set equal to sps_max_sub_layers_minus1 plus 1.

In a further possible implementation form of the first aspect, slice_pic_order_cnt_lsb may specify the picture order count modulo MaxPicOrderCntLsb for the current picture, and the length of the slice_pic_order_cnt_lsb syntax element may be log 2_max_pic_order_cnt_lsb_minus4+4−PocByTidLen bits.

According to a second aspect, it is further provided a method of coding implemented by a decoding device for decoding video data, comprising:
  deriving at least part of Least Significant Bits of Picture Order Counter, POC_LSB in the video data, depending on layer IDs associated with a picture.

The bits of the POC_LSB omitted by the encoder can be derived depending on layer IDs, and in particular temporal layer IDs.

In a further possible implementation form of the second aspect, the method may comprise using a dyadic coding structure of pictures.

In a further possible implementation form of the second aspect, the method may further comprise deriving at least part of the POC_LSB, based on a highest temporal layer ID (MaxTID) in the coded video sequence (CVS) and/or based on the temporal layer ID (TID) of the picture.

In a further possible implementation form of the second aspect, deriving at least part of the POC_LSB, may be based on the difference between the MaxTID and the TID. The term "difference" denotes again the numerical difference, or in other words, the value obtained by subtracting the TID from the MaxTID.

In a further possible implementation form of the second aspect, the last one bit of the POC_LSB may be derived to be 1 if the TID, of the picture corresponds to the MaxTID, in the CVS, and to be 0 otherwise.

In a further possible implementation form of the second aspect, omitted last bits of the POC_LSB may be derived, for TID>0, based on an arithmetic left shift by a number of binary digits corresponding to the difference between the MaxTID, and the TID.

In a further possible implementation form of the second aspect, the omitted last bits of the POC_LSB may be derived based on the expression (TID>0)<<(Max TID−TID+(TID==0)).

In a further possible implementation form of the second aspect, the omitted last bits of the POC_LSB may be derived based on the expression ((TID>0)<<(POC_by_TID_len−1)), wherein POC_by_TID_len=(MaxTID−TID+(TID>0)).

In a further possible implementation form of the second aspect, the method may further comprise parsing a flag of dyadic temporal ID distribution that is denoted with a fixed picture rate for all sub-layers within a bit-stream or CVS.

In a further possible implementation form of the second aspect, the method may further comprise parsing a flag of dyadic temporal ID distribution conditionally based on SPS flag of presence dyadic temporal ID distribution flag in a bit-stream.

In a further possible implementation form of the second aspect, parsing a flag of dyadic temporal ID distribution may comprise: parsing dyadic_temporal_nesting_flag in general_hrd_parameters( ) syntax elements or in SPS, and/or set the dyadic_temporal_nesting_flag equal to predefined default value when not coded.

In a further possible implementation form of the second aspect, the method may further comprise: setting the value of a parameter vui_poc_proportional_to_timing_flag to 1 when the dyadic_temporal_nesting_flag is equal to 1 or as default.

In a further possible implementation form of the second aspect, the method may further comprise setting the value of a fixed_pic_rate_general_flag to 1 when the dyadic_temporal_nesting_flag is equal to 1 or as default.

In a further possible implementation form of the second aspect, the method may further comprise setting the value of a fixed_pic_rate_within_cvs_flag to 1 when the dyadic_temporal_nesting_flag is equal to 1 or as default.

In a further possible implementation form of the second aspect, the dyadic_temporal_nesting_present_flag being equal to 1 may indicate that dyadic_temporal_nesting_flag is present in the SPS RBSP syntax, or that the dyadic_temporal_nesting_present_flag being equal to 0 may indicate that dyadic_temporal_nesting_flag is not present in the SPS RBSP syntax.

In a further possible implementation form of the second aspect, the dyadic_temporal_nesting_flag being equal to 1 may specify that the Temporal IDs are distributed hierarchically with dyadic dependencies, or that the dyadic_temporal_nesting_flag being equal to 0 may specify that the Temporal IDs are not distributed hierarchically with dyadic dependencies.

In a further possible implementation form of the second aspect, the method may further comprise: when the bit budget of coding slice_pic_order_cnt_lsb is reduced by one bit and/or when the dyadic_temporal_nesting_flag is equal to 1, deriving a last bit of the slice_pic_order_cnt_lsb by using MaxTID, wherein the MaxTID is equal to sps_max_sub_layers_minus1 plus 1.

In a further possible implementation form of the second aspect, deriving the last bit of the slice_pic_order_cnt_lsb may comprise:deriving PicOrderCntLsb=(slice_pic_order_cnt_lsb<<1)+(TID==MaxTID), and derive PicOrderCntVal=PicOrderCntMsb+PicOrderCntLsb.

In a further possible implementation form of the second aspect, the method may further comprise: when the bit budget of coding the slice_pic_order_cnt_lsb is reduced by the value POC_by_TID_len=(MaxTID−TID+(TID>0)) and/or when the dyadic_temporal_nesting_flag is equal to 1, deriving the last bit of slice_pic_order_cnt_lsb by using MaxTID, wherein the MaxTID is equal to sps_max_sub_layers_minus1 plus 1.

In a further possible implementation form of the second aspect, deriving the last bit of the slice_pic_order_cnt_lsb may comprise: deriving PicOrderCntLsb=(slice_pic_order_cnt_lsb<<POC_by_TID_len)+((TID>0)<<(Max TID−TID+(TID==0))); and deriving PicOrderCntVal=PicOrderCntMsb+PicOrderCntLsb.

In a further possible implementation form of the second aspect, deriving the last bit of the slice_pic_order_cnt_lsb may comprise: deriving PicOrderCntLsb=(slice_pic_order_cnt_lsb<<POC_by_TID_len)+((TID>0)<<(POC_by_TID_len−1)); and deriving PicOrderCntVal=PicOrderCntMsb+PicOrderCntLsb.

In a further possible implementation form of the second aspect, sps_max_sub_layers_minus1 plus 1 may specify the maximum number of temporal sub-layers, the value of sps_max_sub_layers_minus1 may be in the range of 0 to 6, and the variable MaxTID may be set equal to sps_max_sub_layers_minus1 plus 1. In a further possible implementation form of the second aspect, slice_pic_order_cnt_lsb may specify the picture order count modulo MaxPicOrderCntLsb for the current picture, and the length of the slice_pic_order_cnt_lsb syntax element may be log 2_max_pic_order_cnt_lsb_minus4+4−PocByTidLen bits.

In a further possible implementation form of the second aspect, when dyadic_temporal_nesting_flag is true, PicOrderCntLsb (slice_pic_order_cnt_lsb<<PocByTidLen)+(((TemporalId>0)<<(Max TID−TID+(TID==0)), and when dyadic_temporal_nesting_flag is false, PicOrderCntLsb=slice_pic_order_cnt_lsb.

In a further possible implementation form of the second aspect, the value of the PicOrderCntLsb may be in the range of 0 to MaxPicOrderCntLsb−1, inclusive.

According to a third aspect, it is further provided a method of coding implemented by a system comprising a decoding device and an encoding device for coding video data, comprising: deriving at least part of Least Significant Bits of Picture Order Counter, POC_LSB, depending on layer IDs.

In a further possible implementation form of the third aspect, the method may comprises using a dyadic coding structure of pictures.

In a further possible implementation form of the third aspect, the method may further comprise: reducing the POC_LSB by omitting the last bit or by omitting a number of last bits, the number being dependent on a difference between the MaxTID, in the CVS, and the TID of the picture; and coding the reduced POC_LSB. The term "difference" denotes again the numerical difference, or in other words, the value obtained by subtracting the TID from the MaxTID.

In a further possible implementation form of the third aspect, reducing the POC_LSB by omitting a number of last bits, where the number depends on the difference between the MaxTID, and the, TID, may comprise, for TID>0, reducing the POC_LSB by omitting a number of last bits, the number obtained by the sum of 1 and the difference between the MaxTID, and the TID, and in particular the number being derived by POC_by_TID_len=(MaxTID−TID+(TID>0)).

In a further possible implementation form of the third aspect, the POC_LSB may be reduced by omitting the last bit, and the last bit of the POC_LSB may be derived to be 1 if the TID of the picture corresponds to the highest MaxTID, in the CVS, and to be equal to 0 otherwise.

In a further possible implementation form of the third aspect, the POC_LSB may be reduced by omitting a number of last bits, the number depending on the difference between the MaxTID, and the TID, and these omitted last bits of the POC_LSB may be derived, for TID>0, based on an arithmetic left shift by a number of binary digits corresponding to the difference between the MaxTID, and the TID.

In a further possible implementation form of the third aspect, the omitted last bits of the POC_LSB may be derived based on the expression (TID>0)<<(Max TID−TID+(TID==0)).

In a further possible implementation form of the third aspect, the omitted last bits of the POC_LSB may be derived based on the expression ((TID>0)<<(POC_by_TID_len−1)).

In a further possible implementation form of the third aspect, the method may further comprise coding a flag of dyadic temporal ID distribution denoted fixed picture rate for all sub-layers within bit-stream or CVS.

In a further possible implementation form of the third aspect, the method may further comprise coding a flag of dyadic temporal ID distribution conditionally based on SPS flag of presence dyadic temporal ID distribution flag in bit-stream.

In a further possible implementation form of the third aspect, coding a flag of dyadic temporal ID distribution may comprise: coding dyadic_temporal_nesting_flag in general_hrd_parameters( ) syntax elements or in SPS and/or set the dyadic_temporal_nesting_flag equal to predefined default value when not coded.

In a further possible implementation form of the third aspect, the method may further comprise setting the value of a parameter vui_poc_proportional_to_timing_flag to 1 when dyadic_temporal_nesting_flag is equal to 1 or as default.

In a further possible implementation form of the third aspect, the method may further comprise setting the value of a fixed_pic_rate_general_flag to 1 when dyadic_temporal_nesting_flag is equal to 1 or as default.

In a further possible implementation form of the third aspect, the method may further comprise setting the value of a fixed_pic_rate_within_cvs_flag to 1 when dyadic_temporal_nesting_flag is equal to 1 or as default.

In a further possible implementation form of the third aspect, the dyadic_temporal_nesting_present_flag being equal to 1 may indicate that the dyadic_temporal_nesting_flag is present in the SPS RBSP syntax, or the dyadic_temporal_nesting_present_flag being equal to 0 may indicate that the dyadic_temporal_nesting_flag is not present in the SPS RBSP syntax.

In a further possible implementation form of the third aspect, the dyadic_temporal_nesting_flag being equal to 1 may specify that the Temporal IDs are distributed hierarchically with dyadic dependencies, or the dyadic_temporal_nesting_flag equal being to 0 may specify that the Temporal IDs are not distributed hierarchically with dyadic dependencies.

In a further possible implementation form of the third aspect, the method may further comprise: reducing the bit budget of coding slice_pic_order_cnt_lsb by one bit, and deriving last bit of slice_pic_order_cnt_lsb by using MaxTID, wherein MaxTID is equal to sps_max_sub_layers_minus1 plus 1.

In a further possible implementation form of the third aspect, deriving the last bit of slice_pic_order_cnt_lsb may comprise: deriving PicOrderCntLsb=(slice_pic_order_cnt_lsb<<1)+(TID==MaxTID), and derive PicOrderCntVal=PicOrderCntMsb+PicOrderCntLsb.

In a further possible implementation form of the third aspect, the method may further comprise: reducing the bit budget of coding slice_pic_order_cnt_lsb by the value POC_by_TID_len=(MaxTID−TID+(TID>0)), and deriving last bit of slice_pic_order_cnt_lsb by using MaxTID, wherein MaxTID is equal to sps_max_sub_layers_minus1 plus 1.

In a further possible implementation form of the third aspect, deriving the last bit of slice_pic_order_cnt_lsb may comprise: deriving PicOrderCntLsb= (slice_pic_order_cnt_lsb<<POC_by_TID_len)+((TID>0)>>(Max TID−TID+(TID==0))); and deriving PicOrderCntVal=PicOrderCntMsb+PicOrderCntLsb.

In a further possible implementation form of the third aspect, deriving the last bit of slice_pic_order_cnt_lsb may comprise:
deriving PicOrderCntLsb=
  (slice_pic_order_cnt_lsb<<POC_by_TID_len)+
  ((TID>0)<<(POC_by_TID_len−1)); and deriving
  PicOrderCntVal=PicOrderCntMsb+PicOrderCntLsb.

In a further possible implementation form of the third aspect, sps_max_sub_layers_minus1 plus 1 may specify the maximum number of temporal sub-layers, the value of sps_max_sub_layers_minus1 may be in the range of 0 to 6, and the variable MaxTID may be set equal to sps_max_sub_layers_minus1 plus 1.

In a further possible implementation form of the third aspect, slice_pic_order_cnt_lsb may specify the picture order count modulo (MaxPicOrderCntLsb) for the current picture, and the length of the slice_pic_order_cnt_lsb syntax element may be log 2_max_pic_order_cnt_lsb_minus4+4−PocByTidLen bits.

In a further possible implementation form of the third aspect, when dyadic_temporal_nesting_flag is true, PicOrderCntLsb=(slice_pic_order_cnt_lsb<<PocByTidLen)+(((TemporalId>0)<<(Max TID−TID+(TID==0))) when dyadic_temporal_nesting_flag is false, PicOrderCntLsb=slice_pic_order_cnt_lsb.

In a further possible implementation form of the third aspect, the value of the PicOrderCntLsb may be in the range of 0 to MaxPicOrderCntLsb−1, inclusive.

According to a fourth aspect, it is further provided an encoder comprising processing circuitry for carrying out the method for encoding video data according to the first aspect and possible implementation forms of the first aspect.

According to a fifth aspect, it is further provided a decoder comprising processing circuitry for carrying out the method for decoding video data according to the second aspect and possible implementation forms of the second aspect.

According to a sixth aspect, it is further provided a system comprising an encoder and a decoder, the system comprising processing circuitry for carrying out the method for coding video data according to the third aspect and possible implementation forms of the third aspect.

According to a seventh aspect, it is further provided a computer program product comprising a program code for performing the method according to any one of the above-described aspects.

According to an eighth aspect, it is further provided a decoder, comprising: one or more processors; and a non-transitory computer-readable storage medium coupled to the processors and storing programming for execution by the processors, wherein the programming, when executed by the processors, configures the decoder to carry out the method according to any one of the above-described aspects.

According to a ninth aspect, it is further provided an encoder, comprising: one or more processors; and a non-transitory computer-readable storage medium coupled to the processors and storing programming for execution by the processors, wherein the programming, when executed by the processors, configures the encoder to carry out the method according to any one of the above-described aspects.

According to a tenth aspect, it is further provided a video encoding device, comprising: a reduction unit for reducing at least part of Least Significant Bits of Picture Order Counter, POC_LSB, by omitting one bit or by omitting a number of bits depending on layer IDs, and a coding unit for coding the reduced POC_LSB.

In a further possible implementation form of the tenth aspect, the device may be configured for using a dyadic coding structure of pictures.

In a further possible implementation form of the tenth aspect, the reduction unit may be configured for reducing the Least Significant Bits of Picture Order Counter, POC_LSB, by omitting the last one bit or by omitting a number of last bits, the number depending on a difference between the MaxTID, in the CVS and the TID, of the picture. The term "difference" denotes again the numerical difference, or in other words, the value obtained by subtracting the TID from the MaxTID.

In a further possible implementation form of the tenth aspect, the reduction unit may be configured such that reducing the POC_LSB by omitting a number of last bits, the number depending on the difference between the MaxTID, and the TID, comprises, for TID>0, reducing the POC_LSB by omitting a number of last bits, the number obtained by the sum of 1 and the difference between the MaxTID and the TID in particular the number being derived by POC_by_TID_len=(MaxTID−TID+(TID>0)).

In a further possible implementation form of the tenth aspect, the device may further comprise a second coding unit for coding a flag of dyadic temporal ID distribution denoted fixed picture rate for all sub-layers within the bit-stream or CVS. The second coding unit may correspond to or be comprised in the above-mentioned coding unit, which may be referred to as first coding unit.

In a further possible implementation form of the tenth aspect, the device may further comprise a third coding unit for coding a flag of dyadic temporal ID distribution conditionally based on SPS flag of presence dyadic temporal ID distribution flag in bit-stream. The third coding unit may correspond to or be comprised in the above-mentioned first or second coding unit.

In a further possible implementation form of the tenth aspect, the second and/or third coding unit may be configured for: coding dyadic_temporal_nesting_flag in general_hrd_parameters( ) syntax elements or in SPS and/or setting the dyadic_temporal_nesting_flag equal to predefined default value when not coded.

In a further possible implementation form of the tenth aspect, the device may further comprise: a first setting unit for setting the value of a parameter vui_poc_proportional_to_timing_flag to 1 when dyadic_temporal_nesting_flag is equal to 1 or as default.

In a further possible implementation form of the tenth aspect, the device may further comprise: a second setting unit for setting the value of a fixed_pic_rate_general_flag to 1 when dyadic_temporal_nesting_flag is equal to 1 or as default. The second setting unit may correspond to or be comprised in the first setting unit.

In a further possible implementation form of the tenth aspect, the device may further comprise: a third setting unit for setting the value of a fixed_pic_rate_within_cvs_flag to 1 when dyadic_temporal_nesting_flag is equal to 1 or as default. The third setting unit may correspond to or be comprised in the first or second setting unit.

In a further possible implementation form of the tenth aspect, the dyadic_temporal_nesting_present_flag being equal to 1 may indicate that the dyadic_temporal_nesting_flag is present in the SPS RBSP syntax, or the dyadic_temporal_nesting_present_flag being equal to 0 may indicate that the dyadic_temporal_nesting_flag is not present in the SPS RBSP syntax.

In a further possible implementation form of the tenth aspect, the dyadic_temporal_nesting_flag being equal to 1 may specify that the Temporal IDs are distributed hierarchically with dyadic dependencies, or the dyadic_temporal_nesting_flag being equal to 0 may specify that the Temporal IDs are not distributed hierarchically with dyadic dependencies.

In a further possible implementation form of the tenth aspect, the reduction unit may be configured for reducing the bit budget of the POC_LSB, wherein the POC_LSB is a slice_pic_order_cnt_lsb.

In a further possible implementation form of the tenth aspect, sps_max_sub_layers_minus1 plus 1 may specify the maximum number of temporal sub-layers, the value of sps_max_sub_layers_minus1 may be in the range of 0 to 6, and the variable MaxTID may be set equal to sps_max_sub_layers_minus1 plus 1.

In a further possible implementation form of the tenth aspect, slice_pic_order_cnt_lsb may specify the picture order count modulo MaxPicOrderCntLsb for the current picture, and the length of the slice_pic_order_cnt_lsb syntax element may be log 2_max_pic_order_cnt_lsb_minus4+4−PocByTidLen bits.

According to an eleventh aspect, it is further provided a video decoding device, comprising: a deriving unit (e.g., deriving circuit) for deriving at least part of the POC_LSB, depending on layer IDs.

In a further possible implementation form of the eleventh aspect, the device may be configured for using a dyadic coding structure of pictures.

In a further possible implementation form of the eleventh aspect, the deriving unit may be configured for: deriving at least part of the POC_LSB based on a MaxTID, in the CVS, and/or based on the TID, of the picture.

In a further possible implementation form of the eleventh aspect, the deriving unit may be configured such that deriving at least part of the POC_LSB is based on the difference between the MaxTID, and the TID. The term "difference" denotes again the numerical difference, or in other words, the value obtained by subtracting the TID from the MaxTID.

In a further possible implementation form of the eleventh aspect, the deriving unit may be configured such that the last one bit of the POC_LSB is derived to be 1 if the TID, of the picture corresponds to the MaxTID, in the CVS and to be 0 otherwise.

In a further possible implementation form of the eleventh aspect, the deriving unit may be configured such that omitted last bits of the POC_LSB are derived, for TID>0, based on an arithmetic left shift of the bit 1 by a number of binary digits corresponding to the difference between the MaxTID, and the TID.

In a further possible implementation form of the eleventh aspect, the deriving unit may be configured such that the omitted last bits of the POC_LSB are derived based on the expression (TID>0)<<(Max TID−TID+(TID==0)).

In a further possible implementation form of the eleventh aspect, the deriving unit may be configured such that the omitted last bits of the POC_LSB are derived based on the expression ((TID>0)<<(POC_by_TID_len−1)), wherein POC_by_TID_len=(MaxTID−TID+(TID>0)).

In a further possible implementation form of the eleventh aspect, the device may further comprise: a first parsing unit (e.g., first parsing circuit) for parsing a flag of dyadic temporal ID distribution denoted fixed picture rate for all sub-layers within bit-stream or CVS.

In a further possible implementation form of the eleventh aspect, the device may further comprise: a second parsing unit (e.g., second parsing circuit) for parsing a flag of dyadic temporal ID distribution conditionally based on SPS flag of presence dyadic temporal ID distribution flag in bit-stream. The second parsing unit may correspond to or be comprised in the first parsing unit.

In a further possible implementation form of the eleventh aspect, the first parsing unit and/or the second parsing unit may be configured for: parsing dyadic_temporal_nesting_flag in general_hrd_parameters( ) syntax elements or in SPS, and/or setting the dyadic_temporal_nesting_flag equal to predefined default value when not coded.

In a further possible implementation form of the eleventh aspect, the device may further comprise: a first setting unit (e.g., first setting circuit) for setting the value of a parameter vui_poc_proportional_to_timing_flag to 1 when dyadic_temporal_nesting_flag is equal to 1 or as default.

In a further possible implementation form of the eleventh aspect, the device may further comprise: a second setting unit (e.g., second setting circuit) for setting the value of a fixed_pic_rate_general_flag to 1 when dyadic_temporal_nesting_flag is equal to 1 or as default. The second setting unit may correspond to or be comprised in the first setting unit.

In a further possible implementation form of the eleventh aspect, the device may further comprise: a third setting unit (e.g., third setting circuit) for setting the value of a fixed_pic_rate_within_cvs_flag to 1 when dyadic_temporal_nesting_flag is equal to 1 or as default. The third setting unit may correspond to or be comprised in the first or second setting unit.

In a further possible implementation form of the eleventh aspect, the dyadic_temporal_nesting_present_flag being equal to 1 may indicate that the dyadic_temporal_nesting_flag is present in the SPS RBSP syntax, or the dyadic_temporal_nesting_present_flag being equal to 0 may indicate that the dyadic_temporal_nesting_flag is not present in the SPS RBSP syntax.

In a further possible implementation form of the eleventh aspect, the dyadic_temporal_nesting_flag being equal to 1 may specify that the Temporal IDs are distributed hierarchically with dyadic dependencies, or the dyadic_temporal_nesting_flag being equal to 0 may specify that the Temporal IDs are not distributed hierarchically with dyadic dependencies.

In a further possible implementation form of the eleventh aspect, the device may be configured such that: when the bit budget of coding slice_pic_order_cnt_lsb is reduced by one bit and/or when the dyadic_temporal_nesting_flag is equal to 1, the deriving unit derives the last bit of slice_pic_order_cnt_lsb by using MaxTID, wherein MaxTID is equal to sps_max_sub_layers_minus1 plus 1.

In a further possible implementation form of the eleventh aspect, the deriving unit may be configured for deriving the last bit of slice_pic_order_cnt_lsb by: deriving PicOrderCntLsb=(slice_pic_order_cnt_lsb<<1)+(TID==MaxTID), and derive PicOrderCntVal=PicOrderCntMsb+PicOrderCntLsb.

In a further possible implementation form of the eleventh aspect, the device may be configured such that: when the bit budget of coding slice_pic_order_cnt_lsb is reduced by the value POC_by_TID_len=(MaxTID−TID+(TID>0)) and/or when the dyadic_temporal_nesting_flag is equal to 1, the deriving unit derives the last bit of slice_pic_order_cnt_lsb by using MaxTID, wherein MaxTID is equal to sps_max_sub_layers_minus1 plus 1.

In a further possible implementation form of the eleventh aspect, the deriving unit may be configured for deriving the last bit of slice_pic_order_cnt_lsb by: deriving PicOrderCntLsb=(slice_pic_order_cnt_lsb<<POC_by_TID_len)+((TID>0)<<(Max TID−TID+(TID==0))); and deriving PicOrderCntVal=PicOrderCntMsb+PicOrderCntLsb.

In a further possible implementation form of the eleventh aspect, the deriving unit may be configured for deriving the last bit of slice_pic_order_cnt_lsb by: deriving PicOrderCntLsb=(slice_pic_order_cnt_lsb<<POC_by_TID_len)+((TID>0)<<(POC_by_TID_len−1)); and deriving PicOrderCntVal=PicOrderCntMsb+PicOrderCntLsb.

In a further possible implementation form of the eleventh aspect, sps_max_sub_layers_minus1 plus 1 may specify the maximum number of temporal sub-layers, the value of sps_max_sub_layers_minus1 may be in the range of 0 to 6, and the variable MaxTID may be set equal to sps_max_sub_layers_minus1 plus 1.

In a further possible implementation form of the eleventh aspect, slice_pic_order_cnt_lsb may specify the picture order count modulo MaxPicOrderCntLsb for the current picture, and the length of the slice_pic_order_cnt_lsb syntax element may be log 2_max_pic_order_cnt_lsb_minus4+4−PocByTidLen bits.

In a further possible implementation form of the eleventh aspect, the device may be configured such that when dyadic_temporal_nesting_flag is true, PicOrderCntLsb=(slice_pic_order_cnt_lsb<<PocByTidLen)+(((TemporalId>0)<<(Max TID−TID+(TID==0))) when dyadic_temporal_nesting_flag is false, PicOrderCntLsb=slice_pic_order_cnt_lsb.

In a further possible implementation form of the eleventh aspect, the value of the PicOrderCntLsb may be in the range of 0 to MaxPicOrderCntLsb−1, inclusive.

Embodiments of the present disclosure relate to the following aspects (each of them can be applied individually and some of them can be applied in combination):

1) To derive Least Significant Bits of Picture Order Counter (POC_LSB) depending on layer IDs by the following steps:
   a. To signal the flag of dyadic temporal ID distribution denoted fixed picture rate for all sub-layers within bit-stream or CVS
     i. signaling dyadic_temporal_nesting_flag in general_hrd_parameters( ) syntax elements or in SPS
       1. To signal dyadic temporal ID distribution flag conditionally based on SPS flag of presence dyadic temporal ID distribution flag in bit-stream
     ii. setting the value of a dyadic_temporal_nesting_flag is equal to 1 by default (when not present)

iii. setting the value of a parameter vui_poc_proportional_to_timing_flag to 1 when dyadic_temporal_ nesting_flag is equal to 1;
iv. setting the value of a fixed_pic_rate_general_flag to 1 when dyadic_temporal_nesting_flag is equal to 1;
v. setting the value of a fixed_pic_rate_within_cvs_flag to 1 when dyadic_temporal_nesting_flag is equal to 1;
vi. and processing the bit-stream based on the fixed_pic_rate_general_flag.

b. For slices associated with SPS contained dyadic_temporal_nesting_flag equal to 1 and non-zero Highest TID perform the following:
  i. To reduce the bit budged of signaling slice_pic_order_cnt_lsb by one bit
  ii. To derive last bit of slice_pic_order_cnt_lsb as (TID==Highest TID)
    1. Where Highest TID is equal to sps_max_sub_layers_minus1 plus 1
    2. To derive PicOrderCntLsb=(slice_pic_order_cnt_lsb<<1)+(TID==Highest TID)
    3. To derive PicOrderCntVal=PicOrderCntMsb+PicOrderCntLsb c. In another possible implementation form for slices associated with SPS contained dyadic_temporal_nesting_flag equal to 1 perform the following:
  i. To reduce the bit budged of signaling slice_pic_order_cnt_lsb by the value POC_by_TID_len= (Highest TID−TID+(TID>0))
  ii. To derive last bit of slice_pic_order_cnt_lsb as follows:
    1. use Highest TID is equal to sps_max_sub_layers_minus1 plus 1
    2. To derive PicOrderCntLsb= (slice_pic_order_cnt_lsb<<POC_by_TID_len) |+((TID>0)<<(Highest TID−TID+(TID==0)))
    3. To derive PicOrderCntLsb= (slice_pic_order_cnt_lsb<<POC_by_TID_len) |+((TID>0)<<(POC_by_TID_len−1))
    4. To derive PicOrderCntVal=PicOrderCntMsb+PicOrderCntLsb 2) Derivation of POC value defined by the approach described in item 1)a-1)b is described in the embodiment 1 below in this document.

3) Derivation of POC value defined by the approach described in item 1)a, 1)c is described in the embodiment 2 below in this document.

According to a twelfth aspect, the disclosure relates to a method of coding implemented by a decoding/encoding device for coding video data, comprising: derivation of value least significant bits of picture order counter using value of temporal layer ID associated with the picture.

In a possible implementation form of the method according to the twelfth aspect as such, the set of picture parameter in SPS includes one or more of following parameters: highest temporal ID, flag of dyadic temporal ID distribution indicated fixed picture rate for all sub-layers within bit-stream, a flag of presence of dyadic temporal ID distribution flag. The number of bit derived from TID value POC_by_TID_len is equal to 1. The value POC_by_TID_bits denoted last bit of POC_LSB is derived as the result of condition (TID==Highest TID) such as the value of bit equal to 1 when TID==Highest TID and equal to 0 otherwise.

In another possible implementation form of the method according to the twelfth aspect as such, the number of bit derived from TID POC_by_TID_len is equal to (Highest TID−TID+(TID>0)), The value POC_by_TID_len denoted last bits of POC_LSB value POC_by_TID_bits is derived as ((TID>0)<<(Highest TID−TID+(TID==0))) or as ((TID>0) <<(POC_by_TID_len−1)).

The value of POC is derived as POC_MSB+ (POC_LSB<<POC_by_TID_len)+POC_by_TID_bits The method according to the twelfth aspect of the disclosure can be performed by the apparatus according to the thirteenth aspect of the disclosure.

According to a fourteenth aspect, the disclosure relates to an apparatus for decoding a video stream includes a processor and a memory. The memory is storing instructions that cause the processor to perform the method according to the twelfth aspect.

Details of one or more embodiments are set forth in the accompanying drawings and the description below. Other features, objects, and advantages will be apparent from the description, drawings, and claims.

BRIEF DESCRIPTION OF THE DRAWINGS

The following embodiments of the disclosure are described in more detail with reference to the attached figures and drawings, in which.

Figure 1A:
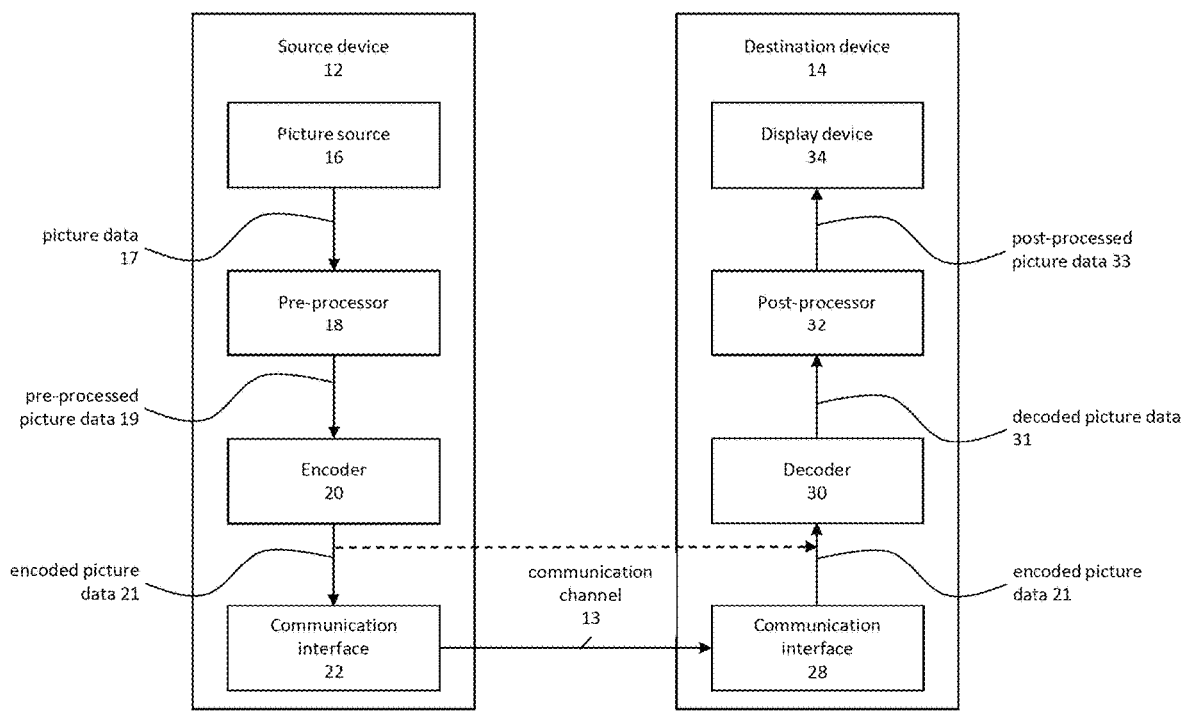
FIG. 1A is a block diagram showing an example of a video coding system configured to implement embodiments of the disclosure.

In the following identical reference signs refer to identical or at least functionally equivalent features if not explicitly specified otherwise.

In the following identical reference signs refer to identical or at least functionally equivalent features if not explicitly specified otherwise.

DETAILED DESCRIPTION OF THE EMBODIMENTS

In the following description, reference is made to the accompanying figures, which form part of the disclosure, and which show, by way of illustration, aspects of embodiments of the disclosure or aspects in which embodiments of the present disclosure may be used. It is understood that embodiments of the disclosure may be used in other aspects and comprise structural or logical changes not depicted in the figures. The following detailed description, therefore, is not to be taken in a limiting sense, and the scope of the present disclosure is defined by the appended claims.

For instance, it is understood that a disclosure in connection with a described method may also hold true for a corresponding device or system configured to perform the method and vice versa. For example, if one or a plurality of method steps are described, a corresponding device may include one or a plurality of units (e.g., one or a plurality of circuits), e.g. functional units (for example functional circuits), to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if an apparatus is described based on one or a plurality of units, (e.g. functional units), a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various embodiments and/or aspects described herein may be combined with each other, unless noted otherwise.

Video coding typically refers to the processing of a sequence of pictures, which form the video or video sequence. Instead of the term "picture", the term "frame" or "image" may be used as synonyms in the field of video coding. Video coding (or coding in general) comprises two parts of video encoding and video decoding. Video encoding is performed at the source side, and typically comprising processing (e.g. by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general) shall be understood to relate to "encoding" or "decoding" of video pictures or respective video sequences. The combination of the encoding part and the decoding part is also referred to as CODEC (Coding and Decoding).

In case of lossless video coding, the original video pictures can be reconstructed, meaning that the reconstructed video pictures have the same quality as the original video pictures (assuming no transmission loss or other data loss during storage or transmission). In case of lossy video coding, further compression, (e.g. by quantization) is performed, to reduce the amount of data representing the video pictures, which cannot be completely reconstructed at the decoder (i.e. the quality of the reconstructed video pictures is lower or worse compared to the quality of the original video pictures).

Several video coding standards belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed (i.e. encoded) on a block (e.g., video block) level, by using spatial (intra picture) prediction and/or temporal (inter picture) prediction to generate a prediction block. The encoder may further subtract the prediction block from the current block (e.g., the block currently processed/to be processed) to obtain a residual block, transforming the residual block and quantizing the residual block in the transform domain to reduce the amount of data to be transmitted (e.g., via compression). At the decoder, the inverse processing compared to the encoder is applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

In the following embodiments of a video coding system 10, a video encoder 20 and a video decoder 30 are described based on FIGS. 1 to 3.

FIG. 1A is a schematic block diagram illustrating an example coding system 10, such as a video coding system 10 (or short coding system 10) that may utilize techniques of this present application. Video encoder 20 (or short encoder 20) and video decoder 30 (or short decoder 30) of video coding system 10 represent examples of devices that may be configured to perform techniques in accordance with various examples described in the present application.

As shown in FIG. 1A, the coding system 10 comprises a source device 12 configured to provide encoded picture data 21 to a destination device 14 for decoding the encoded picture data 13.

The source device 12 comprises an encoder 20, and may additionally, i.e. optionally, comprise a picture source 16, a pre-processor (or pre-processing unit) 18, such as a picture pre-processor 18, and a communication interface or communication unit 22.

The picture source 16 may comprise or be any kind of picture capturing device, such as a camera for capturing a real-world picture, and/or any kind of a picture generating device, such as a computer-graphics processor for generating a computer animated picture, or any kind of other device for obtaining and/or providing a real-world picture, a computer generated picture (e.g. a screen content, a virtual reality (VR) picture) and/or any combination thereof (e.g. an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17.

Pre-processor 18 is configured to receive the (raw) picture data 17 and to perform pre-processing on the picture data 17 to obtain a pre-processed picture 19 or pre-processed picture data 19. Pre-processing performed by the pre-processor 18 may comprise trimming, color format conversion (e.g. from RGB to YCbCr), color correction, or de-noising. It can be understood that the pre-processing unit 18 may be an optional component.

The video encoder 20 is configured to receive the pre-processed picture data 19 and provide encoded picture data 21 (further details will be described below based on FIG. 2). Communication interface 22 of the source device 12 may be configured to receive the encoded picture data 21 and to transmit the encoded picture data 21 (or any further processed version thereof) over communication channel 13 to another device, such as the destination device 14 or any other device, for storage or direct reconstruction.

The destination device 14 comprises a decoder 30 (e.g. a video decoder 30), and may additionally, i.e. optionally, comprise a communication interface or communication unit 28, a post-processor 32 (or post-processing unit 32) and a display device 34.

The communication interface 28 of the destination device 14 is configured receive the encoded picture data 21 (or any further processed version thereof), directly from the source device 12 or from any other source, such as a storage device (for example, an encoded picture data storage device) and provide the encoded picture data 21 to the decoder 30.

The communication interface 22 and the communication interface 28 may be configured to transmit or receive the encoded picture data 21 or encoded data 13 via a direct communication link between the source device 12 and the destination device 14, such as a direct wired or wireless connection, or via any kind of network, such as a wired or wireless network or any combination thereof, or any kind of private and public network, or any kind of combination thereof.

The communication interface 22 may be, for example, configured to package the encoded picture data 21 into an appropriate format, via packets, and/or process the encoded picture data using any kind of transmission encoding or processing for transmission over a communication link or communication network.

The communication interface 28, forming the counterpart of the communication interface 22, may be, configured to receive the transmitted data and process the transmission data using any kind of corresponding transmission decoding or processing and/or de-packaging to obtain the encoded picture data 21.

Both, communication interface 22 and communication interface 28 may be configured as unidirectional communication interfaces as indicated by the arrow for the communication channel 13 in FIG. 1A pointing from the source device 12 to the destination device 14, or bi-directional communication interfaces, and may be configured, for example to send and receive messages, such as to set up a connection, to acknowledge and exchange any other information related to the communication link and/or data transmission (e.g. encoded picture data transmission).

The decoder 30 is configured to receive the encoded picture data 21 and provide decoded picture data 31 or a decoded picture 31 (further details will be described below based on FIG. 3 or FIG. 5). The post-processor 32 of destination device 14 is configured to post-process the decoded picture data 31 (also called reconstructed picture data), such as the decoded picture 31, to obtain post-processed picture data 33, such as a post-processed picture 33. The post-processing performed by the post-processing unit 32 may comprise color format conversion (e.g. from YCbCr to RGB), color correction, trimming, or re-sampling, or any other processing, such as for preparing the decoded picture data 31 for display, such as by a display device 34.

The display device 34 of the destination device 14 is configured to receive the post-processed picture data 33 for displaying the picture to a user or viewer. The display device 34 may be or comprise any kind of display for representing the reconstructed picture, via an integrated or external display or monitor. The displays may, for example, comprise liquid crystal displays (LCD), organic light emitting diodes (OLED) displays, plasma displays, projectors, micro LED displays, liquid crystal on silicon (LCoS), digital light processor (DLP), or any kind of other display.

Although FIG. 1A depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1A may vary depending on the actual device and application.

Figure 1B:
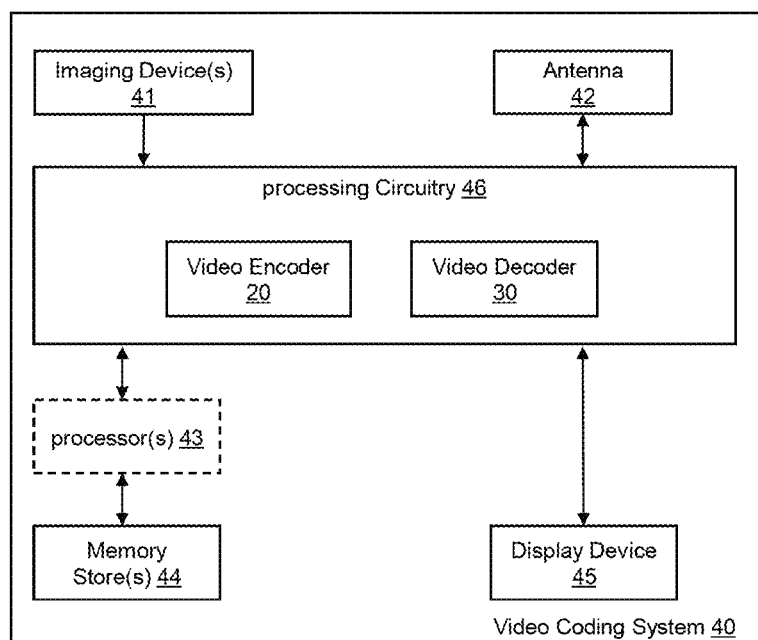
FIG. 1B is a block diagram showing another example of a video coding system configured to implement embodiments of the disclosure.

The encoder 20 (e.g. a video encoder 20) or the decoder 30 (e.g. a video decoder 30) or both encoder 20 and decoder 30 may be implemented via processing circuitry as shown in FIG. 1B. Some example circuitry includes one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody the various modules as discussed with respect to encoder 20 of FIG. 2 and/or any other encoder system or subsystem described herein. The decoder 30 may be implemented via processing circuitry 46 to embody the various modules as discussed with respect to decoder 30 of FIG. 3 and/or any other decoder system or subsystem described herein. The processing circuitry may be configured to perform the various operations as discussed later. As shown in FIG. 5, if the techniques are implemented partially in software, a device may store instructions for the software in a suitable, non-transitory computer-readable storage medium and may execute the instructions in hardware using one or more processors to perform the techniques of this disclosure. Either of video encoder 20 and video decoder 30 may be integrated as part of a combined encoder/decoder (CODEC) in a single device, for example, as shown in FIG. 1B.

Source device 12 and destination device 14 may comprise any of a wide range of devices, including any kind of handheld or stationary devices. For example, some example of devices include notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system. In some cases, the source device 12 and the destination device 14 may be equipped for wireless communication. Thus, the source device 12 and the destination device 14 may be wireless communication devices.

In some cases, the video coding system 10 illustrated in FIG. 1A is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

For convenience of description, embodiments of the disclosure are described herein, for example, by reference to High-Efficiency Video Coding (HEVC) or to the reference software of Versatile Video coding (VVC), the next generation video coding standard developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the disclosure are not limited to HEVC or VVC.

Encoder and Encoding Method

Figure 2:
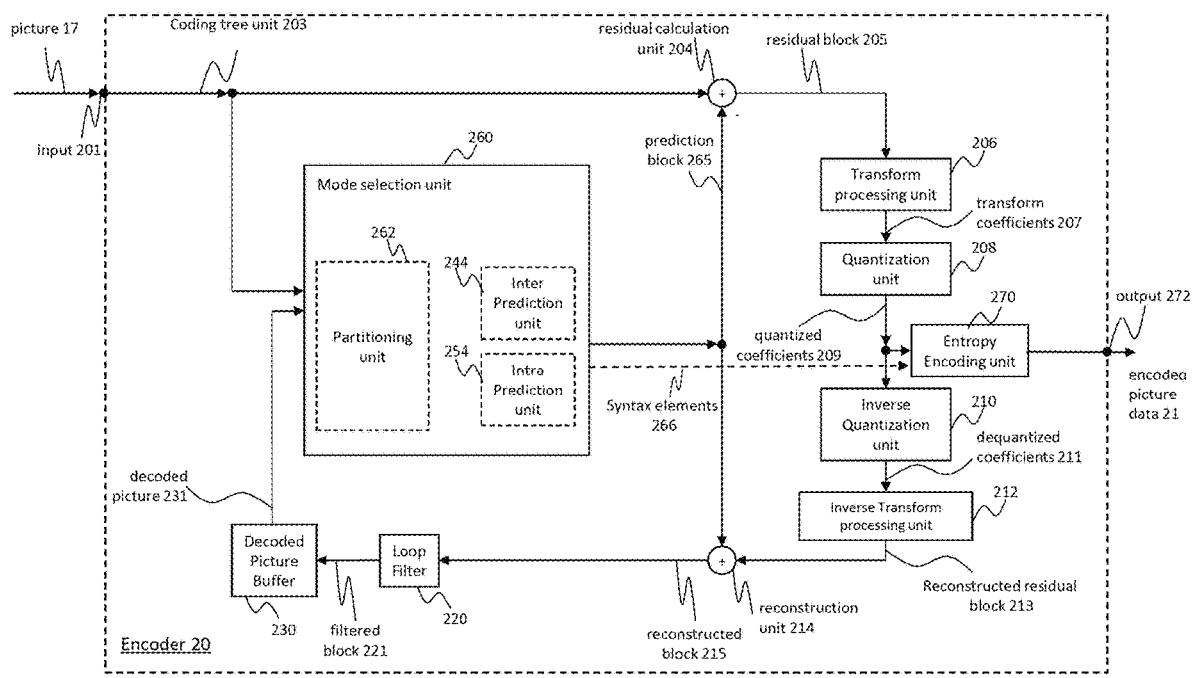
FIG. 2 is a block diagram showing an example of a video encoder configured to implement embodiments of the disclosure.

FIG. 2 shows a schematic block diagram of an example video encoder 20 that is configured to implement the techniques of the present application. In the example of FIG. 2, the video encoder 20 comprises an input 201 (or input interface 201), a residual calculation unit 204 (e.g., a calculation circuit), a transform processing unit 206 (e.g., a transform processing circuit), a quantization unit 208 (e.g., a quantization circuit), an inverse quantization unit 210 (e.g., an inverse quantization circuit), and inverse transform processing unit 212 (e.g., an inverse transform processing circuit), a reconstruction unit 214 (e.g., a reconstruction circuit), a loop filter unit 220 (e.g., a loop filter circuit), a decoded picture buffer (DPB) 230, a mode selection unit 260 (e.g., a mode selection circuit), an entropy encoding unit 270 (e.g., an entropy encoding circuit), and an output 272 (or output interface 272). The mode selection unit 260 may include an inter prediction unit 244 (e.g., an inter prediction circuit), an intra prediction unit 254 (e.g., an intra prediction circuit) and a partitioning unit 262 (e.g., a partitioning circuit). Inter prediction unit 244 may include a motion estimation unit and a motion compensation unit (not shown). A video encoder 20 as shown in FIG. 2 may also be referred to as hybrid video encoder or a video encoder according to a hybrid video codec.

Figure 3:
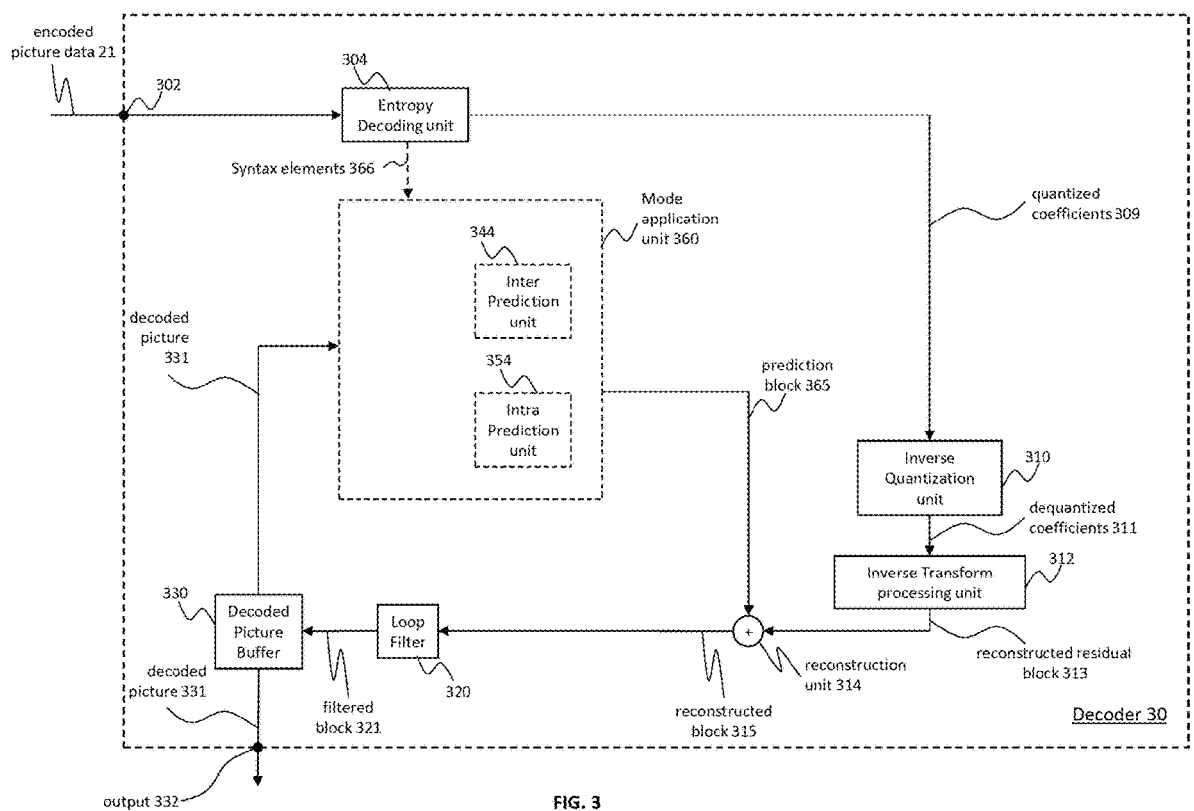
FIG. 3 is a block diagram showing an example structure of a video decoder configured to implement embodiments of the disclosure.

The residual calculation unit 204, the transform processing unit 206, the quantization unit 208, the mode selection unit 260 may be referred to as forming a forward signal path of the encoder 20, whereas the inverse quantization unit 210, the inverse transform processing unit 212, the reconstruction unit 214, the buffer 216, the loop filter 220, the DPB 230, the inter prediction unit 244 and the intra-prediction unit 254 may be referred to as forming a backward signal path of the video encoder 20, wherein the backward signal path of the video encoder 20 corresponds to the signal path of the decoder (see video decoder 30 in FIG. 3). The inverse quantization unit 210, the inverse transform processing unit 212, the reconstruction unit 214, the loop filter 220, the DPB 230, the inter prediction unit 244 and the intra-prediction unit 254 are also referred to forming the "built-in decoder" of video encoder 20.

Pictures & Picture Partitioning (Pictures & Blocks)

The encoder 20 may be configured to receive, e.g. via an input 201, a picture 17 (or picture data 17), such as a picture or a sequence of pictures forming a video or a video sequence. The received picture or picture data may also be a pre-processed picture 19 (or pre-processed picture data 19). For sake of simplicity the following description refers to the picture 17. The picture 17 may also be referred to as a current picture or the picture to be coded (in particular in video coding to distinguish the current picture from other pictures, e.g. previously encoded and/or decoded pictures of the same video sequence, i.e. the video sequence which also comprises the current picture).

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed (i.e. the picture may be represented or include three sample arrays). In RBG format or color space a picture comprises a corresponding red, green and blue sample array. However, in video coding each pixel is typically represented in a luminance and chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array. Accordingly, a picture may be, for example, an array of luma samples in monochrome format or an array of luma samples and two corresponding arrays of chroma samples in 4:2:0, 4:2:2, and 4:4:4 color format.

Embodiments of the video encoder 20 may comprise a picture partitioning unit (e.g., a picture partitioning circuit) (not depicted in FIG. 2) configured to partition the picture 17 into a plurality of (typically non-overlapping) picture blocks 203. These blocks may also be referred to as root blocks, macro blocks (H.264/AVC) or coding tree blocks (CTB) or coding tree units (CTU) (H.265/HEVC and VVC). The picture partitioning unit may be configured to use the same block size for all pictures of a video sequence and the corresponding grid defining the block size, or to change the block size between pictures or subsets or groups of pictures, and partition each picture into the corresponding blocks.

In further embodiments, the video encoder may be configured to receive directly a block 203 of the picture 17 (e.g. one, several, or all blocks forming the picture 17). The picture block 203 may also be referred to as current picture block or picture block to be coded.

Like the picture 17, the picture block 203 again is or can be regarded as a two-dimensional array or matrix of samples with intensity values (sample values), although of smaller dimension than the picture 17. In other words, the block 203 may comprise one sample array (e.g. a luma array in case of a monochrome picture 17, or a luma or chroma array in case of a color picture) or three sample arrays (e.g. a luma and two chroma arrays in case of a color picture 17) or any other number and/or kind of arrays depending on the color format applied. The number of samples in horizontal and vertical direction (or axis) of the block 203 define the size of block 203. Accordingly, a block may, for example, an M×N (M-column by N-row) array of samples, or an M×N array of transform coefficients.

Embodiments of the video encoder 20, as shown in FIG. 2, may be configured to encode the picture 17 block by block (e.g. the encoding and prediction is performed per block 203).

Embodiments of the video encoder 20, as shown in FIG. 2, may be further configured to partition and/or encode the picture by using slices (also referred to as video slices), wherein a picture may be partitioned into or encoded using one or more slices (typically non-overlapping), and each slice may comprise one or more blocks (e.g. CTUs).

Embodiments of the video encoder 20, as shown in FIG. 2, may be further configured to partition and/or encode the picture by using tile groups (also referred to as video tile groups) and/or tiles (also referred to as video tiles), wherein a picture may be partitioned into or encoded using one or more tile groups (typically non-overlapping), and each tile group may comprise, for example, one or more blocks (e.g. CTUs) or one or more tiles, wherein each tile, e.g. may be of rectangular shape and may comprise one or more blocks (e.g. CTUs), such as complete or fractional blocks.

Residual Calculation

The residual calculation unit 204 may be configured to calculate a residual block 205 (also referred to as residual 205) based on the picture block 203 and a prediction block 265 (further details about the prediction block 265 are provided later), by subtracting sample values of the prediction block 265 from sample values of the picture block 203, sample by sample (e.g., pixel by pixel) to obtain the residual block 205 in the sample domain.

Transform

The transform processing unit 206 may be configured to apply a transform (e.g. a discrete cosine transform (DCT) or discrete sine transform (DST)) on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for H.265/HEVC. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operations, bit depth of the transform coefficients, tradeoff between accuracy and implementation costs, etc. Specific scaling factors are, for example, specified for the inverse transform, such as by inverse transform processing unit 212 (and the corresponding inverse transform, such as by inverse transform processing unit 312 at video decoder 30) and corresponding scaling factors for the forward transform, such as by transform processing unit 206, at an encoder 20 may be specified accordingly.

Embodiments of the video encoder 20 (respectively transform processing unit 206) may be configured to output transform parameters (e.g. a type of transform or transforms), directly or encoded or compressed via the entropy encoding unit 270, so that, for example, the video decoder 30 may receive and use the transform parameters for decoding.

Quantization

The quantization unit 208 may be configured to quantize the transform coefficients 207 to obtain quantized coefficients 209 (e.g. by applying scalar quantization or vector quantization). The quantized coefficients 209 may also be referred to as quantized transform coefficients 209 or quantized residual coefficients 209.

The quantization process may reduce the bit depth associated with some or all of the transform coefficients 207. For example, an n-bit transform coefficient may be rounded down to an m-bit Transform coefficient during quantization, where n is greater than m. The degree of quantization may be modified by adjusting a quantization parameter (QP). For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a QP. The QP may for example be an index to a predefined set of applicable quantization step sizes. For example, small quantization parameters may correspond to fine quantization (e.g., small quantization step sizes) and large quantization parameters may correspond to coarse quantization (e.g., large quantization step sizes) or vice versa. The quantization may include division by a quantization step size and a corresponding and/or the inverse dequantization, for example, by inverse quantization unit 210, may include multiplication by the quantization step size. Embodiments according to some standards (e.g. HEVC), may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one example implementation, the scaling of the inverse transform and dequantization might be combined. Alternatively, customized quantization tables may be used and signaled from an encoder to a decoder (e.g. in a bitstream). The quantization is a lossy operation, wherein the loss increases with increasing quantization step sizes.

Embodiments of the video encoder 20 (respectively quantization unit 208) may be configured to output QP, for example, directly or encoded via the entropy encoding unit 270, so that, for example, the video decoder 30 may receive and apply the quantization parameters for decoding.

Inverse Quantization

The inverse quantization unit 210 is configured to apply the inverse quantization of the quantization unit 208 on the quantized coefficients to obtain dequantized coefficients 211, such as by applying the inverse of the quantization scheme applied by the quantization unit 208 based on or using the same quantization step size as the quantization unit 208. The dequantized coefficients 211 may also be referred to as dequantized residual coefficients 211 and correspond—although typically not identical to the transform coefficients due to the loss by quantization—to the transform coefficients 207.

Inverse Transform

The inverse transform processing unit 212 is configured to apply the inverse transform of the transform applied by the transform processing unit 206, such as by an inverse discrete cosine transform (DCT) or inverse discrete sine transform (DST) or other inverse transforms, to obtain a reconstructed residual block 213 (or corresponding dequantized coefficients 213) in the sample domain. The reconstructed residual block 213 may also be referred to as transform block 213.

Reconstruction

The reconstruction unit 214 (e.g. adder or summer 214) is configured to add the transform block 213 (i.e. reconstructed residual block 213) to the prediction block 265 to obtain a reconstructed block 215 in the sample domain, for example, by adding—sample by sample—the sample values of the reconstructed residual block 213 and the sample values of the prediction block 265.

Filtering

The loop filter unit 220 (or short "loop filter" 220), is configured to filter the reconstructed block 215 to obtain a filtered block 221, or in general, to filter reconstructed samples to obtain filtered samples. The loop filter unit is, for example, configured to smooth pixel transitions, or otherwise improve the video quality. The loop filter unit 220 may comprise one or more loop filters such as a de-blocking filter, a sample-adaptive offset (SAO) filter or one or more other filters (e.g. a bilateral filter, an adaptive loop filter (ALF), a sharpening, a smoothing filters or a collaborative filters, or any combination thereof). Although the loop filter unit 220 is shown in FIG. 2 as being an in loop filter, in other configurations, the loop filter unit 220 may be implemented as a post loop filter. The filtered block 221 may also be referred to as filtered reconstructed block 221.

Embodiments of the video encoder 20 (respectively loop filter unit 220) may be configured to output loop filter parameters (such as sample adaptive offset information), directly or encoded via the entropy encoding unit 270, so that, for example, a decoder 30 may receive and apply the same loop filter parameters or respective loop filters for decoding.

Decoded Picture Buffer

The decoded picture buffer (DPB) 230 may be a memory that stores reference pictures, or in general reference picture data, for encoding video data by video encoder 20. The DPB 230 may be formed by any of a variety of memory devices, such as dynamic random access memory (DRAM), including synchronous DRAM (SDRAM), magnetoresistive RAM (MRAM), resistive RAM (RRAM), or other types of memory devices. The DPB 230 may be configured to store one or more filtered blocks 221. The decoded picture buffer 230 may be further configured to store other previously filtered blocks, e.g. previously reconstructed and filtered blocks 221, of the same current picture or of different pictures, for example previously reconstructed pictures, and may provide complete previously reconstructed, such as decoded, pictures (and corresponding reference blocks and samples) and/or a partially reconstructed current picture (and corresponding reference blocks and samples), for example for inter prediction. The DPB 230 may be also configured to store one or more unfiltered reconstructed blocks 215, or in general unfiltered reconstructed samples, for example if the reconstructed block 215 is not filtered by loop filter unit 220, or any other further processed version of the reconstructed blocks or samples.

Mode Selection (Partitioning & Prediction)

The mode selection unit 260 comprises a partitioning unit 262, inter-prediction unit 244 and intra-prediction unit 254, and is configured to receive or obtain original picture data, e.g. an original block 203 (current block 203 of the current picture 17), and reconstructed picture data, e.g. filtered and/or unfiltered reconstructed samples or blocks of the same (e.g., current) picture and/or from one or a plurality of previously decoded pictures, for example from decoded picture buffer 230 or other buffers (e.g. line buffer, not shown). The reconstructed picture data is used as reference picture data for prediction, for example, inter-prediction or intra-prediction, to obtain a prediction block 265 or predictor 265.

Mode selection unit 260 may be configured to determine or select a partitioning for a current block prediction mode (including no partitioning) and a prediction mode (e.g. an intra or inter prediction mode) and generate a corresponding prediction block 265, which is used for the calculation of the residual block 205 and for the reconstruction of the reconstructed block 215.

Embodiments of the mode selection unit 260 may be configured to select the partitioning and the prediction mode (e.g. from those supported by or available for mode selection unit 260), which provide the best match or, in other words, the minimum residual (minimum residual means better compression for transmission or storage), or a minimum signaling overhead (minimum signaling overhead means better compression for transmission or storage), or which considers or balances both. The mode selection unit 260 may be configured to determine the partitioning and prediction mode based on rate distortion optimization (RDO), or in other words, select the prediction mode which provides a minimum rate distortion. Terms like "best", "minimum", "optimum" etc. in this context do not necessarily refer to an overall "best", "minimum", "optimum", etc. but may also refer to the fulfillment of a termination or selection criterion like a value exceeding or falling below a threshold or other constraints leading potentially to a "sub-optimum selection" but reducing complexity and processing time.

In other words, the partitioning unit 262 may be configured to partition the block 203 into smaller block partitions or sub-blocks (which form again blocks), such as by iteratively using quad-tree-partitioning (QT), binary partitioning (BT) or triple-tree-partitioning (TT) or any combination thereof, and to perform, for example, the prediction for each of the block partitions or sub-blocks, wherein the mode selection comprises the selection of the tree-structure of the partitioned block 203 and the prediction modes are applied to each of the block partitions or sub-blocks.

In the following the partitioning (e.g. by partitioning unit 260) and prediction processing (by inter-prediction unit 244 and intra-prediction unit 254) performed by an example video encoder 20 will be explained in more detail.

Partitioning

The partitioning unit 262 may partition (or split) a current block 203 into smaller partitions, such as smaller blocks of square or rectangular size. These smaller blocks (which may also be referred to as sub-blocks) may be further partitioned into even smaller partitions. This is also referred to tree-partitioning or hierarchical tree-partitioning, wherein a root block (e.g. at root tree-level 0 (hierarchy-level 0, depth 0)), may be recursively partitioned, such as being partitioned into two or more blocks of a next lower tree-level (e.g. nodes at tree-level 1 (hierarchy-level 1, depth 1)) wherein these blocks may be again partitioned into two or more blocks of a next lower level (e.g. tree-level 2 (hierarchy-level 2, depth 2)), etc. until the partitioning is terminated, for example, because a termination criterion is fulfilled, such as reaching a maximum tree depth or minimum block. Blocks that are not further partitioned are also referred to as leaf-blocks or leaf nodes of the tree. A tree using partitioning into two partitions is referred to as binary-tree (BT), a tree using partitioning into three partitions is referred to as ternary-tree (TT), and a tree using partitioning into four partitions is referred to as quad-tree (QT).

As mentioned before, the term "block" as used herein may be a portion, in particular a square or rectangular portion, of a picture. With reference, for example, to HEVC and VVC, the block may be or correspond to a coding tree unit (CTU), a coding unit (CU), prediction unit (PU), and transform unit (TU) and/or to the corresponding blocks, e.g. a coding tree block (CTB), a coding block (CB), a transform block (TB) or prediction block (PB).

For example, a coding tree unit (CTU) may be or comprise a CTB of luma samples, two corresponding CTBs of chroma samples of a picture that has three sample arrays, or a CTB of samples of a monochrome picture or a picture that is coded using three separate colour planes and syntax structures used to code the samples. Correspondingly, a coding tree block (CTB) may be an N×N block of samples for some value of N such that the division of a component into CTBs is a partitioning. A coding unit (CU) may be or comprise a coding block of luma samples, two corresponding coding blocks of chroma samples of a picture that has three sample arrays, or a coding block of samples of a monochrome picture or a picture that is coded using three separate colour planes and syntax structures used to code the samples. Correspondingly, a coding block (CB) may be an M×N block of samples for some values of M and N such that the division of a CTB into coding blocks is a partitioning.

In embodiments, e.g., according to HEVC, a coding tree unit (CTU) may be split into CUs by using a quad-tree structure denoted as coding tree. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU.

In embodiments, according to the latest video coding standard currently in development, which is referred to VVC, a combined Quad-tree and binary tree (QTBT) partitioning is for example used to partition a coding block. In the QTBT block structure, a CU can have either a square or rectangular shape. For example, a CTU is first partitioned by a quadtree structure. The quadtree leaf nodes are further partitioned by a binary tree or ternary (or triple) tree structure. The partitioning tree leaf nodes are called CUs, and that segmentation is used for prediction and transform processing without any further partitioning. This means that the CU, PU and TU have the same block size in the QTBT coding block structure. In parallel, multiple partition, for example, triple tree partition may be used together with the QTBT block structure.

In one example, the mode selection unit 260 of video encoder 20 may be configured to perform any combination of the partitioning techniques described herein.

As described above, the video encoder 20 is configured to determine or select the best or an optimum prediction mode from a set of (e.g. pre-determined) prediction modes. The set of prediction modes may comprise, e.g., intra-prediction modes and/or inter-prediction modes.

Intra-Prediction

The set of intra-prediction modes may comprise 35 different intra-prediction modes, e.g. non-directional modes like DC (or mean) mode and planar mode, or directional modes, e.g. as defined in HEVC, or may comprise 67 different intra-prediction modes, e.g. non-directional modes like DC (or mean) mode and planar mode, or directional modes, e.g. as defined for VVC.

The intra-prediction unit 254 is configured to use reconstructed samples of neighboring blocks of the same current picture to generate an intra-prediction block 265 according to an intra-prediction mode of the set of intra-prediction modes.

The intra prediction unit 254 (or in general the mode selection unit 260) is further configured to output intra-prediction parameters (or in general information indicative of the selected intra prediction mode for the block) to the entropy encoding unit 270 in form of syntax elements 266 for inclusion into the encoded picture data 21, so that, e.g., the video decoder 30 may receive and use the prediction parameters for decoding.

Inter-Prediction

The set of (or possible) inter-prediction modes depends on the available reference pictures (i.e. previous at least partially decoded pictures, e.g. stored in DBP 230) and other inter-prediction parameters, e.g. whether the whole reference picture or only a part, e.g. a search window area around the area of the current block, of the reference picture is used for searching for a best matching reference block, and/or e.g. whether pixel interpolation is applied, e.g. half/semi-pel and/or quarter-pel interpolation, or not.

Additional to the above prediction modes, skip mode and/or direct mode may be applied.

The inter prediction unit 244 may include a motion estimation (ME) unit and a motion compensation (MC) unit (both not shown in FIG. 2). The motion estimation unit may be configured to receive or obtain the picture block 203 (current picture block 203 of the current picture 17) and a decoded picture 231, or at least one or a plurality of previously reconstructed blocks, e.g. reconstructed blocks of one or a plurality of other/different previously decoded pictures 231, for motion estimation. For example, a video sequence may comprise the current picture and the previously decoded pictures 231, or in other words, the current picture and the previously decoded pictures 231 may be part of or form a sequence of pictures forming a video sequence.

The encoder 20 may, e.g., be configured to select a reference block from a plurality of reference blocks of the same or different pictures of the plurality of other pictures and provide a reference picture (or reference picture index) and/or an offset (spatial offset) between the position (x, y coordinates) of the reference block and the position of the current block as inter prediction parameters to the motion estimation unit. This offset is also called motion vector (MV).

The motion compensation unit is configured to obtain, e.g. receive, an inter prediction parameter and to perform inter prediction based on or using the inter prediction parameter to obtain an inter prediction block 265. Motion compensation, performed by the motion compensation unit, may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block. Upon receiving the motion vector for the PU of the current picture block, the motion compensation unit may locate the prediction block to which the motion vector points in one of the reference picture lists.

The motion compensation unit may also generate syntax elements associated with the blocks and video slices for use by video decoder 30 in decoding the picture blocks of the video slice. In addition or as an alternative to slices and respective syntax elements, tile groups and/or tiles and respective syntax elements may be generated or used.

Entropy Coding

The entropy encoding unit 270 is configured to apply, for example, an entropy encoding algorithm or scheme (e.g. a variable length coding (VLC) scheme, an context adaptive VLC scheme (CAVLC), an arithmetic coding scheme, a binarization, a context adaptive binary arithmetic coding (CABAC), syntax-based context-adaptive binary arithmetic coding (SBAC), probability interval partitioning entropy (PIPE) coding or another entropy encoding methodology or technique) or bypass (no compression) on the quantized coefficients 209, inter prediction parameters, intra prediction parameters, loop filter parameters and/or other syntax elements to obtain encoded picture data 21 which can be output via the output 272, e.g. in the form of an encoded bitstream 21, so that, e.g., the video decoder 30 may receive and use the parameters for decoding. The encoded bitstream 21 may be transmitted to video decoder 30, or stored in a memory for later transmission or retrieval by video decoder 30.

Other structural variations of the video encoder 20 can be used to encode the video stream. For example, a non-transform based encoder 20 can quantize the residual signal directly without the transform processing unit 206 for certain blocks or frames. In another implementation, an encoder 20 can have the quantization unit 208 and the inverse quantization unit 210 combined into a single unit.

Decoder and Decoding Method

FIG. 3 shows an example of a video decoder 30 that is configured to implement the techniques of this present application. The video decoder 30 is configured to receive encoded picture data 21 (e.g. encoded bitstream 21), e.g. encoded by encoder 20, to obtain a decoded picture 331. The encoded picture data or bitstream comprises information for decoding the encoded picture data, e.g. data that represents picture blocks of an encoded video slice (and/or tile groups or tiles) and associated syntax elements.

In the example of FIG. 3, the decoder 30 comprises an entropy decoding unit 304, an inverse quantization unit 310, an inverse transform processing unit 312, a reconstruction unit 314 (e.g. a summer 314), a loop filter 320, a decoded picture buffer (DBP) 330, a mode application unit 360, an inter prediction unit 344 and an intra prediction unit 354. Inter prediction unit 344 may be or include a motion compensation unit. Video decoder 30 may, in some examples, perform a decoding pass generally reciprocal to the encoding pass described with respect to video encoder 100 from FIG. 2.

As explained with regard to the encoder 20, the inverse quantization unit 210, the inverse transform processing unit 212, the reconstruction unit 214 the loop filter 220, the decoded picture buffer (DPB) 230, the inter prediction unit 344 and the intra prediction unit 354 are also referred to as forming the "built-in decoder" of video encoder 20. Accordingly, the inverse quantization unit 310 may be identical in function to the inverse quantization unit 110, the inverse transform processing unit 312 may be identical in function to the inverse transform processing unit 212, the reconstruction unit 314 may be identical in function to reconstruction unit 214, the loop filter 320 may be identical in function to the loop filter 220, and the decoded picture buffer 330 may be identical in function to the decoded picture buffer 230. Therefore, the explanations provided for the respective units and functions of the video 20 encoder apply correspondingly to the respective units and functions of the video decoder 30.

Entropy Decoding

The entropy decoding unit 304 is configured to parse the bitstream 21 (or in general encoded picture data 21) and perform, for example, entropy decoding to the encoded picture data 21 to obtain, e.g., quantized coefficients 309 and/or decoded coding parameters (not shown in FIG. 3), e.g. any or all of inter prediction parameters (e.g. reference picture index and motion vector), intra prediction parameter (e.g. intra prediction mode or index), transform parameters, quantization parameters, loop filter parameters, and/or other syntax elements. Entropy decoding unit 304 maybe configured to apply the decoding algorithms or schemes corresponding to the encoding schemes as described with regard to the entropy encoding unit 270 of the encoder 20. Entropy decoding unit 304 may be further configured to provide inter prediction parameters, intra prediction parameter and/or other syntax elements to the mode application unit 360 and other parameters to other units of the decoder 30. Video decoder 30 may receive the syntax elements at the video slice level and/or the video block level. In addition or as an alternative to slices and respective syntax elements, tile groups and/or tiles and respective syntax elements may be received and/or used.

Inverse Quantization

The inverse quantization unit 310 may be configured to receive quantization parameters (QP) (or in general information related to the inverse quantization) and quantized coefficients from the encoded picture data 21 (e.g. by parsing and/or decoding, e.g. by entropy decoding unit 304) and to apply based on the quantization parameters an inverse quantization on the decoded quantized coefficients 309 to obtain dequantized coefficients 311, which may also be referred to as transform coefficients 311. The inverse quantization process may include use of a quantization parameter determined by video encoder 20 for each video block in the video slice (or tile or tile group) to determine a degree of quantization and, likewise, a degree of inverse quantization that should be applied.

Inverse Transform

Inverse transform processing unit 312 may be configured to receive dequantized coefficients 311, also referred to as transform coefficients 311, and to apply a transform to the dequantized coefficients 311 in order to obtain reconstructed residual blocks 213 in the sample domain. The reconstructed residual blocks 213 may also be referred to as transform blocks 313. The transform may be an inverse transform, e.g., an inverse DCT, an inverse DST, an inverse integer transform, or a conceptually similar inverse transform process. The inverse transform processing unit 312 may be further configured to receive transform parameters or corresponding information from the encoded picture data 21 (e.g. by parsing and/or decoding, e.g. by entropy decoding unit 304) to determine the transform to be applied to the dequantized coefficients 311.

Reconstruction

The reconstruction unit 314 (e.g. adder or summer 314) may be configured to add the reconstructed residual block 313, to the prediction block 365 to obtain a reconstructed block 315 in the sample domain, e.g. by adding the sample values of the reconstructed residual block 313 and the sample values of the prediction block 365.

Filtering

The loop filter unit 320 (either in the coding loop or after the coding loop) is configured to filter the reconstructed block 315 to obtain a filtered block 321, e.g. to smooth pixel transitions, or otherwise improve the video quality. The loop filter unit 320 may comprise one or more loop filters such as a de-blocking filter, a sample-adaptive offset (SAO) filter or one or more other filters, e.g. a bilateral filter, an adaptive loop filter (ALF), a sharpening, a smoothing filters or a collaborative filters, or any combination thereof. Although the loop filter unit 320 is shown in FIG. 3 as being an in loop filter, in other configurations, the loop filter unit 320 may be implemented as a post loop filter.

Decoded Picture Buffer

The decoded video blocks 321 of a picture are then stored in decoded picture buffer 330, which stores the decoded pictures 331 as reference pictures for subsequent motion compensation for other pictures and/or for output respectively display.

The decoder 30 is configured to output the decoded picture 311, e.g. via output 312, for presentation or viewing to a user.

Prediction

The inter prediction unit 344 may be identical to the inter prediction unit 244 (in particular to the motion compensation unit) and the intra prediction unit 354 may be identical to the inter prediction unit 254 in function, and performs split or partitioning decisions and prediction based on the partitioning and/or prediction parameters or respective information received from the encoded picture data 21 (e.g. by parsing and/or decoding, e.g. by entropy decoding unit 304). Mode application unit 360 may be configured to perform the prediction (intra or inter prediction) per block based on reconstructed pictures, blocks or respective samples (filtered or unfiltered) to obtain the prediction block 365.

When the video slice is coded as an intra coded (I) slice, intra prediction unit 354 of mode application unit 360 is configured to generate prediction block 365 for a picture block of the current video slice based on a signaled intra prediction mode and data from previously decoded blocks of the current picture. When the video picture is coded as an inter coded (i.e., B, or P) slice, inter prediction unit 344 (e.g. motion compensation unit) of mode application unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using default construction techniques based on reference pictures stored in DPB 330. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Mode application unit 360 is configured to determine the prediction information for a video block of the current video slice by parsing the motion vectors or related information and other syntax elements, and uses the prediction information to produce the prediction blocks for the current video block being decoded. For example, the mode application unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Embodiments of the video decoder 30 as shown in FIG. 3 may be configured to partition and/or decode the picture by using slices (also referred to as video slices), wherein a picture may be partitioned into or decoded using one or more slices (typically non-overlapping), and each slice may comprise one or more blocks (e.g. CTUs).

Embodiments of the video decoder 30 as shown in FIG. 3 may be configured to partition and/or decode the picture by using tile groups (also referred to as video tile groups) and/or tiles (also referred to as video tiles), wherein a picture may be partitioned into or decoded using one or more tile groups (typically non-overlapping), and each tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

Other variations of the video decoder 30 can be used to decode the encoded picture data 21. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

It should be understood that, in the encoder 20 and the decoder 30, a processing result of a current step may be further processed and then output to the next step. For example, after interpolation filtering, motion vector derivation or loop filtering, a further operation, such as Clip or shift, may be performed on the processing result of the interpolation filtering, motion vector derivation or loop filtering.

It should be noted that further operations may be applied to the derived motion vectors of current block (including but not limit to control point motion vectors of affine mode, sub-block motion vectors in affine, planar, ATMVP modes, temporal motion vectors, and so on). For example, the value of motion vector is constrained to a predefined range according to its representing bit. If the representing bit of motion vector is bitDepth, then the range is $-2^{\wedge}(\text{bitDepth-1}) \sim 2^{\wedge}(\text{bitDepth-1})-1$, where "^" means exponentiation. For example, if bitDepth is set equal to 16, the range is −32768~32767; if bitDepth is set equal to 18, the range is −131072~131071. For example, the value of the derived motion vector (e.g. the MVs of four 4×4 sub-blocks within one 8×8 block) is constrained such that the max difference between integer parts of the four 4×4 sub-block MVs is no more than N pixels, such as no more than 1 pixel. Here provides two methods for constraining the motion vector according to the bitDepth.

Method 1: remove the overflow most significant bit (MSB) by flowing operations $$\text{i. } ux=(mvx+2^{bitDepth})\%2^{bitDepth} \qquad (1)$$

$$\text{ii. } mvx=(ux>=2^{bitDepth-1})?(ux-2^{bitDepth}):ux \qquad (2)$$

$$\text{iii. } uy=(mvy+2^{bitDepth})\%2^{bitDepth} \qquad (3)$$

$$\text{iv. } mvy=(uy>=2^{bitDepth-1})?(uy-2^{bitDepth}):uy \qquad (4)$$

where mvx is a horizontal component of a motion vector of an image block or a sub-block, mvy is a vertical component of a motion vector of an image block or a sub-block, and ux and uy indicates an intermediate value;

For example, if the value of mvx is −32769, after applying formula (1) and (2), the resulting value is 32767. In computer system, decimal numbers are stored as two's complement. The two's complement of −32769 is 1,0111,1111, 1111,1111 (17 bits), then the MSB is discarded, so the resulting two's complement is 0111,1111,1111,1111 (decimal number is 32767), which is same as the output by applying formula (1) and (2).

$$\text{v. } ux=(mvpx+mvdx+2^{bitDepth})\%2^{bitDepth} \quad (5)$$

$$\text{vi. } mvx=(ux>=2^{bitDepth-1})?(ux-2^{bitDepth}):ux \quad (6)$$

$$\text{vii. } uy=(mvpy+mvdy+2^{bitDepth})\%2^{bitDepth} \quad (7)$$

$$\text{viii. } mvy=(uy>=2^{bitDepth-1})?(uy-2^{bitDepth}):up \quad (8)$$

The operations may be applied during the sum of mvp and mvd, as shown in formula (5) to (8).

Method 2: remove the overflow MSB by clipping the value
1. vx=Clip3(−$2^{bitDepth-1}$, $2^{bitDepth-1}$−1, vx)
2. vy=Clip3(−$2^{bitDepth-1}$, $2^{bitDepth-1}$−1, vy)

where vx is a horizontal component of a motion vector of an image block or a sub-block, vy is a vertical component of a motion vector of an image block or a sub-block; x, y and z respectively correspond to three input value of the MV clipping process, and the definition of function Clip3 is as follow:

$$\text{ix. } Clip3(x, y, z) = \begin{cases} x; & z < x \\ y; & z > y \\ z; & \text{otherwise} \end{cases}$$

Figure 4:
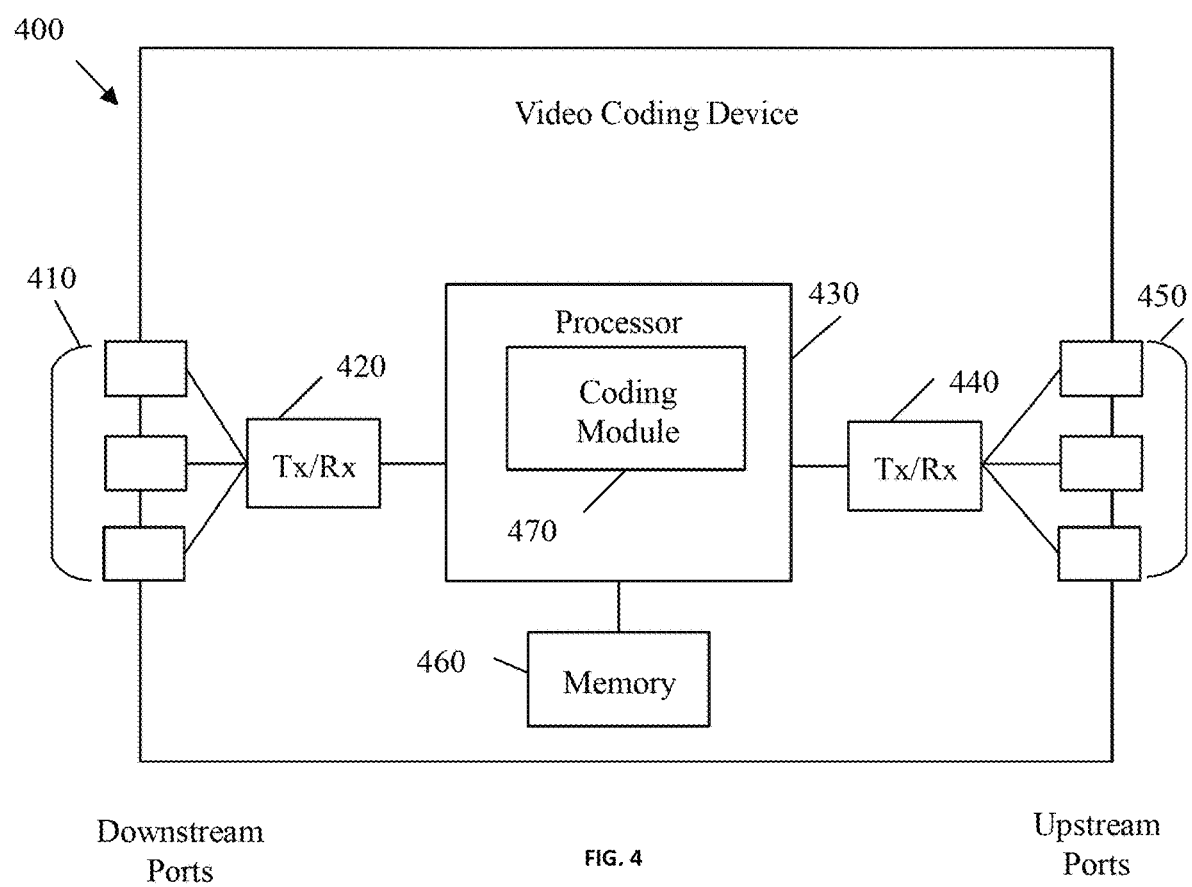
FIG. 4 is a block diagram illustrating an example of an encoding apparatus or a decoding apparatus.

FIG. 4 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 1A or an encoder such as video encoder 20 of FIG. 1A.

The video coding device 400 comprises ingress ports 410 (or input ports 410) and receiver units (Rx) 420 for receiving data; a processor, logic unit (e.g., logic circuit), or central processing unit (CPU) 430 to process the data; transmitter units (Tx, (e.g., transmitter circuits) 440 and egress ports 450 (or output ports 450) for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 may comprise one or more disks, tape drives, and solid-state drives (SSD) and may be used as an over-flow data storage device, to store programs when such programs are selected for execution, and to store instructions and data that are read during program execution. The memory 460 may be, for example, volatile and/or non-volatile and may be a read-only memory (ROM), random access memory (RAM), ternary content-addressable memory (TCAM), and/or static random-access memory (SRAM).

Figure 5:
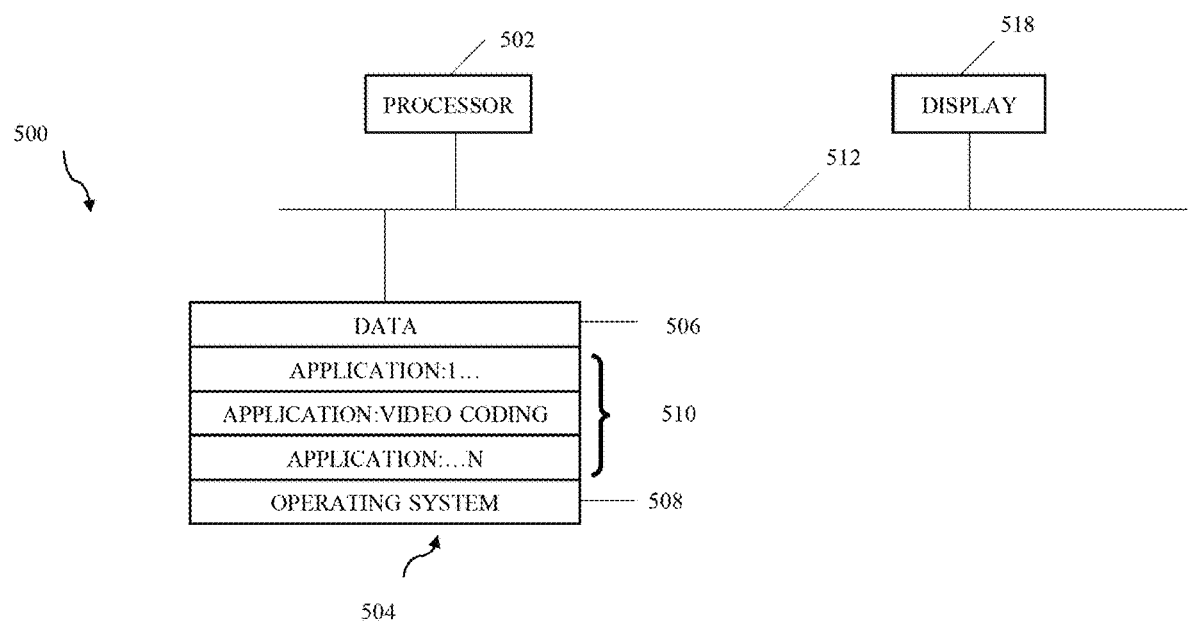
FIG. 5 is a block diagram illustrating another example of an encoding apparatus or a decoding apparatus.

FIG. 5 is a simplified block diagram of an apparatus 500 that may be used as either or both of the source device 12 and the destination device 14 from FIG. 1 according to an embodiment. A processor 502 in the apparatus 500 can be a CPU. Alternatively, the processor 502 can be any other type of device, or multiple devices, capable of manipulating or processing information now-existing or hereafter developed. Although the disclosed implementations can be practiced with a single processor as shown, (e.g., the processor 502) advantages in speed and efficiency can be achieved using more than one processor.

A memory 504 in the apparatus 500 can be a ROM device or a RAM device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here. The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512.

Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

High Level Signaling (HLS)

The high-level syntax provides the encapsulation for the coded video data for further processing. It structures the information for transport and makes it accessible and also searchable. It further provides means to code all specified high-level parameters and additional side information. In order to separate between the encoded information and the form in which this information is represented, a Video Coding Layer (VCL) and a Network Abstraction Layer (NAL) are defined. All VCL and non-VCL data are encapsulated in NAL units for transmission. These concepts are further detailed below. The high-level syntax scheme is conceptually inherited from H.265|HEVC and H.264|AVC with some revisions and extensions to match modified requirements and enable improved functionality.

Timing in HEVC

As part of the effort to separate different types of information to different and independent parts of the bitstream, the concept of time is an important aspect. Generally, information on the precise timing of pictures is not needed in the decoding process for the pictures, as the parameters for prediction do not necessarily relate to time. As an example, the distance between pictures is important for appropriate scaling of motion vector predictors. However, the expression of the distance does not need to relate to the actual picture rate. The distance can be expressed by the picture order count which indicates the play-out order of the decoded pictures.

While not required in the decoding process itself, timing information is of utmost importance for correct play-out of the pictures for display. This includes the play-out at a specified picture rate or synchronization with other information, specifically audio which is associated with the video signal. Furthermore, timing information is required for control of the coded and decoded picture buffers. Therefore, the timing information is not ignored but rather separated from the coded video data.

While some applications require a constant picture rate for display, other applications may treat the timing of pictures differently. For example, conversational applications may focus on a low delay between capture and display while a constant picture rate may be less important. Other special applications may code pictures at variable time distances, depending on the application needs. As a consequence, timing is classified as video usability information. If not present, the pictures can still be decoded conforming to the normative decoding process. If timing information is present, a normative interpretation is specified to enable correct play-out timing and buffer operation as indicated above.

Temporal Coding Structures

A video of a given number of pictures may be partitioned into one or multiple coded video sequences (CVS). Each CVS can be decoded independently from other coded video sequences that may be contained in the same bitstream. The output order of the pictures is the order in which the pictures have been generated (e.g. recorded or rendered), and in which the pictures should be output for display to resemble the picture order of the original input sequence for the intended visual impression. In the specification, the output order is represented by the picture order count (POC), which uniquely identifies a picture within the coded video sequence. Note that POC distance between two successive pictures does not need to be constant throughout the CVS. It is only required to be strictly increasing along the output order.

The coding order specifies the order in which pictures are reconstructed at the decoder, and thereby defines which pictures may be used for reference. Obviously, only previously decoded picture can be referred to for prediction. The dependencies between the pictures determine the coding structure of the coded video sequence. The coding structure includes a consecutive set of pictures in the sequence with a coding order and defined dependencies between the included pictures. The full video sequence may be represented by periodic repetition of this coding structure. The set of pictures that is included in the coding structure is often called a Group Of Pictures (GOP). In the context of the HEVC specification, this set is called a Structure of Pictures (SOP).

Sometimes, the first picture of a GOP in coding order is referred to as the anchor picture or key picture of the GOP. Note that these terms as well as the term Group of Pictures are not used in the specification. They are however commonly used in literature for description of such coding structures.

Since there is no dependency from any coded picture to a future picture in output order, the coding order of the pictures in fact corresponds to the output order (i.e. the order in which the pictures should be displayed). In the given example, each picture uses a single reference picture for prediction. Prediction from a single reference is called uni-prediction. Historically, such pictures are called P pictures. The coding structure further exhibits a certain hierarchy of the pictures. For example, the pictures with odd output numbers may be dropped without impacting the decodability of the other pictures. The coding structure of the other pictures is independent of these pictures. Similarly, every fourth picture can be decoded without impact from the intermediate pictures with even output numbers. Such a structure is called a hierarchical coding structure. In the given example using only P pictures, the coding structure is referred to as a hierarchical-P structure. It should be noted that uni-prediction of course may refer to a reference picture list including more than one reference picture for prediction. Still, for each block, only one reference picture can be used.

FIG. 6b provides an example for a coding structure with prediction arrows from past pictures as well as from future pictures. For this coding structure, the coding order is different from the output order (i.e. some pictures need to be stored until they are to be output). This induces the structural delay described earlier. Coding structures with references from the past and the future are typically used with bi-prediction, where the prediction for a picture is formed by the combination of two references. Such pictures are referred to as 'B pictures'. Like the P picture example, the presented structure exhibits a prediction hierarchy where the prediction dependencies are nested such that certain pictures may be dropped without impacting the decodability of the other pictures. Such a structure is called a 'hierarchical-B' coding structure.

There may be prediction relations between consecutive GOPs of a coding structure. An example for such prediction dependencies is the structure shown in FIG. 4.1b. Such a structure is called an Open-GOP coding structure: Pictures of one GOP reference pictures from a different GOP. Structures that omit inter-dependencies between consecutive GOPs are called Closed-GOP coding structures. An example for such a coding structure is given in FIG. 4.3. The structure shown here comprises I pictures (intra-only coded), P pictures, and B pictures and has been similarly used for encoding in H.262|MPEG-2 or MPEG-4 Visual.

The HEVC specification includes an SEI message (supplemental enhancement information, see Sect. X.X) on the 'structure of pictures' which can be used by the encoder to describe the used GOP structure, including the corresponding picture types, the applicable reference picture sets, and the temporal relation between the pictures in the GOP.

The coding structures in FIG. 6a are examples for dyadic hierarchical structures as the dependencies are dyadic. Hierarchical structures do not need to be dyadic but can also comprise other dependencies, see for example FIG. 6b.

Referring to FIG. 6a) Hierarchical-B coding structure with dyadic temporal nesting and four temporal layers is shown. Referring to FIG. 6b) Hierarchical-B coding structure with non-dyadic temporal nesting and three temporal layers is shown.

Temporal Layers

In VVC, a temporal layer concept very similar to the temporal layer concept for temporal scalability in H.265/HEVC and in H.264/AVC Annex G [4, 5] is available in the base specification. Each picture has an associated temporal level identifier TID. Random access pictures are specified to always have TID=0. With the concept of temporal layers, extracting a coded video sequence of lower temporal resolution from a given video sequence can be simply achieved by discarding all NAL units with TID larger than a selected value.

Furthermore, the feature of temporal nesting can be indicated in the VPS and SPS. If temporal nesting is indicated, pictures with lower TID must not refer to a picture with higher or equal TID for prediction within a GOP. Further, with temporal nesting activated it is always possible to switch the decoding from a lower temporal level to a higher temporal level (i.e. switching to a higher temporal resolution, starting from any decoded picture at the lower temporal resolution).

Figure 6:
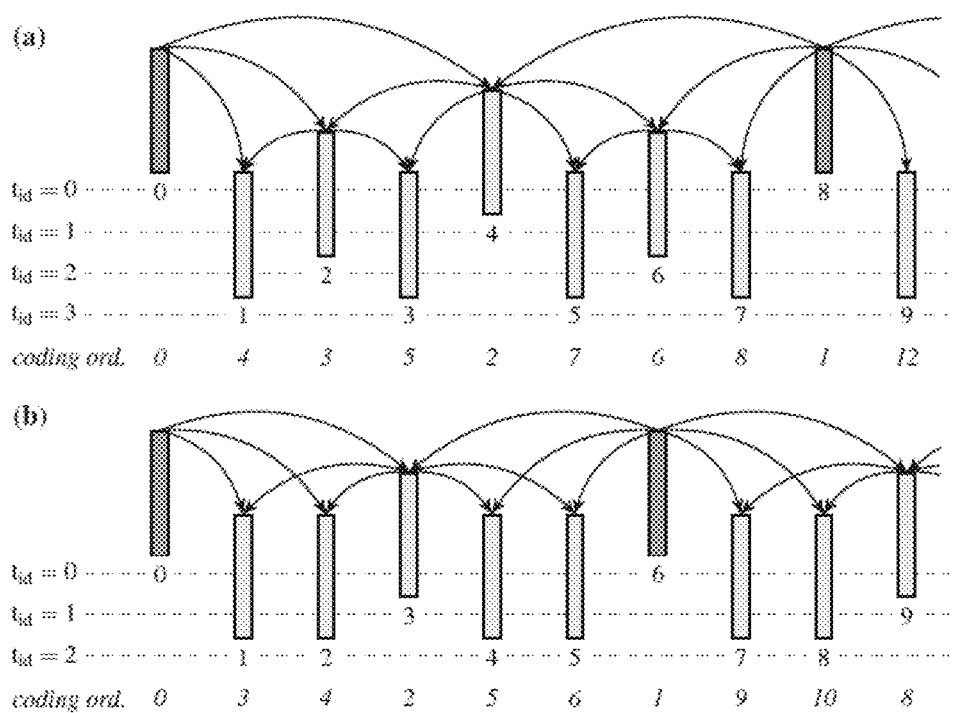
FIG. 6 illustrates examples for coding structures with a) dyadic temporal distribution output order and b) non-dyadic approaches.

Examples for coding structures with temporal nesting are shown in FIG. 6. In this presentation, the pictures are vertically arranged according to their temporal layer to ease the identification of the prediction relations. Since there is no dependency of pictures with lower TID to pictures with higher TID, decoding can be switched between the temporal layers at any picture. For example, the coding structure in FIG. 6a enables switching between 60, 30, 15, and 7.5 Hz, while the structure in FIG. 6b enables 60, 20, and 10 Hz output rate.

Sequence Parameter Set semantics sps_video_parameter_set_id specifies the value of the vps_video_parameter_set_id of the active VPS.

sps_max_sub_layers_minus1 plus 1 specifies the maximum number of temporal sub-layers that may be present in each CVS referring to the SPS. The value of sps_max_sub_layers_minus1 is to be in the range of 0 to 6, inclusive. sps_temporal_id_nesting_flag, when sps_max_sub_layers_minus1 is greater than 0, specifies whether inter prediction is additionally restricted for CVSs referring to the SPS. When vps_temporal_id_nesting_flag is equal to 1, sps_temporal_id_nesting_flag may be equal to 1. When sps_max_sub_layers_minus1 is equal to 0, sps_temporal_id_nesting_flag may be equal to 1.

NOTE 1—The syntax element sps_temporal_id_nesting_flag is used to indicate that temporal up-switching, or in other words, switching from decoding up to any TemporalId tIdN to decoding up to any TemporalId tIdM that is greater than tIdN, is always possible in the CVS.

General Decoding Process

Input to this process is a bitstream. Output of this process is a list of decoded pictures.

The decoding process is specified such that all decoders that conform to a specified profile and level will produce numerically identical cropped decoded output pictures when invoking the decoding process associated with that profile for a bitstream conforming to that profile and level. Any decoding process that produces identical cropped decoded output pictures to those produced by the process described herein (with the correct output order or output timing, as specified) conforms to the decoding process requirements of this Specification.

For each CVS in the bitstream, the list TargetLayerIdList, which identifies the list of target layers to be decoded, and the variable HighestTid, which identifies the highest temporal sub-layer to be decoded, are specified as follows:

If some external means, not specified in this Specification, is available to set TargetLayerIdList, TargetLayerIdList is set by the external means.

If some external means, not specified in this Specification, is available to set TargetLayerIdList, TargetLayerIdList is set by the external means.

Otherwise, if vps_all_independent_layers_flag is equal to 1, TargetLayerIdList is set to contain only vps_layer_id [0].

Otherwise, TargetLayerIdList is set to contain vps_layer_id[i] for i in the range of 0 to vps_max_layers_minus1, inclusive.

If some external means, not specified in this Specification, is available to set HighestTid, HighestTid is set by the external means.

Otherwise, HighestTid is set equal to sps_max_sub_layers_minus1.

The variable DecodingUnitHrdFlag is specified as follows:

If the decoding process is invoked in a bitstream conformance test as specified in clause C.1, DecodingUnitHrdFlag is set as specified in clause C.1.

Otherwise, DecodingUnitHrdFlag is set equal to decoding_unit_hrd_params_present_flag.

For each CVS in the bitstream, the sub-bitstream extraction process as specified in clause 10 is applied with the CVS, TargetLayerIdList, and HighestTid as inputs, and the output is assigned to a bitstream referred to as CvsToDecode. After that, the instances of CvsToDecode of all the CVSs are concatenated, in decoding order, and the result is assigned to the bitstream BitstreamToDecode.

Video Usability Information

The Video Usability Information (VUI) syntax structure collects information that is useful for preparing the decoded video for output and display. The VUI can be sent as part of the SPS, but can also be passed to the decoder by other means (e.g. hard coded or by out-of-band transmission).

The information contained in the VUI is not required by the decoding process itself. The decoding process generates the sample values of the reconstructed pictures and determines the order in which the pictures are output. The VUI provides the possibility to signal information like the sample aspect ratio (i.e. the shape of the samples), the original color space and representation of the encoded video, or, as another important aspect, picture timing information. The different parts of the VUI are briefly described in the following subsections. The inclusion of each of the parts in the VUI syntax structure is optional and can be decided as utilized in application. Default values are specified for all VUI parameters for cases where the corresponding VUI parameters have not been provided.

A.1.1 VUI Parameters Syntax

|  | Descriptor |
| --- | --- |
| vui_parameters( ) { |  |
|   aspect_ratio_info_present_flag | u(1) |
|   ... |  |
|   vui_timing_info_present_flag | u(1) |
|   if( vui_timing_info_present_flag ) { |  |
|     vui_num_units_in_tick | u(32) |
|     vui_time_scale | u(32) |
|     vui_poc_proportional_to_timing_flag | u(1) |
|     if( vui_poc_proportional_to_timing_flag ) |  |

-continued

| | Descriptor |
|---|---|
| vui_num_ticks_poc_diff_one_minus1 | ue(v) |
| vui_hrd_parameters_present_flag | u(1) |
| if( vui_hrd_parameters_present_flag ) | |
|     hrd_parameters( 1, sps_max_sub_layers_ | |
|     minus1 ) | |
| } | |
| ... | |
| } | | vui_timing_info_present_flag equal to 1 specifies that vui_num_units_in_tick, vui_time_scale, vui_poc_proportional_to_timing_flag, and vui_hrd_parameters_present _ flag are present in the vui_parameters( ) syntax structure. vui_timing_info_present_flag equal to 0 specifies that vui_num_units_in_tick, vui_time_scale, vui_poc_proportional_to_timing_flag, and vui_hrd_parameters_present_flag are not present in the vui_parameters( ) syntax structure.

vui_num_units_in_tick is the number of time units of a clock operating at the frequency vui_time_scale Hz that corresponds to one increment (called a clock tick) of a clock tick counter. vui_num_units_in_tick is to be greater than 0. A clock tick, in units of seconds, is equal to the quotient of vui_num_units_in_tick divided by vui_time_scale. For example, when the picture rate of a video signal is 25 Hz, vui_time_scale may be equal to 27 000 000 and vui_num_units_in_tick may be equal to 1 080 000, and consequently a clock tick may be equal to 0.04 seconds.

When vps_num_units_in_tick is present in the VPS referred to by the SPS, vui_num_units_in_tick, it is to be equal to vps_num_units_in_tick. vui_time_scale is the number of time units that pass in one second. For example, a time coordinate system that measures time using a 27 MHz clock has a vui_time_scale of 27 000 000. The value of vui_time_scale is to be greater than 0.

When vps_time_scale is present in the VPS referred to by the SPS, vui_time_scale, it is to be equal to vps_time_scale.

vui_poc_proportional_to_timing_flag equal to 1 indicates that the picture order count value for each picture in the CVS that is not the first picture in the CVS, in decoding order, is proportional to the output time of the picture relative to the output time of the first picture in the CVS. vui_poc_proportional_to_timing_flag being equal to 0 indicates that the picture order count value for each picture in the CVS that is not the first picture in the CVS, in decoding order, may or may not be proportional to the output time of the picture relative to the output time of the first picture in the CVS.

When vps_poc_proportional_to_timing_flag is present in the VPS referred to by the SPS and the value is equal to 1, vui_poc_proportional_to_timing_flag is to equal to 1.

vui_num_ticks_poc_diff_one_minus1 plus 1 specifies the number of clock ticks corresponding to a difference of picture order count values equal to 1. The value of vui_num_ticks_poc_diff_one_minus1 is to be in the range of 0 to $2^{32}-2$, inclusive.

When vps_num_ticks_poc_diff_one_minus1 is present in the VPS referred to by the SPS, vui_num_ticks_poc_diff_one_minus1 it is to be equal to sps_num_ticks_poc_diff_one_minus1.

Supplemental Enhancement Information

Supplemental Enhancement Information (SEI) messages contain information which is not required for the decoding process and the reconstruction of the coded video sequence. SEI messages may be helpful though for the decoder to determine certain features of the coded video sequence that otherwise might be complicated to be derived. Further information, such as regarding display of the sequence or additional side information that are to be attached and integrated into the coded bitstream for transport, can be encoded into specific SEI messages. Dedicated SEI messages can be of further help for error recovery or for testing of the picture integrity. SEI messages are classified either as prefix SEI messages or as suffix SEI messages, indicating if the SEI must occur before the last VCL NAL unit or after the first VCL NAL unit in the access unit, respectively.

Besides the distinction between prefix and suffix SEI messages, the concept of SEI messages has been inherited from H.264|AVC. A subset of the SEI messages specified in H.264|AVC have also been specified for HEVC. The payload types indices of these identical SEI messages are synchronized between the two specifications in order to avoid confusion. Some H.264|AVC SEI messages have not been considered useful in the context of HEVC and are therefore no longer provided in the specification.

An overview of the SEI messages specified in HEVC is provided in Table 5.2 for the prefix SEI messages and in Table 5.3 for the suffix SEI messages. Note that some SEI messages can be sent either as a prefix or as a suffix SEI message. The SEI messages have a specified persistence that indicates for which NAL units the information contained in the SEI message is valid. The persistence is indicated in Tables 5.2 and 5.3 as well. Many SEI messages persist for the access unit they are coded in. Others may persist for the whole coded video sequence or until an update is provided by a new SEI message of the same payload type. Multiple SEI messages can be contained in an SEI message NAL unit. Each SEI message is identified by an SEI payload type index and an SEI payload size, where an SEI message always consists of an integer number of bytes. Tables 5.2 and 5.3 include a brief characterization of the functionality provided by each SEI message.

TABLE 1

Related SEI messages

| Payload type | SEI message | Summary |
|---|---|---|
| 1 | Picture timing | Indication of coded and decoded picture buffer delay. Applies to the associated AU |
| 128 | Structure of pictures information | Describes the coding structure including used reference picture set for a SOP. Persists for the AUs associated to the SOP |

TABLE 1-continued

Related SEI messages

| Payload type | SEI message | Summary |
|---|---|---|
| 131 | Temporal sub-layer zero index | Detection of loss of pictures with tid = 0, including unique identification of IRAP pictures. Applies to the associated AU |
| 133 | Scalable nesting | Wraps other SEI messages which are dedicated to a specified layer or temporal sub-layer. Persistence depends on included SEI messages |

| Picture timing SEI message syntax | Descriptor |
|---|---|
| pic_timing( payloadSize ) { | |
|   if( frame_field_info_present_flag ) { | |
|     pic_struct | u(4) |
|     source_scan_type | u(2) |
|     duplicate_flag | u(1) |
|   } | |
|   if( CpbDpbDelaysPresentFlag ) { | |
|     au_cpb_removal_delay_minus1 | u(v) |
|     pic_dpb_output_delay | u(v) |
|     if( sub_pic_hrd_params_present_flag ) | |
|       pic_dpb_output_du_delay | u(v) |
|     if( sub_pic_hrd_params_present_flag && | |
|       sub_pic_cpb_params_in_pic_timing_sei_flag ) { | |
|       num_decoding_units_minus1 | ue(v) |
|       du_common_cpb_removal_delay_flag | u(1) |
|       if( du_common_cpb_removal_delay_flag ) | |
|         du_common_cpb_removal_delay_increment_minus1 | u(v) |
|       for( i = 0; i <= num_decoding_units_minus1; i++ ) { | |
|         num_nalus_in_du_minus1[ i ] | ue(v) |
|         if( !du_common_cpb_removal_delay_flag && i < num_decoding_units_minus1 ) | |
|           du_cpb_removal_delay_increment_minus1[ i ] | u(v) |
|       } | |
|     } | |
|   } | |
| } | |

Picture Timing SEI Message Semantics

The picture timing SEI message provides CPB removal delay and DPB output delay information for the access unit associated with the SEI message.

The following applies for the picture timing SEI message syntax and semantics:

The syntax elements and variable sub_pic_hrd_params_present_flag, subpic_cpb_params_in_pic_timing_sei_flag, au_cpb_removal_delay_length_minus1, dpb_output_delay_length_minus1, dpb_output_delay_du_length_minus1, du_cpb_removal_delay_increment_length_minus1, and CpbDpbDelaysPresentFlag are found in or derived from syntax elements found in the hrd_parameters( ) syntax structure that is applicable to at least one of the operation points to which the picture timing SEI message applies.

The bitstream (or a part thereof) refers to the bitstream subset (or a part thereof) associated with any of the operation points to which the picture timing SEI message applies.

The presence of picture timing SEI messages for an operation point is specified as follows:

If frame_field_info_present_flag is equal to 1 or CpbDpbDelaysPresentFlag is equal to 1, a picture timing SEI message applicable to the operation point is to be associated with every access unit in the CVS.

Otherwise, in the CVS there is not to be no access unit that is associated with a picture timing SEI message applicable to the operation point.

pic_struct indicates whether a picture should be displayed as a frame or as one or more fields . . .

au_cpb_removal_delay_minus1 plus 1 specifies the number clock ticks between the nominal CPB removal time of the access unit associated with the picture timing SEI message and the preceding access unit in decoding order that contained a buffering period SEI message. This value is also used to calculate an earliest possible time of arrival of access unit data into the CPB for the HSS. The syntax element is a fixed length code whose length in bits is given by au_cpb_removal_delay_length_minus1+1.

NOTE 6—The value of au_cpb_removal_delay_length_minus1 that determines the length (in bits) of the syntax element au_cpb_removal_delay_minus1 is the value of au_cpb_removal_delay_length_minus1 coded in the VPS or the SPS that is active for the coded picture associated with the picture timing SEI message, although au_cpb_removal_delay_minus1 specifies a number of clock ticks relative to the removal time of the preceding access unit containing a buffering period SEI message, which may be an access unit of a different CVS.

The variable AuCpbRemovalDelayMsb of the current picture is derived as follows:

If the current picture is associated with a buffering period SEI message that is applicable to at least one of the operation points to which the picture timing SEI message applies, AuCpbRemovalDelayMsb is set equal to 0.

Otherwise, the following applies:

Let maxCpbRemovalDelay be equal to $2^{au\_cpb\_removal\_delay\_length\_minus1+1}$.

Let prevAuCpbRemovalDelayMinus1 and prevAuCpbRemovalDelayMsb be set equal to au_cpb_removal_delay_minus1 and AuCpbRemovalDelayMsb, respectively, of the previous picture in decoding order that has TemporalId equal to 0, that is not a RASL, RADL or sub-layer non-reference picture, and that is within the same buffering period as the current picture.

-AuCpbRemovalDelayMsb is derived as follows:
if( au_cpb_removal_delay_minus1 <= prevAuCpbRemovalDelayMinus1 )
    AuCpbRemovalDelayMsb = prevAuCpbRemovalDelayMsb + maxCpbRemovalDelay
    (D-1)

-continued

```
else
    AuCpbRemovalDelayMsb = prevAuCpbRemovalDelayMsb
The variable AuCpbRemovalDelayVal is derived as follows:
AuCpbRemovalDelayVal = AuCpbRemovalDelayMsb +
au_cpb_removal_delay_minus1 + 1
    (D-2)
```

The value of AuCpbRemovalDelayVal shall be in the range of 1 to $2^{32}$, inclusive. Within one buffering period, the AuCpbRemovalDelayVal values for any two access units shall not be the same.

pic_dpb_output_delay is used to compute the DPB output time of the picture when SubPicHrdFlag is equal to 0. It specifies how many clock ticks to wait after removal of the last decoding unit in an access unit from the CPB before the decoded picture is output from the DPB.

NOTE 7—A picture is not removed from the DPB at its output time when it is still marked as "used for short-term reference" or "used for long-term reference".

The length of the syntax element pic_dpb_output_delay is given in bits by dpb_output_delay_length_minus1+1. When sps_max_dec_pic_buffering_minus1 [minTid] is equal to 0, where minTid is the minimum of the OpTid values of all operation points the picture timing SEI message applies to, pic_dpb_output_delay shall be equal to 0.

The output time derived from the pic_dpb_output_delay of any picture that is output from an output timing conforming decoder is to precede the output time derived from the pic_dpb_output_delay of all pictures in any subsequent CVS in decoding order. The picture output order established by the values of this syntax element is to be the same order as established by the values of PicOrderCntVal.

For pictures that are not output by the "bumping" process because they precede, in decoding order, an IRAP picture with NoRaslOutputFlag equal to 1 that has no_output_of_prior_pics_flag equal to 1 or inferred to be equal to 1, the output times derived from pic_dpb_output_delay is to be increasing with increasing value of PicOrderCntVal relative to all pictures within the same CVS.

pic_dpb_output_du_delay is used to compute the DPB output time of the picture when SubPicHrdFlag is equal to 1. It specifies how many sub clock ticks to wait after removal of the last decoding unit in an access unit from the CPB before the decoded picture is output from the DPB.

The length of the syntax element pic_dpb_output_du_delay is given in bits by dpb_output_delay_du_length_minus1+1.

The output time derived from the pic_dpb_output_du_delay of any picture that is output from an output timing conforming decoder is to precede the output time derived from the pic_dpb_output_du_delay of all pictures in any subsequent CVS in decoding order.

The picture output order established by the values of this syntax element is to be the same order as established by the values of PicOrderCntVal.

For pictures that are not output by the "bumping" process because they precede, in decoding order, an IRAP picture with NoRaslOutputFlag equal to 1 that has no_output_of_prior_pics_flag equal to 1 or inferred to be equal to 1, the output times derived from pic_dpb_output_du_delay is to be increasing with increasing value of PicOrderCntVal relative to all pictures within the same CVS.

For any two pictures in the CVS, the difference between the output times of the two pictures when SubPicHrdFlag is equal to 1 is to be identical to the same difference when SubPicHrdFlag is equal to 0.

| Structure of pictures information SEI message syntax | Descriptor |
|---|---|
| structure_of_pictures_info( payloadSize ) { | |
|   sop_seq_parameter_set_id | ue(v) |
|   num_entries_in_sop_minus1 | ue(v) |
|   for( i = 0; i <= num_entries_in_sop_minus1; i++ ) { | |
|     sop_vcl_nut[ i ] | u(6) |
|     sop_temporal_id[ i ] | u(3) |
|     if( sop_vcl_nut[ i ] != IDR_W_RADL && sop_vcl_nut[ i ] != IDR_N_LP ) | |
|       sop_short_term_rps_idx[ i ] | ue(v) |
|     if( i > 0 ) | |
|       sop_poc_delta[ i ] | se(v) |
|   } | |
| } | |

Persistence information for SEI messages is informatively summarized in Table 2.

TABLE 2

Persistence scope of related SEI messages (informative)

| SEI message | Persistence scope |
|---|---|
| Picture timing | The access unit containing the SEI message |
| Structure of pictures information | The set of access units in the CVS that correspond to entries listed in the SEI message |
| Temporal sub-layer zero index | The access unit containing the SEI message |
| Scalable nesting | Depending on the nested SEI messages. Each nested SEI message has the same persistence scope as if the SEI message was not nested |

Hypothetical Reference Decoder (HRD)

When compressing digital video, the encoder usually attempts to maintain the image quality nearly uniform throughout the video sequence, since drops or changes in video quality result in poor viewing experiences. To achieve this, the encoder must assign more bits to video frames or segments that are more difficult to compress (e.g., those that contain more textured regions or faster motion) and fewer bits to easier video segments, and as a result the encoding bit rate may vary significantly over time. Since compressed digital video is often transmitted through channels of (nearly) constant bit rate, the bit-rate variations need to be smoothed using buffering mechanisms at the encoder and decoder. The sizes of the physical buffers are finite, and hence the encoder must constrain the bit-rate variations to fit within the buffer limitations. Video coding standards do not mandate specific encoder or decoder buffering mechanisms, but they require encoders to control bit-rate fluctuations so that a hypothetical reference decoder (HRD) of a given buffer size would decode the video bit stream without suffering from buffer overflow or underflow. This hypothetical decoder is based on an idealized decoder model that decoder manufacturers can use as a reference for their implementations, but its main goal is to impose basic buffering constraints on the bit-rate variations of compliant bit streams.

An HRD usually assumes that the decoding and display times preserve some pre-defined constraints, such as a fixed frame rate, and the system's end-to-end delay is constant (e.g., for broadcast applications).

Picture Order Count

As in H.264|AVC, the concept of time, or in other words, the temporal relation between pictures in the video sequence, is not directly used in the coded representation.

Instead, the relation of the pictures in terms of ordering and distance if used for prediction is expressed by the POC.

The POC value is an index number that defines the output position of the current picture in the coded video sequence. As an important feature, the POC value is used to identify the picture in the decoded picture buffer. For identification purpose, the value of POC is required to be strictly increasing with the output order of the coded pictures. The POC value of IDR pictures is specified to always be pocIDR=0.

For an efficient representation, the POC value is not directly coded in the syntax. Instead, it is represented by a least significant part poclsb which is encoded in the slice segment header. This value must be identical for all slice segments in the picture.

Additionally, a most significant part pocmsb is derived during the decoding process. The available POC number range is specified by the value Npoc in the sequence parameter set which determines the maximum value of poclsb as Max(poclsb)=2Npoc−1, with 4≤Npoc≤16.

The value of pocmsb is updated during the decoding process. For derivation, the poclsb and pocmsb values of the last picture with tid=0 are used. These are denoted by pocmsb,prev and poclsb,prev. The values are used to determine a potential modification of pocmsb for the current picture.

If poclsb<poclsb,prev and (poclsb,prev−poclsb)≥2Npoc−1, pocmsb=pocmsb+2Npoc.

Otherwise, if poclsb>poclsb,prev and (poclsb−poclsb,prev)>2Npoc−1, pocmsb=pocmsb−2Npoc.

Otherwise, pocmsb is not updated.

The POC value pocc of the current picture is finally derived as pocc=pocmsb+poclsb. The number range for pocc is restricted to −231≤pocc≤231−1, with a maximum POC difference between two pictures A and B within −215≤(pocc,A−pocc,B)≤215−1.

Conceptually, the values of POC do not need to be changing with constant delta. The values pocc of the coded pictures can be chosen by the encoder. Since POC is used for scaling motion vectors, for example, for derivation of appropriate candidates for merge mode, POC values should be chosen such that the distance between pictures can be represented appropriately by POC deltas.

The VPS contains a flag to indicate if a delta of POC values relates to the time difference between the corresponding coded pictures. In this case, POC is proportional to the time interval between successive pictures. This option can be used to, for example, synchronize the POC values of coded pictures to their capture time distance. This option can be useful, for example, to apply appropriate motion vector scaling in sequences with irregular picture capture times.

Problem Description

Layered (scalable) approach is included into the specification in order to provide adaptation to variable channel bandwidth and for error resilience needs. Temporal sub-layers is a part of such approach and is the only approach supported by the VVC draft of specification at the time when this document is written.

In most of classic scenarios, the dyadic structure of GOP corresponds with the temporal layers structure. This design is supported by simple matching of POC values with corresponding output time delays that are signaled and derived, according to VUI picture timing information with vui_poc_proportional_to_timing_flag being equal to one. That means that the amount of pictures to decode and pictures to display are the same and POC value of each picture corresponds to appropriate picture output delay/time. The bit-stream may include information that only parts of the decoded video are displayed.

Following the common use-case scenarios with dyadic structure of GOP and vui_poc_proportional_to_timing_flag being equal to one, the redundancy of signaling of temporal IDs and POC values can be observed. For example the least significant bit of POC values corresponded to pictures with Highest temporal ID is equal to 1 and otherwise this bit is zero. With an increased attention the higher overhead could be observed. Having more granularity in partitioning of the picture by slices the overhead became higher.

For instance, with the tiling and slicing of the pictures and at high-resolution video for parallelization purposes or for supporting sub-bitstream extraction or other cases the amount of slices is growing. The resolution could be as high as 8K resolution (7680×4320) or even higher with possible partitioning on 60×34=2040 independent tiles/slices (in some cases slice could be lower than tile and one tile could contain more than one slices). The picture rate could be also high, for example, 120 frames per second (e.g., fps, where higher fps usually requires parallelization and high granularity of tiles). In the provided example, the one extra bit in the slice header will lead to an overhead of 245 Kbit/s. Moreover, higher fps leads to reduction of residual data due to better prediction of neighbor pictures in temporal domain, and thus increasing the portion of hypertext transfer/transfer protocol (HTTP) Live streaming protocol (HLS) in a stream. The well-known scenario for such applications is video surveillance with mostly unchanged content. These use cases make the weight of HLS and particularly slice header portion in bit-stream noticeable.

Proposed Solution

In order to solve the problems listed above, this disclosure discloses the following aspects (each of them can be applied individually and some of them can be applied in combination):

1) To derive Least Significant Bits of Picture Order Counter (POC_LSB) depending on layer IDs by the following steps:
   a. To signal the flag of dyadic temporal ID distribution denoted fixed picture rate for all sub-layers within bit-stream or CVS
      i. signaling dyadic_temporal_nesting_flag in general_hrd_parameters( ) syntax elements or in Sequence Parameters Set (SPS)
         1. To signal dyadic temporal ID distribution flag conditionally based on SPS flag of presence dyadic temporal ID distribution flag in bit-stream
      ii. setting the value of a dyadic_temporal_nesting_flag is equal to 1 by default (when not present)
      iii. setting the value of a parameter vui_poc_proportional_to_timing_flag to 1 when dyadic_temporal_nesting_flag is equal to 1
      iv. setting the value of a fixed_pic_rate_general_flag to 1 when dyadic_temporal_nesting_flag is equal to 1
      v. setting the value of a fixed_pic_rate_within_cvs_flag to 1 when dyadic_temporal_nesting_flag is equal to 1;
      vi. and processing the bit-stream based on the fixed_pic_rate_general_flag.
   b. For slices associated with SPS contained dyadic_temporal_nesting_flag equal to 1 and non-zero Highest TID perform the following:

i. To reduce the bit budged of signaling slice_pic_order_cnt_lsb by one bit
ii. To derive last bit of slice_pic_order_cnt_lsb as (TID==Highest TID)
  1. Where Highest TID is equal to sps_max_sub_layers_minus1 plus 1
  2. To derive PicOrderCntLsb=(slice_pic_order_cnt_lsb<<1)+(TID==Highest TID)
  3. To derive PicOrderCntVal=PicOrderCntMsb+PicOrderCntLsb
c. In another possible implementation form for slices associated with SPS contained dyadic_temporal_nesting_flag equal to 1 perform the following:
  i. To reduce the bit budged of signaling slice_pic_order_cnt_lsb by the value POC_by_TID_len= (Highest TID−TID+(TID>0))
  ii. To derive last bit of slice_pic_order_cnt_lsb as follows
    1. use Highest TID is equal to sps_max_sub_layers_minus1 plus 1
    2. To derive PicOrderCntLsb= (slice_pic_order_cnt_lsb<<POC_by_TID_len) |+((TID>0)<<(Highest TID−TID+(TID==0)))
    3. To derive PicOrderCntLsb= (slice_pic_order_cnt_lsb<<POC_by_TID_len) |+((TID>0)<<(POC_by_TID_len−1))
    4. To derive PicOrderCntVal=PicOrderCntMsb+PicOrderCntLsb 2) Derivation of POC value defined by the approach described in item 1)a-1)b is described in the embodiment 1 below in this document.

3) Derivation of POC value defined by the approach described in item 1)a, 1)c is described in the embodiment 2 below in this document.

The First Embodiment of the Present Disclosure

This clause documents the embodiment of aspect 1) of the disclosure as summarized above. The description is in relative to the basis text, which is the draft of VVC specification in JVET contribution JVET-O2001-vE. In other words, only the delta is described, while the texts in the basis text that are not mentioned below apply as they are. Modified text relative to the basis text is bolded. The modification of POC derivation process is proposed in order to reduce signaling overhead by using Temporal ID value as part of POC LSB.

According to this first embodiment, the last bit of the Least Significant Bits of Picture Order Counter (POC_LSB) is omitted, in other words, not inserted into the bitstream on the encoding side. On the decoding side, this missing bit is derived to be 1 if the Temporal ID value is equal to the highest Temporal ID value in the coded video sequence, CVS, and to be 0 otherwise. In order to code whether the distribution of Temporal IDs is dyadic, the new flag "dyadic_temporal_nesting_flag" is proposed to be coded in SPS in this embodiment.

7.3.2.3 Sequence Parameter Set RBSP Syntax

|  | Descriptor |
|---|---|
| seq_parameter_set_rbsp( ) { |  |
|   sps_decoding_parameter_set_id | u(4) |
|   sps_video_parameter_set_id | u(4) |
|   sps_max_sub_layers_minus1 | u(3) |
|   sps_reserved_zero_5bits | u(5) |
|   profile_tier_level( sps_max_sub_layers_minus1 ) |  |
|   gdr_enabled_flag | u(1) |
|   sps_seq_parameter_set_id | ue(v) |
|   chroma_format_idc | ue(v) |
|   if( chroma_format_idc = = 3 ) |  |
|     separate_colour_plane_flag | u(1) |
|   pic_width_max_in_luma_samples | ue(v) |
|   pic_height_max_in_luma_samples | ue(v) |
|   subpics_present_flag | u(1) |
|   if( subpics_present_flag ) { |  |
|     max_subpics_minus1 | u(8) |
|     subpic_grid_col_width_minus1 | u(v) |
|     subpic_grid_row_height_minus1 | u(v) |
|     for( i = 0; i < NumSubPicGridRows; i++ ) |  |
|       for( j = 0; j < NumSubPicGridCols; j++ ) |  |
|         subpic_grid_idx[ i ][ j ] | u(v) |
|     for( i = 0; i <= NumSubPics; i++ ) { |  |
|       subpic_treated_as_pic_flag[ i ] | u(1) |
|       loop_filter_across_subpic_enabled_flag[ i ] | u(1) |
|     } |  |
|   } |  |
|   bit_depth_luma_minus8 | ue(v) |
|   bit_depth_chroma_minus8 | ue(v) |
|   min_qp_prime_ts_minus4 | ue(v) |
|   dyadic_temporal_nesting_flag | u(1) |
|   log2_max_pic_order_cnt_lsb_minus4 | ue(v) |
|   if( sps_max_sub_layers_minus1 > 0 ) |  |
|     sps_sub_layer_ordering_info_present_flag | u(1) |
|   for( i =( sps_sub_layer_ordering_info_present_flag ? 0 : sps_max_sub_layers_minus1 ); |  |
|     i <= sps_max_sub_layers_minus1; i++ ) { |  |
|     sps_max_dec_pic_buffering_minus1[ i ] | ue(v) |
|     sps_max_num_reorder_pics[ i ] | ue(v) |
|     sps_max_latency_increase_plus1[ i ] | ue(v) |
|   } |  |
|   long_term_ref_pics_flag | u(1) |
|   inter_layer_ref_pics_present_flag | u(1) |
|   sps_idr_rpl_present_flag | u(1) |
|   } |  |
|   sps_scaling_list_enabled_flag | u(1) |
|   hrd_parameters_present_flag | u(1) |
|   if( general_hrd_parameters_present_flag ) { |  |
|     num_units_in_tick | u(32) |
|     time_scale | u(32) |
|     sub_layer_cpb_parameters_present_flag | u(1) |
|     if( sub_layer_cpb_parameters_present_flag ) |  |
|       general_hrd_parameters( 0, sps_max_sub_layers_minus1 ) |  |
|     else |  |
|       general_hrd_parameters( sps_max_sub_layers_minus1, sps_max_sub_layers_minus1 ) |  |
|   } |  |
|   vui_parameters_present_flag | u(1) |
|   if( vui_parameters_present_flag ) |  |
|     vui_parameters( ) |  |
|   sps_extension_flag | u(1) |
|   if( sps_extension_flag ) |  |
|     while( more_rbsp_data( ) ) |  |
|       sps_extension_data_flag | u(1) |
|   rbsp_trailing_bits( ) |  |
| } |  |

7.3.4.1 General HRD Parameters Syntax

|  | Descriptor |
|---|---|
| general_hrd_parameters( firstSubLayer, maxNumSubLayersMinus1 ) { |  |
|   general_nal_hrd_parameters_present_flag | u(1) |
|   general_vcl_hrd_parameters_present_flag | u(1) |
|   if( general_nal_hrd_parameters_present_flag || |  |
|     general_vcl_hrd_parameters_present_flag ) { |  |
|     decoding_unit_hrd_params_present_flag | u(1) |
|     if( decoding_unit_hrd_params_present_flag ) { |  |

| | Descriptor |
|---|---|
| tick_divisor_minus2 | u(8) |
| decoding_unit_cbp_params_in_pic_timing_sei_flag | u(1) |
| } | |
| bit_rate_scale | u(4) |
| cpb_size_scale | u(4) |
| if( decoding_unit_hrd_params_present_flag ) | |
|   cpb_size_du_scale | u(4) |
| } | |
| for( i = firstSubLayer; i <= maxNumSubLayersMinus1; i++ ) { | |
|   if ( !dyadic_temporal_nesting_flag ) | |
|     fixed_pic_rate_general_flag[ i ] | u(1) |
|   if( !fixed_pic_rate_general_flag[ i ] ) | |
|     fixed_pic_rate_within_cvs_flag[ i ] | u(1) |
|   if( fixed_pic_rate_within_cvs_flag[ i ] ) | |
|     elemental_duration_in_tc_minus1[ i ] | ue(v) |
|   else | |
|     low_delay_hrd_flag[ i ] | u(1) |
|   if( !low_delay_hrd_flag[ i ] ) | |
|     hrd_cpb_cnt_minus1[ i ] | ue(v) |
|   if( general_nal_hrd_parameters_present_flag ) | |
|     sub_layer_hrd_parameters( i ) | |
|   if( general_vcl_hrd_parameters_present_flag ) | |
|     sub_layer_hrd_parameters( i ) | |
| } | |
| } | | dyadic_temporal_nesting_present_flag being equal to 1 indicates that dyadic_temporal_nesting_flag is present in the SPS RBSP syntax. dyadic_temporal_nesting_present_flag being equal to 0 indicates that dyadic_temporal_nesting_flag is not present in the SPS RBSP syntax.

dyadic_temporal_nesting_flag being equal to 1 specifies that the Temporal IDs are distributed hierarchically with dyadic dependencies. dyadic_temporal_nesting_flag being equal to 0 otherwise. When dyadic_temporal_nesting_flag is present the variable PocByTidLen is set equal to the value of this flag, otherwise PocByTidLen is set equal to zero.

sps_max_sub_layers_minus1 plus 1 specifies the maximum number of temporal sub-layers that may be present in each CVS referring to the SPS. The value of sps_max_sub_layers_minus1 is to be in the range of 0 to 6, inclusive. The variable MaxTemporalID is set equal to sps_max_sub_layers_minus1 plus 1.

log 2_max_pic_order_cnt_lsb_minus4 specifies the value of the variable MaxPicOrderCntLsb that is used in the decoding process for picture order count as follows:

$$\text{MaxPicOrderCntLsb} = 2^{(log\_2\_max\_pic\_order\_cnt\_lsb\_minus4+4)} \quad (7\text{-}13)$$

The value of log 2_max_pic_order_cnt_lsb_minus4 is to be in the range of 0 to 12, inclusive.

slice_pic_order_cnt_lsb specifies the picture order count modulo MaxPicOrderCntLsb for the current picture. The length of the slice_pic_order_cnt_lsb syntax element is log 2_max_pic_order_cnt_lsb_minus4+4−PocByTidLen bits. The value of the slice_pic_order_cnt_lsb is to be in the range of 0 to MaxPicOrderCntLsb−1, inclusive.

8.3 Slice Decoding Process 8.3.1 Decoding Process for Picture Order Count

Output of this process is PicOrderCntVal, the picture order count of the current picture. Each coded picture is associated with a picture order count variable, denoted as PicOrderCntVal. When the current picture is not a CLVSS picture, the variables prevPicOrderCntLsb and prevPicOrderCntMsb are derived as follows:

Let prevTid0Pic be the previous picture in decoding order that has nuh_layer_id equal to the nuh_layer_id of the current picture and TemporalId equal to 0 and that is not a RASL or RADL picture.

if (dyadic_temporal_nesting_flag) PicOrderCntLsb= (slice_pic_order_cnt_lsb<<PocByTidLen)+ (TemporalId==MaxTemporalId) else PicOrderCntLsb=slice_pic_order_cnt_lsb The variable prevPicOrderCntLsb is set equal to PicOrderCntLsb of prevTid0Pic.

The variable prevPicOrderCntMsb is set equal to PicOrderCntMsb of prevTid0Pic.

The variable PicOrderCntMsb of the current picture is derived as follows:

If the current picture is a CLVSS picture, PicOrderCntMsb is set equal to 0.

Otherwise, PicOrderCntMsb is derived as follows:

```
if((slice_pic_order_cnt_lsb < prevPicOrderCntLsb) &&
       ((prevPicOrderCntLsb−PicOrderCntLsb) >=
       (MaxPicOrderCntLsb / 2)))
    PicOrderCntMsb = prevPicOrderCntMsb +
       MaxPicOrderCntLsb                                (8-1)
else if((PicOrderCntLsb > prevPicOrderCntLsb) &&
       ((PicOrderCntLsb−prevPicOrderCntLsb) >
       (MaxPicOrderCntLsb / 2)))
    PicOrderCntMsb = prevPicOrderCntMsb −
       MaxPicOrderCntLsb
else
    PicOrderCntMsb = prevPicOrderCntMsb
PicOrderCntVal is derived as follows:
PicOrderCntVal = PicOrderCntMsb +
    PicOrderCntLsb                                      (8-2)
```

The value of the PicOrderCntLsb is to be in the range of 0 to MaxPicOrderCntLsb−1, inclusive.

NOTE 1—All CLVSS pictures will have PicOrderCntVal equal to PicOrderCntLsb since for CLVSS pictures PicOrderCntMsb is set equal to 0.

The value of PicOrderCntVal is to be in the range of $-2^{31}$ to $2^{31}-1$, inclusive.

In one CVS, the PicOrderCntVal values for any two coded pictures with the same value of nuh_layer_id is not to be the same.

All pictures in any particular access unit is to have the same value of PicOrderCntVal.

The function PicOrderCnt(picX) is specified as follows:

$$\text{PicOrderCnt}(picX) = \text{PicOrderCntVal of the picture } picX \quad (8\text{-}3)$$

The function DiffPicOrderCnt(picA, picB) is specified as follows:

$$\text{DiffPicOrderCnt}(picA, picB) = \text{PicOrderCnt}(picA) - \text{PicOrderCnt}(picB) \quad (8\text{-}4)$$

The bitstream is not to contain data that result in values of DiffPicOrderCnt(picA, picB) used in the decoding process that are not in the range of $-2^{15}$ to $2^{15}-1$, inclusive.

NOTE 2—Let X be the current picture and Y and Z be two other pictures in the same CVS, Y and Z are considered to be in the same output order direction from X when both DiffPicOrderCnt(X, Y) and DiffPicOrderCnt(X, Z) are positive or both are negative.

The Second Embodiment of the Present Disclosure

This clause documents the embodiment of aspect 2) of the disclosure as summarized above. The description is in relative to the basis text, which is the draft of VVC specification in JVET contribution JVET-O2001-vE. In other words, only the delta is described, while the texts in the basis text that are not mentioned below apply as they are. Modified text relative to the basis text is bolded.

This clause documents the embodiment of aspect 1) of the disclosure as summarized above. The description is in relative to the basis text, which is the draft of VVC specification in JVET contribution JVET-O2001-vE. In other words, only the delta is described, while the texts in the basis text that are not mentioned below apply as they are. Modified text relative to the basis text is bolded. The modification of POC derivation process is proposed in order to reduce signaling overhead by using Temporal ID value as part of POC LSB.

According to this second embodiment, a number of last bits of the Least Significant Bits of Picture Order Counter (POC_LSB) are omitted, in other words, not inserted into the bitstream on the encoding side. This number of last bits is denoted as PocByTidLen and is set equal to (MaxTemporalId−TemporalId+(TemporalId>0)). On the decoding side, these missing bits are derived based on the Temporal ID value, in particular using the expression (((TemporalId>0)<<(MaxTemporalId−TemporalId+(TemporalId==0))). In order to code whether the distribution of Temporal IDs is dyadic, the new flag "dyadic_temporal_nesting_flag" is again proposed to be coded in SPS in this embodiment.

7.3.2.3 Sequence Parameter Set RBSP Syntax

| | Descriptor |
|---|---|
| seq_parameter_set_rbsp( ) { | |
| sps_decoding_parameter_set_id | u(4) |
| sps_video_parameter_set_id | u(4) |
| sps_max_sub_layers_minus1 | u(3) |
| sps_reserved_zero_5bits | u(5) |
| profile_tier_level( sps_max_sub_layers_minus1 ) | |
| gdr_enabled_flag | u(1) |
| sps_seq_parameter_set_id | ue(v) |
| chroma_format_idc | ue(v) |
| if( chroma_format_idc = = 3 ) | |
| separate_colour_plane_flag | u(1) |
| pic_width_max_in_luma_samples | ue(v) |
| pic_height_max_in_luma_samples | ue(v) |
| subpics_present_flag | u(1) |
| if( subpics_present_flag ) { | |
| max_subpics_minus1 | u(8) |
| subpic_grid_col_width_minus1 | u(v) |
| subpic_grid_row_height_minus1 | u(v) |
| for( i = 0; i < NumSubPicGridRows; i++ ) | |
| for( j = 0; j < NumSubPicGridCols; j++ ) | |
| subpic_grid_idx[ i ][ j ] | u(v) |
| for( i = 0; i <= NumSubPics; i++ ) { | |
| subpic_treated_as_pic_flag[ i ] | u(1) |
| loop_filter_across_subpic_enabled_flag[ i ] | u(1) |
| } | |
| } | |
| bit_depth_luma_minus8 | ue(v) |
| bit_depth_chroma_minus8 | ue(v) |
| min_qp_prime_ts_minus4 | ue(v) |
| dyadic_temporal_nesting_flag | u(1) |
| log2_max_pic_order_cnt_lsb_minus4 | ue(v) |
| if( sps_max_sub_layers_minus1 > 0 ) | |
| sps_sub_layer_ordering_info_present_flag | u(1) |
| for( i = ( sps_sub_layer_ordering_info_present_flag ? 0 : sps_max_sub_layers_minus1 ); i <= sps_max_sub_layers_minus1; i++ ) { | |
| sps_max_dec_pic_buffering_minus1[ i ] | ue(v) |
| sps_max_num_reorder_pics[ i ] | ue(v) |
| sps_max_latency_increase_plus1[ i ] | ue(v) |
| } | |
| long_term_ref_pics_flag | u(1) |
| inter_layer_ref_pics_present_flag | u(1) |
| sps_idr_rpl_present_flag | u(1) |
| } | |
| sps_scaling_list_enabled_flag | u(1) |
| hrd_parameters_present_flag | u(1) |
| if( general_hrd_parameters_present_flag ) { | |
| num_units_in_tick | u(32) |
| time_scale | u(32) |
| sub_layer_cpb_parameters_present_flag | u(1) |
| if( sub_layer_cpb_parameters_present_flag ) | |
| general_hrd_parameters( 0, sps_max_sub_layers_minus1 ) | |
| else | |
| general_hrd_parameters( sps_max_sub_layers_minus1, sps_max_sub_layers_minus1 ) | |
| } | |
| vui_parameters_present_flag | u(1) |
| if( vui_parameters_present_flag ) | |
| vui_parameters( ) | |
| sps_extension_flag | u(1) |
| if( sps_extension_flag ) | |
| while( more_rbsp_data( ) ) | |
| sps_extension_data_flag | u(1) |
| rbsp_trailing_bits( ) | |
| } | |

7.3.4.1 General HRD Parameters Syntax

| | Descriptor |
|---|---|
| general_hrd_parameters( firstSubLayer, maxNumSubLayersMinus1 ) { | |
| general_nal_hrd_parameters_present_flag | u(1) |
| general_vcl_hrd_parameters_present_flag | u(1) |
| if( general_nal_hrd_parameters_present_flag \|\| general_vcl_hrd_parameters_present_flag) { | |
| decoding_unit_hrd_params_present_flag | u(1) |
| if( decoding_unit_hrd_params_present_flag ) { | |
| tick_divisor_minus2 | u(8) |
| decoding_unit_cbp_params_in_pic_timing_sei_flag | u(1) |
| } | |
| bit_rate_scale | u(4) |
| cpb_size_scale | u(4) |
| if( decoding_unit_hrd_params_present_flag ) | |
| cpb_size_du_scale | u(4) |
| } | |
| for( i = firstSubLayer; i <= maxNumSubLayersMinus1; i++ ) { | |
| if (! dyadic_temporal_nesting_flag ) | |
| fixed_pic_rate_general_flag[ i ] | u(1) |
| if( !fixed_pic_rate_general_flag[ i ] ) | |
| fixed_pic_rate_within_cvs_flag[ i ] | u(1) |
| if( fixed_pic_rate_within_cvs_flag[ i ] ) | |
| elemental_duration_in_tc_minus1[ i ] | ue(v) |
| else | |
| low_delay_hrd_flag[ i ] | u(1) |
| if( !low_delay_hrd_flag[ i ] ) | |
| hrd_cpb_cnt_minus1[ i ] | ue(v) |
| if( general_nal_hrd_parameters_present_flag ) | |
| sub_layer_hrd_parameters( i ) | |
| if( general_vcl_hrd_parameters_present_flag ) | |
| sub_layer_hrd_parameters( i ) | |
| } | |
| } | | dyadic_temporal_nesting_present_flag being equal to 1 indicates that dyadic_temporal_nesting_flag is present in the SPS RBSP syntax. dyadic_temporal_nesting_present_flag being equal to 0 indicates that dyadic_temporal_nesting_flag is not present in the SPS RBSP syntax.

dyadic_temporal_nesting_flag being equal to 1 specifies that the Temporal IDs are distributed hierarchically with dyadic dependencies. dyadic_temporal_nesting_flag equal to 0 otherwise. When dyadic_temporal_nesting_flag is equal to 1 the variable PocByTidLen is set equal to (MaxTemporalId−TemporalId+(TemporalId>0)). When dyadic_temporal_nesting_flag is equal to 0 the variable PocByTidLen is set equal to 0.

sps_max_sub_layers_minus1 plus 1 specifies the maximum number of temporal sub-layers that may be present in each CVS referring to the SPS. The value of sps_max_sub_layers_minus1 is to be in the range of 0 to 6, inclusive. The variable MaxTemporalID is set equal to sps_max_sub_layers_minus1 plus 1.

log 2_max_pic_order_cnt_lsb_minus4 specifies the value of the variable MaxPicOrderCntLsb that is used in the decoding process for picture order count as follows:

$$\text{MaxPicOrderCntLsb}=2^{(log\ 2\_max\_pic\_order\_cnt\_lsb\_minus4+4)} \quad (7\text{-}13)$$

The value of log 2_max_pic_order_cnt_lsb_minus4 is to be in the range of 0 to 12, inclusive.

slice_pic_order_cnt_lsb specifies the picture order count modulo MaxPicOrderCntLsb for the current picture. The length of the slice_pic_order_cnt_lsb syntax element is log 2_max_pic_order_cnt_lsb_minus4+4−PocByTidLen bits. The value of the slice_pic_order_cnt_lsb is to be in the range of 0 to MaxPicOrderCntLsb−1, inclusive.

8.3 Slice Decoding Process
8.3.1 Decoding Process for Picture Order Count

Output of this process is PicOrderCntVal, the picture order count of the current picture.

Each coded picture is associated with a picture order count variable, denoted as PicOrderCntVal.

When the current picture is not a CLVSS picture, the variables prevPicOrderCntLsb and prevPicOrderCntMsb are derived as follows:

Let prevTid0Pic be the previous picture in decoding order that has nuh_layer_id equal to the nuh_layer_id of the current picture and TemporalId equal to 0 and that is not a RASL or RADL picture.
if (dyadic_temporal_nesting_flag) PicOrderCntLsb=(slice_pic_order_cnt_lsb<<PocByTidLen)+(((TemporalId>0)<<(MaxTemporalId−TemporalId+(TemporalId==0))) else
PicOrderCntLsb=slice_pic_order_cnt_lsb The variable prevPicOrderCntLsb is set equal to PicOrderCntLsb of prevTid0Pic.

The variable prevPicOrderCntMsb is set equal to PicOrderCntMsb of prevTid0Pic.

The variable PicOrderCntMsb of the current picture is derived as follows:

If the current picture is a CLVSS picture, PicOrderCntMsb is set equal to 0.

Otherwise, PicOrderCntMsb is derived as follows:

```
if((slice_pic_order_cnt_lsb<prevPicOrderCntLsb)&&
  ((prevPicOrderCntLsb−PicOrderCntLsb)>=
  (MaxPicOrderCntLsb/2)))
  PicOrderCntMsb=prevPicOrderCntMsb+
  MaxPicOrderCntLsb                                    (8-1)

else if((PicOrderCntLsb>prevPicOrderCntLsb)&&
  ((PicOrderCntLsb−prevPicOrderCntLsb)>
  (MaxPicOrderCntLsb/2)))
  PicOrderCntMsb=prevPicOrderCntMsb−
  MaxPicOrderCntLsb
``` else PicOrderCntMsb=prevPicOrderCntMsb PicOrderCntVal is derived as follows:

$$\text{PicOrderCntVal}=\text{PicOrderCntMsb}+\text{PicOrderCntLsb} \quad (8\text{-}2)$$

The value of the PicOrderCntLsb is to be in the range of 0 to MaxPicOrderCntLsb−1, inclusive.

NOTE 1—All CLVSS pictures will have PicOrderCntVal equal to PicOrderCntLsb since for CLVSS pictures PicOrderCntMsb is set equal to 0.

The value of PicOrderCntVal is to be in the range of $-2^{31}$ to $2^{31}-1$, inclusive.

In one CVS, the PicOrderCntVal values for any two coded pictures with the same value of nuh_layer_id is not to be the same.

All pictures in any particular access unit is to have the same value of PicOrderCntVal.

The function PicOrderCnt(picX) is specified as follows:

$$\text{PicOrderCnt}(picX)=\text{PicOrderCntVal of the picture } picX \quad (8\text{-}3)$$

The function DiffPicOrderCnt(picA, picB) is specified as follows:

$$\text{DiffPicOrderCnt}(picA,picB)=\text{PicOrderCnt}(picA)-\text{PicOrderCnt}(picB) \quad (8\text{-}4)$$

The bitstream is not to contain data that result in values of DiffPicOrderCnt(picA, picB) used in the decoding process that are not in the range of $-2^{15}$ to $2^{15}-1$, inclusive.

NOTE 2—Let X be the current picture and Y and Z be two other pictures in the same CVS, Y and Z are considered to be in the same output order direction from X when both DiffPicOrderCnt(X, Y) and DiffPicOrderCnt(X, Z) are positive or both are negative.

The Third Embodiment of the Present Disclosure

This clause documents the embodiment of aspect 2) of the disclosure as summarized above. The description is in relative to the basis text, which is the draft of VVC specification in JVET contribution JVET-O2001-vE. In other words, only the delta is described, while the texts in the basis text that are not mentioned below apply as they are. Modified text relative to the basis text is bolded.

This clause documents the embodiment of aspect 1) of the disclosure as summarized above. The description is in relative to the basis text, which is the draft of VVC specification in JVET contribution JVET-O2001-vE. In other words, only the delta is described, while the texts in the basis text that are not mentioned below apply as they are. Modified text relative to the basis text is bolded. The modification of POC derivation process is proposed in order to reduce signaling overhead by using Temporal ID value as part of POC LSB.

According to this third embodiment, a number of last bits of the Least Significant Bits of Picture Order Counter (POC_LSB) are omitted, in other words, not inserted into the bitstream on the encoding side. This number of last bits is denoted as PocByTidLen and is set equal to (MaxTemporalId−TemporalId+(TemporalId>0)). On the decoding side, these missing bits are derived based on the Temporal ID value, in particular using the expression (((TemporalId>0)<<(PocByTidLen−1)). In order to code whether the distribution of Temporal IDs is dyadic, the new flag "dyadic_temporal_nesting_flag" is again proposed to be coded in SPS in this embodiment.

7.3.2.3 Sequence Parameter Set RBSP Syntax

| | Descriptor |
|---|---|
| seq_parameter_set_rbsp( ) { | |
| sps_decoding_parameter_set_id | u(4) |
| sps_video_parameter_set_id | u(4) |

| | Descriptor |
|---|---|
| sps_max_sub_layers_minus1 | u(3) |
| sps_reserved_zero_5bits | u(5) |
| profile_tier_level( sps_max_sub_layers_minus1 ) | |
| gdr_enabled_flag | u(1) |
| sps_seq_parameter_set_id | ue(v) |
| chroma_format_idc | ue(v) |
| if( chroma_format_idc = = 3 ) | |
|   separate_colour_plane_flag | u(1) |
| pic_width_max_in_luma_samples | ue(v) |
| pic_height_max_in_luma_samples | ue(v) |
| subpics_present_flag | u(1) |
| if( subpics_present_flag ) { | |
|   max_subpics_minus1 | u(8) |
|   subpic_grid_col_width_minus1 | u(v) |
|   subpic_grid_row_height_minus1 | u(v) |
|   for( i = 0; i < NumSubPicGridRows; i++ ) | |
|     for( j = 0; j < NumSubPicGridCols; j++ ) | |
|       subpic_grid_idx[ i ][ j ] | u(v) |
|   for( i = 0; i <= NumSubPics; i++ ) { | |
|     subpic_treated_as_pic_flag[ i ] | u(1) |
|     loop_filter_across_subpic_enabled_flag[ i ] | u(1) |
|   } | |
| } | |
| bit_depth_luma_minus8 | ue(v) |
| bit_depth_chroma_minus8 | ue(v) |
| min_qp_prime_ts_minus4 | ue(v) |
| dyadic_temporal_nesting_flag | u(1) |
| log2_max_pic_order_cnt_lsb_minus4 | ue(v) |
| if( sps_max_sub_layers_minus1 > 0 ) | |
|   sps_sub_layer_ordering_info_present_flag | u(1) |
| for( i = ( sps_sub_layer_ordering_info_present_flag ? 0 : sps_max_sub_layers_minus1 ); i <= sps_max_sub_layers_minus1; i++ ) { | |
|   sps_max_dec_pic_buffering_minus1[ i ] | ue(v) |
|   sps_max_num_reorder_pics[ i ] | ue(v) |
|   sps_max_latency_increase_plus1[ i ] | ue(v) |
| } | |
| long_term_ref_pics_flag | u(1) |
| inter_layer_ref_pics_present_flag | u(1) |
| sps_idr_rpl_present_flag | u(1) |
| } | |
| sps_scaling_list_enabled_flag | u(1) |
| hrd_parameters_present_flag | u(1) |
| if( general_hrd_parameters_present_flag ) { | |
|   num_units_in_tick | u(32) |
|   time_scale | u(32) |
|   sub_layer_cpb_parameters_present_flag | u(1) |
|   if( sub_layer_cpb_parameters_present_flag ) | |
|     general_hrd_parameters( 0, sps_max_sub_layers_minus1 ) | |
|   else | |
|   general_hrd_parameters( sps_max_sub_layers_minus1, sps_max_sub_layers_minus1 ) | |
| } | |
| vui_parameters_present_flag | u(1) |
| if( vui_parameters_present_flag ) | |
|   vui_parameters( ) | |
| sps_extension_flag | u(1) |
| if( sps_extension_flag ) | |
|   while( more_rbsp_data( ) ) | |
|     sps_extension_data_flag | u(1) |
| rbsp_trailing_bits( ) | |
| } | |

7.3.4.1 General HRD Parameters Syntax

| | Descriptor |
|---|---|
| general_hrd_parameters( firstSubLayer, maxNumSubLayersMinus1 ) { | |
|   general_nal_hrd_parameters_present_flag | u(1) |
|   general_vcl_hrd_parameters_present_flag | u(1) |
|   if( general_nal_hrd_parameters_present_flag \|\| general_vcl_hrd_parameters_present_flag ) { | |
|     decoding_unit_hrd_params_present_flag | u(1) |
|     if( decoding_unit_hrd_params_present_flag ) { | |
|       tick_divisor_minus2 | u(8) |
|       decoding_unit_cbp_params_in_pic_timing_sei_flag | u(1) |
|     } | |
|     bit_rate_scale | u(4) |
|     cpb_size_scale | u(4) |
|     if( decoding_unit_hrd_params_present_flag ) | |
|       cpb_size_du_scale | u(4) |
|   } | |
|   for( i = firstSubLayer; i <= maxNumSubLayersMinus1; i++ ) { | |
|     if ( ! dyadic_temporal_nesting_flag ) | |
|       fixed_pic_rate_general_flag[ i ] | u(1) |
|     if( !fixed_pic_rate_general_flag[ i ] ) | |
|       fixed_pic_rate_within_cvs_flag[ i ] | u(1) |
|     if( fixed_pic_rate_within_cvs_flag[ i ] ) | |
|       elemental_duration_in_tc_minus1[ i ] | ue(v) |
|     else | |
|       low_delay_hrd_flag[ i ] | u(1) |
|     if( !low_delay_hrd_flag[ i ] ) | |
|       hrd_cpb_cnt_minus1[ i ] | ue(v) |
|     if( general_nal_hrd_parameters_present_flag ) | |
|       sub_layer_hrd_parameters( i ) | |
|     if( general_vcl_hrd_parameters_present_flag ) | |
|       sub_layer_hrd_parameters( i ) | |
|   } | |
| } | | dyadic_temporal_nesting_present_flag being equal to 1 indicates that dyadic_temporal_nesting_flag is present in the SPS RBSP syntax. dyadic_temporal_nesting_present_flag being equal to 0 indicates that dyadic_temporal_nesting_flag is not present in the SPS RBSP syntax.

dyadic_temporal_nesting_flag being equal to 1 specifies that the Temporal IDs are distributed hierarchically with dyadic dependencies. dyadic_temporal_nesting_flag equal to 0 otherwise. When dyadic_temporal_nesting_flag is equal to 1 the variable PocByTidLen is set equal to (MaxTemporalId−TemporalId+(TemporalId>0)). When dyadic_temporal_nesting_flag is equal to 0 the variable PocByTidLen is set equal to 0.

sps_max_sub_layers_minus1 plus 1 specifies the maximum number of temporal sub-layers that may be present in each CVS referring to the SPS. The value of sps_max_sub_layers_minus1 is to be in the range of 0 to 6, inclusive. The variable MaxTemporalID is set equal to sps_max_sub_layers_minus1 plus 1.

log 2_max_pic_order_cnt_lsb_minus4 specifies the value of the variable MaxPicOrderCntLsb that is used in the decoding process for picture order count as follows: MaxPicOrderCntLsb=2(log 2_max_pic_order_cnt_lsb_minus4+4) (7-13) The value of log 2_max_pic_order_cnt_lsb_minus4 is to be in the range of 0 to 12, inclusive.

slice_pic_order_cnt_lsb specifies the picture order count modulo MaxPicOrderCntLsb for the current picture. The length of the slice_pic_order_cnt_lsb syntax element is log 2_max_pic_order_cnt_lsb_minus4+4−PocByTidLen bits. The value of the slice_pic_order_cnt_lsb is to be in the range of 0 to MaxPicOrderCntLsb−1, inclusive.

8.3 Slice Decoding Process
8.3.1 Decoding Process for Picture Order Count Output of this process is PicOrderCntVal, the picture order count of the current picture.

Each coded picture is associated with a picture order count variable, denoted as PicOrderCntVal.

When the current picture is not a CLVSS picture, the variables prevPicOrderCntLsb and prevPicOrderCntMsb are derived as follows:

Let prevTid0Pic be the previous picture in decoding order that has nuh_layer_id equal to the nuh_layer_id of the current picture and TemporalId equal to 0 and that is not a RASL or RADL picture.

```
if (dyadic_temporal_nesting flag)
    PicOrderCntLsb =
    (slice_pic order_cnt_lsb << PocByTidLen) +
    (((TemporalId > 0) << (PocByTidLen - 1))
else
    PicOrderCntLsb = slice_pic_order_cnt_lsb
```

The variable prevPicOrderCntLsb is set equal to PicOrderCntLsb of prevTid0Pic.

The variable prevPicOrderCntMsb is set equal to PicOrderCntMsb of prevTid0Pic.

The variable PicOrderCntMsb of the current picture is derived as follows:

If the current picture is a CLVSS picture, PicOrderCntMsb is set equal to 0.

Otherwise, PicOrderCntMsb is derived as follows:

```
if((slice_pic_order_cnt_lsb<prevPicOrderCntLsb)&&
    ((prevPicOrderCntLsb-PicOrderCntLsb)>=
    (MaxPicOrderCntLsb/2)))
    PicOrderCntMsb=prevPicOrderCntMsb+
    MaxPicOrderCntLsb                                    (8-1)

else if((PicOrderCntLsb>prevPicOrderCntLsb)&&
    ((PicOrderCntLsb-prevPicOrderCntLsb)>
    (MaxPicOrderCntLsb/2)))
    PicOrderCntMsb=prevPicOrderCntMsb-
    MaxPicOrderCntLsb
``` else
PicOrderCntMsb=prevPicOrderCntMsb
PicOrderCntVal is derived as follows:

$$PicOrderCntVal=PicOrderCntMsb+PicOrderCntLsb \quad (8\text{-}2)$$

The value of the PicOrderCntLsb is to be in the range of 0 to MaxPicOrderCntLsb−1, inclusive.

NOTE 1—All CLVSS pictures will have PicOrderCntVal equal to PicOrderCntLsb since for CLVSS pictures PicOrderCntMsb is set equal to 0.

The value of PicOrderCntVal is to be in the range of $-2^{31}$ to $2^{31}-1$, inclusive.

In one CVS, the PicOrderCntVal values for any two coded pictures with the same value of nuh_layer_id is not to be the same.

All pictures in any particular access unit is to have the same value of PicOrderCntVal.

The function PicOrderCnt(picX) is specified as follows:

$$PicOrderCnt(picX)=PicOrderCntVal \text{ of the picture } picX \quad (8\text{-}3)$$

The function DiffPicOrderCnt(picA, picB) is specified as follows:

$$DiffPicOrderCnt(picA,picB)=PicOrderCnt(picA)-PicOrderCnt(picB) \quad (8\text{-}4)$$

The bitstream is not to contain data that result in values of DiffPicOrderCnt(picA, picB) used in the decoding process that are not in the range of $-2^{15}$ to $2^{15}-1$, inclusive.

Figure 9A:
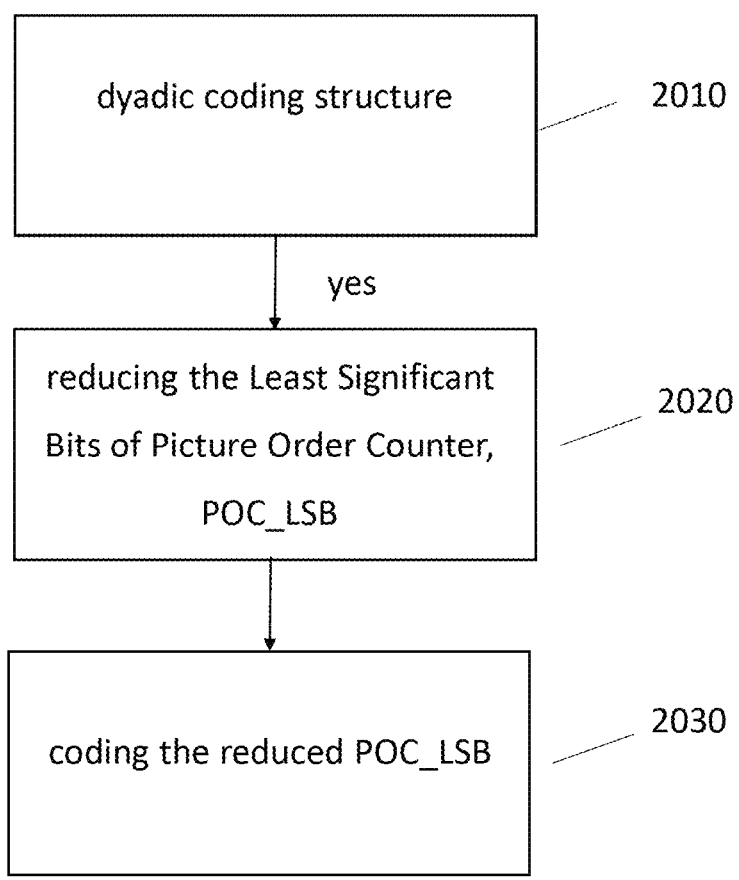
FIGS. 9A and 9B show flow charts of an example method for encoding and decoding, respectively.
Figure 9B:
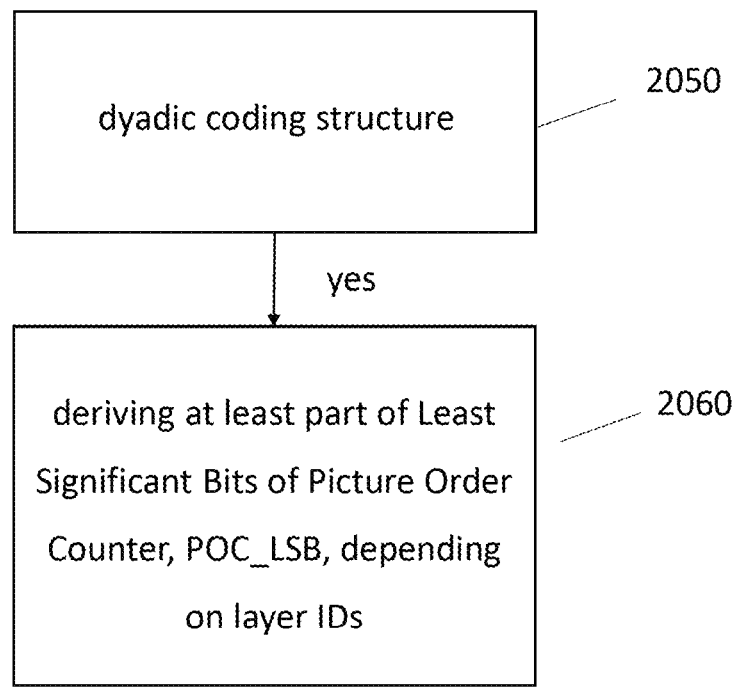

NOTE 2—Let X be the current picture and Y and Z be two other pictures in the same CVS, Y and Z are considered to be in the same output order direction from X when both DiffPicOrderCnt(X, Y) and DiffPicOrderCnt(X, Z) are positive or both are negative. FIGS. 9A and 9B illustrate embodiments of a method for encoding and a method for decoding, respectively, by means of schematic flow charts.

According to the embodiment of a method of coding implemented by an encoding device for encoding video data as illustrated in FIG. 9A, it is first determined in step 2010 whether a dyadic coding structure of pictures is used. If so, a flag, for instance denoted as dyadic_temporal_nesting_flag, is set or implied in the SPS to be 1, thereby specifying that the TIDs are distributed hierarchically with dyadic dependencies. Otherwise the flag is set or implied to be 0.

If a dyadic coding structure of pictures is used, the encoding device reduces at least part of the POC_LSB. According to a first alternative, this may comprise omitting one bit of the POC_LSB, in particular the last one. According to a second alternative, a number of last bits may be omitted depending on temporal layer IDs. Omitting bits means that they are not coded, or, in other words, not inserted into the bitstream. Consequently, the coding efficiency is increased.

The number of last bits, which is omitted depends in this embodiment on the difference between the MaxTID, and the TID. In particular, the number, for instance denoted as POC_by_TID_len, can be derived by the expression POC_by_TID_len=(MaxTID−TID+(TID>0)). For example, if MaxTID equals 6 and the TID equals 5, POC_by_TID_len equals 2. In a particular example, if POC equals 10, in binary 1010, the last two bits are omitted. Thus, the encoder side codes in binary "10". Coding the reduced POC_LSB is illustrated in step 2030 of FIG. 9A.

According to the embodiment of a method of coding implemented by a decoding device for decoding video data as illustrated in FIG. 9B, it is first determined in step 2050 whether a dyadic coding structure of pictures is used. This may be realized by parsing a flag, for instance denoted as dyadic_temporal_nesting_flag, set or implied in the SPS. The flag may be derived to be 1, thereby specifying that the TIDs are distributed hierarchically with dyadic dependencies. Otherwise the flag is derived to be 0.

In step 2060, at least part of the POC_LSB is derived depending on layer IDs. In this embodiment, TIDs, are used. It is conceivable, however, to use other layer IDs, such as spatial layer IDs or a combination of temporal and spatial layer IDs.

For implementing step 2060 of this embodiment, two alternatives are described, corresponding to the two alternatives of the encoding step 2020 described with respect to FIG. 9A herein above.

According to a first alternative, corresponding to the case where only the last bit of the POC_LSB is omitted on the encoding side, the last bit is derived to be 1 if the TID of the picture to be decoded corresponds to the MaxTID and to be 0 otherwise. In the example mentioned above, for POC=10, in binary 1010, the last bit "0" is omitted on the encoding side. On the decoding side, since TID=5 and MaxTID=6, the last bit is derived to be "0" since the logic equation (TID==MaxTID) is not true. Thus, the omitted last bit can be recovered.

According to a second alternative, corresponding to the case where the number of last bits, which is omitted, depends on the difference between the MaxTID and the TID, the omitted bits are derived on the decoding side, for TID>0, based on an arithmetic left shift of the bit 1 by a number of binary digits corresponding to the difference between the MaxTID, and the TID. More particularly, in this embodiment, the omitted last bits of the POC_LSB are derived based on the expression (TID>0)<<(Max TID−TID+(TID==0)).

In the example mentioned above, for POC=10, in binary 1010, the last two bits "10" are omitted. On the decoding side, they are derived as 1<<(6−5+0), which is 1<<1, which again yields 10. In this way, the omitted bits can be recovered.

The expression for deriving the omitted bits may be alternatively formulated as (TID>0)<<(POC_by_TID_len−1), wherein, as discussed before, POC_by_TID_len=(MaxTID−TID+(TID>0)). In the example mentioned above, for POC=10, in binary 1010, this expression yields 1<<(2-1), which is 1<<1, which again yields the omitted "10".

These methods can be readily implemented in the apparatuses described above with reference to FIGS. 1a, 1b and 4. Particularly, the method for encoding a video sequence illustrated in FIG. 9A may be carried out by the encoder 20 shown in FIG. 2. The method for decoding a video sequence illustrated in FIG. 9B may be carried out by the decoder 30 shown in FIG. 3.

Furthermore, it is provided a video encoding device that may be configured for performing the steps 2010 to 2030 of the method for encoding a video sequence as illustrated in FIG. 9A. It is also provided for a video decoding device that may be configured for performing the steps 2050 to 2060 of the method for decoding a video sequence as illustrated in FIG. 9B. The above-described specifications of these methods may hold for the operation of the devices, in particular the encoding and decoding device described below with reference to FIGS. 10 and 11.

Figure 10:
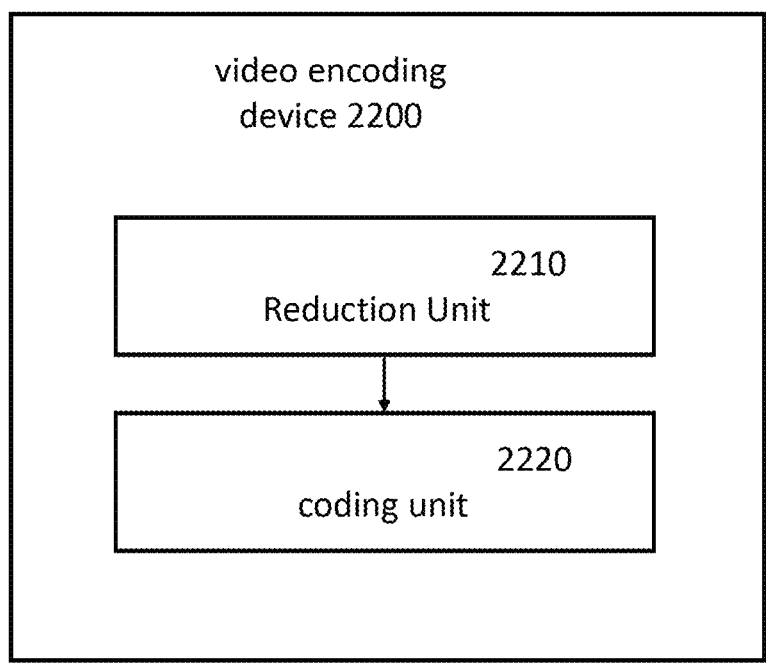
FIG. 10 shows a configuration of an example video encoding device.

FIG. 10 shows a video encoding device 2200 according to an embodiment, comprising a reduction unit 2210 (e.g., a reduction circuit) and a coding unit 2220 (e.g., a coding circuit). The reduction unit 2210 is configured for reducing the POC_LSB as described in context of step 2020 of FIG. 9A. The coding unit 2220 is configured for coding the reduced POC_LSB as described in context of step 2030 of FIG. 9A.

Figure 11:
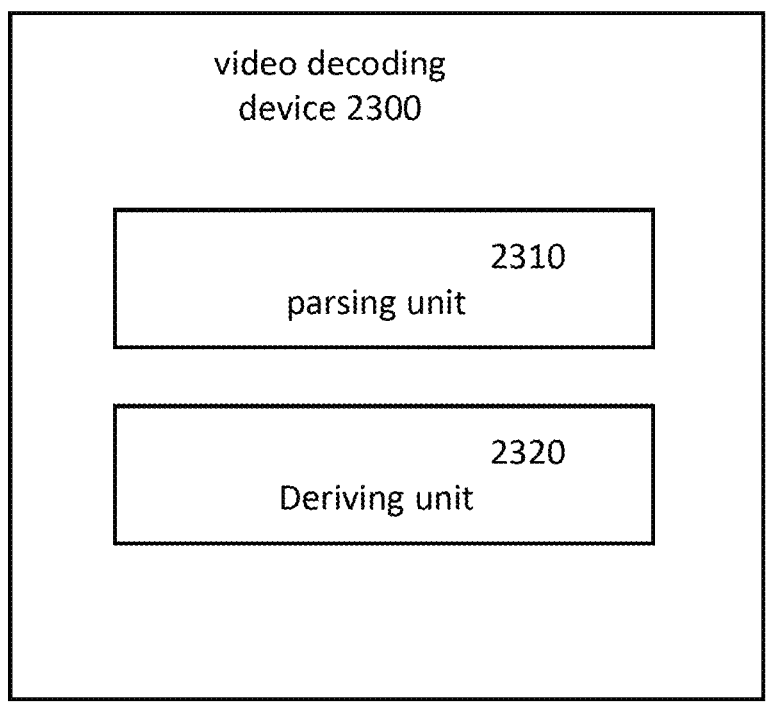
FIG. 11 shows a configuration of an example video decoding device.

FIG. 11 shows a video decoding device 2300 according to an embodiment, comprising a parsing unit 2310 (e.g., a parsing circuit) and a deriving unit 2320 (e.g., a deriving circuit). The parsing unit 2310 is configured for determining whether a dyadic coding structure of pictures is used by parsing a flag, for instance denoted as dyadic_temporal_nesting_flag, set or implied in the SPS. If the flag is derived to be 1, the parsing unit 2310 is configured to determine that the TIDs are distributed hierarchically with dyadic dependencies. Otherwise, if the flag is derived to be 0, the parsing unit 2310 is configured to determine that the TIDs are not distributed hierarchically with dyadic dependencies. The parsing unit 2310, thus, is configured for performing step 2050 described with reference to FIG. 9B.

The deriving unit 2320 is configured for deriving at least part of the POC_LSB depending on layer IDs as described in context of step 2060 of FIG. 9B.

Figure 12:
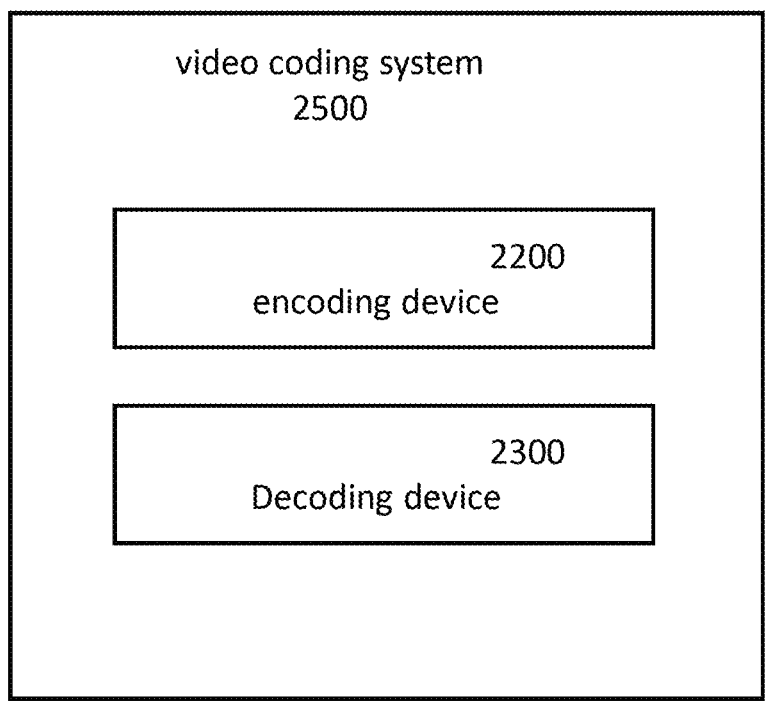
FIG. 12 shows an example system of an encoding device and a decoding device.

An exemplary system 2500 comprising an encoding device 2200 and a decoding device 2300 is illustrated in FIG. 12. The encoding device 2200 may be configured as described above with reference to FIG. 10 and the decoding device may be configured as described above with reference to FIG. 11. The system may be particularly configured such that encoding device 2200 and decoding device 2300 implement corresponding coding methods. For instance, if the encoding device is configured to omit only the last bit of the POC_LSB the decoding device 2300 is configured for deriving the last bit to be 1 if the TID of the picture to be decoded corresponds to the MaxTID and to be 0 otherwise. Similarly, if the encoding device 2200 is configured to omit a number of last bits, the decoding device 2300 is configured for deriving these last bits as described above.

Following is an explanation of the applications of the encoding method as well as the decoding method as shown in the above-mentioned embodiments, and a system using them.

Figure 7:
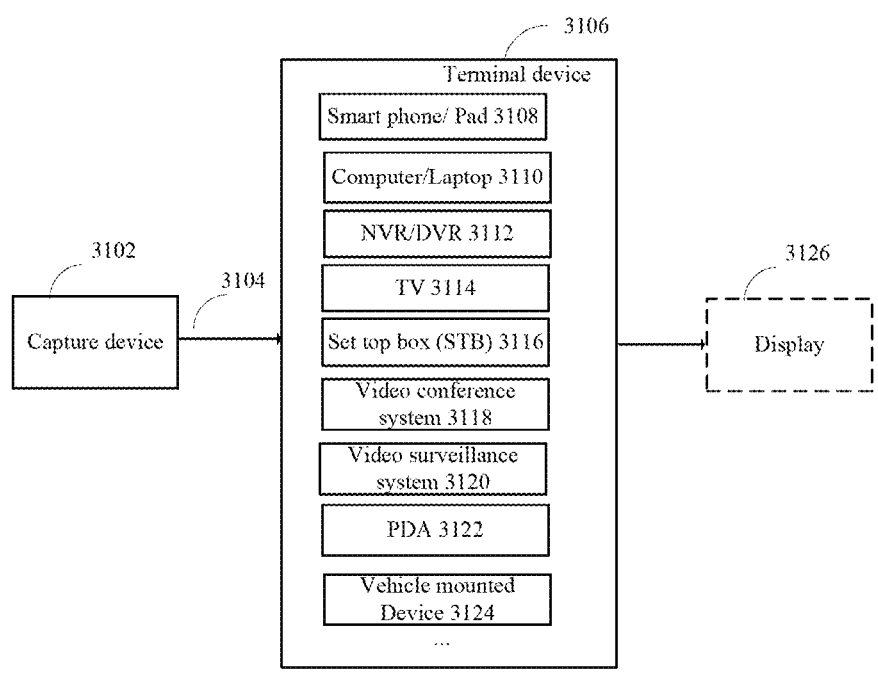
FIG. 7 is a block diagram showing an example structure of a content supply system 3100 which realizes a content delivery service.

FIG. 7 is a block diagram showing a content supply system 3100 for realizing content distribution service. This content supply system 3100 includes capture device 3102, terminal device 3106, and optionally includes display 3126. The capture device 3102 communicates with the terminal device 3106 over communication link 3104. The communication link may include the communication channel 13 described above. The communication link 3104 may include, but is not limited to wireless fidelity (WIFI), Ethernet, Cable, wireless (3G/4G/5G), universal serial bus (USB), or any kind of combination thereof, or the like.

The capture device 3102 generates data, and may encode the data by the encoding method as shown in the above embodiments. Alternatively, the capture device 3102 may distribute the data to a streaming server (not shown in the Figures), and the server encodes the data and transmits the encoded data to the terminal device 3106. The capture device 3102 includes but not limited to camera, smart phone or Pad, computer or laptop, video conference system, personal digital assistant (PDA), vehicle mounted device, or a combination of any of them, or the like. For example, the capture device 3102 may include the source device 12 as described above. When the data includes video, the video encoder 20 included in the capture device 3102 may actually perform video encoding processing. When the data includes audio (e.g., voice), an audio encoder included in the capture device 3102 may actually perform audio encoding processing. For some practical scenarios, the capture device 3102 distributes the encoded video and audio data by multiplexing them together. For other practical scenarios, for example in the video conference system, the encoded audio data and the encoded video data are not multiplexed. Capture device 3102 distributes the encoded audio data and the encoded video data to the terminal device 3106 separately.

In the content supply system 3100, the terminal device 310 receives and reproduces the encoded data. The terminal device 3106 could be a device with data receiving and recovering capability, such as smart phone or Pad 3108, computer or laptop 3110, network video recorder (NVR)/digital video recorder (DVR) 3112, TV 3114, set top box (STB) 3116, video conference system 3118, video surveillance system 3120, PDA 3122, vehicle mounted device 3124, or a combination of any of them, or the like capable of decoding the above-mentioned encoded data. For example, the terminal device 3106 may include the destination device 14 as described above. When the encoded data includes video, the video decoder 30 included in the terminal device is prioritized to perform video decoding. When the encoded data includes audio, an audio decoder included in the terminal device is prioritized to perform audio decoding processing.

For a terminal device with its display, for example, smart phone or Pad 3108, computer or laptop 3110, NVR/DVR 3112, TV 3114, PDA 3122, or vehicle mounted device 3124, the terminal device can feed the decoded data to its display. For a terminal device equipped with no display, for example, STB 3116, video conference system 3118, or video surveillance system 3120, an external display 3126 is contacted therein to receive and show the decoded data.

When each device in this system performs encoding or decoding, the picture encoding device or the picture decoding device, as shown in the above-mentioned embodiments, can be used.

Figure 8:
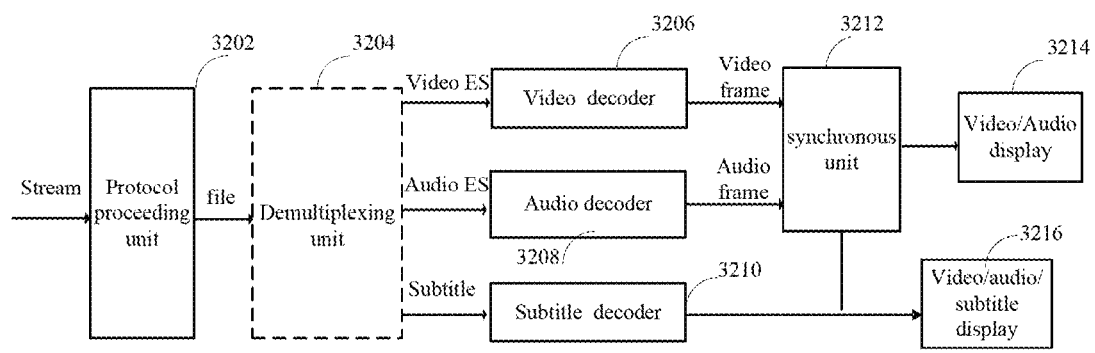
FIG. 8 is a block diagram showing a structure of an example of a terminal device.

FIG. 8 is a diagram showing a structure of an example of the terminal device 3106. After the terminal device 3106 receives stream from the capture device 3102, the protocol proceeding unit 3202 analyzes the transmission protocol of the stream. The protocol includes but not limited to Real Time Streaming Protocol (RTSP), HTTP, HLS, MPEG-DASH, Real-time Transport protocol (RTP), Real Time Messaging Protocol (RTMP), or any kind of combination thereof, or the like.

After the protocol proceeding unit 3202 processes the stream, stream file is generated. The file is outputted to a demultiplexing unit 3204. The demultiplexing unit 3204 can separate the multiplexed data into the encoded audio data and the encoded video data. As described above, for some practical scenarios, for example in the video conference system, the encoded audio data and the encoded video data are not multiplexed. In this situation, the encoded data is transmitted to video decoder 3206 and audio decoder 3208 without through the demultiplexing unit 3204.

Via the demultiplexing processing, video elementary stream (ES), audio ES, and optionally subtitle are generated. The video decoder 3206, which includes the video decoder 30 as explained in the above mentioned embodiments, decodes the video ES by the decoding method as shown in the above-mentioned embodiments to generate video frame, and feeds this data to the synchronous unit 3212. The audio decoder 3208, decodes the audio ES to generate audio frame, and feeds this data to the synchronous unit 3212. Alternatively, the video frame may store in a buffer (not shown in FIG. 8) before feeding it to the synchronous unit 3212. Similarly, the audio frame may store in a buffer (not shown in FIG. 8) before feeding it to the synchronous unit 3212.

The synchronous unit 3212 synchronizes the video frame and the audio frame, and supplies the video/audio to a video/audio display 3214. For example, the synchronous unit 3212 synchronizes the presentation of the video and audio information. Information may code in the syntax using time stamps concerning the presentation of coded audio and visual data and time stamps concerning the delivery of the data stream itself.

If subtitles are included in the stream, the subtitle decoder 3210 decodes the subtitles, and synchronizes it with the video frame and the audio frame, and supplies the video/audio/subtitle to a video/audio/subtitle display 3216.

The present disclosure is not limited to the above-mentioned system, and either the picture encoding device or the picture decoding device in the above-mentioned embodiments can be incorporated into other system, for example, a car system.

The disclosure also provides the following examples:

1. A method of coding implemented by a decoding/encoding device for coding video data, comprising:
   deriving at least part of Least Significant Bits of Picture Order Counter (POC_LSB) depending on layer IDs.

2. The method of example 1, wherein the method further comprises:
   signaling a flag of dyadic temporal ID distribution denoted fixed picture rate for all sub-layers within bit-stream or CVS.

3. The method of example 1, wherein the method further comprises:
   signaling a flag of dyadic temporal ID distribution conditionally based on SPS flag of presence dyadic temporal ID distribution flag in bit-stream.

4. The method of example 2 or 3, wherein the signaling a flag of dyadic temporal ID distribution comprises:
   signaling dyadic_temporal_nesting_flag in general_hrd_parameters( ) syntax elements or in Sequence Parameters Set (SPS), and/or set the dyadic_temporal_nesting_flag equal to predefined default value when not signaled.

5. The method of example 4, wherein the method further comprises:
   setting the value of a parameter vui_poc_proportional_to_timing_flag to 1 when dyadic_temporal_nesting_flag is equal to 1 or as default.

6. The method of example 4 or 5, wherein the method further comprises:
   setting the value of a fixed_pic_rate_general_flag to 1 when dyadic_temporal_nesting_flag is equal to 1 or as default.

7. The method of any one of examples 4-6, wherein the method further comprises:
   setting the value of a fixed_pic_rate_within_cvs_flag to 1 when dyadic_temporal_nesting_flag is equal to 1 or as default.

8. The method of any one of examples 4-7, wherein dyadic_temporal_nesting_present_flag being equal to 1 indicates that dyadic_temporal_nesting_flag is present in the SPS RBSP syntax, or dyadic_temporal_nesting_present_flag being equal to 0 indicates that dyadic_temporal_nesting_flag is not present in the SPS RBSP syntax.

9. The method of any one of examples 4-8, wherein dyadic_temporal_nesting_flag being equal to 1 specifies that the Temporal IDs are distributed hierarchically with dyadic dependencies, or dyadic_temporal_nesting_flag being equal to 0 specifies that the Temporal IDs are not distributed hierarchically with dyadic dependencies.

10. The method of any one of examples 4-9, wherein the method further comprises:
    reducing the bit budged of signaling slice_pic_order_cnt_lsb by one bit, and deriving last bit of slice_pic_order_cnt_lsb by using MaxTID, wherein MaxTID is equal to sps_max_sub_layers_minus1 plus 1.

11. The method of example 10, wherein deriving the last bit of slice_pic_order_cnt_lsb comprises: deriving PicOrderCntLsb=(slice_pic_order_cnt_lsb<<1)+(TID==MaxTID), and derive PicOrderCntVal=PicOrderCntMsb+PicOrderCntLsb.

12. The method of any one of examples 4-9, wherein the method further comprises: reducing the bit budged of signaling slice_pic_order_cnt_lsb by the value POC_by_TID_len=(MaxTID−TID+(TID>0)), and deriving last bit of slice_pic_order_cnt_lsb by using MaxTID, wherein MaxTID is equal to sps_max_sub_layers_minus1 plus 1.

13. The method of example 12, wherein deriving the last bit of slice_pic_order_cnt_lsb comprises: deriving PicOrderCntLsb=(slice_pic_order_cnt_lsb<<POC_by_TID_len)+((TID>0)<<(Max TID−TID+(TID==0))); and deriving PicOrderCntVal=PicOrderCntMsb+PicOrderCntLsb.

14. The method of example 12, wherein deriving the last bit of slice_pic_order_cnt_lsb comprises: deriving PicOrderCntLsb=(slice_pic_order_cnt_lsb<<POC_by_TID_len)+((TID>0)<<(POC_by_TID_len−)); and deriving PicOrderCntVal=PicOrderCntMsb+PicOrderCntLsb.

15. The method of any one of examples 1-14, wherein sps_max_sub_layers_minus1 plus 1 specifies the maximum number of temporal sub-layers, the value of sps_max_sub_layers_minus1 is in the range of 0 to 6, and the variable MaxTID is set equal to sps_max_sub_layers_minus1 plus 1.

16. The method of any one of examples 1-15, wherein slice_pic_order_cnt_lsb specifies the picture order count modulo MaxPicOrderCntLsb for the current picture, and the length of the slice_pic_order_cnt_lsb syntax element is log 2_max_pic_order_cnt_lsb_minus4+4−PocByTidLen bits 17. The method of any one of examples 1-16, when dyadic_temporal_nesting_flag is true, PicOrderCntLsb (slice_pic_order_cnt_lsb<<PocByTidLen)+(((TemporalId>0)<<(Max TID−TID+(TID==0))) when dyadic_temporal_nesting_flag is false, PicOrderCntLsb=slice_pic_order_cnt_lsb.

18. The method of example 17, wherein the value of the PicOrderCntLsb is to be in the range of 0 to MaxPicOrderCntLsb−1, inclusive.

19. A method of coding implemented by a decoding/encoding device for coding video data, comprising:
   deriving of value least significant bits of picture order counter using value of temporal layer ID associated with the picture.

20. The method of example 19, wherein the set of picture parameter in SPS includes one or more of following parameters: highest temporal ID, flag of dyadic temporal ID distribution indicated fixed picture rate for all sub-layers within bit-stream, a flag of presence of dyadic temporal ID distribution flag.

21. The method of example 20, wherein the number of bit derived from TID value POC_by_TID_len is equal to 1.

22. The method of example 20 or 21, wherein the value POC_by_TID_bits denoted last bit of POC_LSB is derived as the result of condition (TID==MaxTID) such as the value of bit equal to 1 when TID==MaxTID and equal to 0 otherwise.

23. The method of any one of examples 19-22, wherein the number of bit derived from TID POC_by_TID_len is equal to (MaxTID−TID+(TID>0)), and wherein the value POC_by_TID_len denoted last bits of POC_LSB value POC_by_TID_bits is derived as ((TID>0)<<(MaxTID−TID+(TID==0))).

24. The method of any one of examples 19-22, wherein the number of bit derived from TID POC_by_TID_len is equal to (MaxTID−TID+(TID>0)), and wherein the value POC_by_TID_len denoted last bits of POC_LSB value POC_by_TID_bits is derived as ((TID>0)<< (POC_by_TID_len−1)).

25. The method of any one of examples 18-24, wherein the value of POC is derived as POC_MSB+ (POC_LSB<<POC_by_TID_len)+POC_by_TID_bits.

26. An encoder (20) comprising processing circuitry for carrying out the method according to any one of examples 1 to 25.

27. A computer program product comprising a program code for performing the method according to any one of examples 1 to 25.

28. A decoder, comprising: one or more processors; and a non-transitory computer-readable storage medium coupled to the processors and storing programming for execution by the processors, wherein the programming, when executed by the processors, configures the decoder to carry out the method according to any one of examples 1 to 25.

29. An encoder, comprising: one or more processors; and a non-transitory computer-readable storage medium coupled to the processors and storing programming for execution by the processors, wherein the programming, when executed by the processors, configures the encoder to carry out the method according to any one of examples 1 to 25.

DEFINITIONS OF ACRONYMS & GLOSSARIES

| DEFINITIONS OF ACRONYMS & GLOSSARIES | |
| --- | --- |
| CTB | Coding Tree Block |
| CTU | Coding Tree Unit |
| CU | Coding Unit |
| CVS | Coded Video Sequence |
| JVET | Joint Video Experts Team |
| MCTS | Motion-Constrained Tile Set |
| MTU | Maximum Transfer Unit |
| NAL | Network Abstration Layer |
| TID | Temporal ID |
| POC | Picure Order Count |
| RBSP | Raw Byte Sequence Payload |
| SPS | Sequence Parameter Set |
| HRD | Hypothetical Reference Decoder |
| SEI | Supplemental Enhancement Information |
| AVC | Advanced Video Coding |
| HEVC | High Efficiency Video Coding |
| VVC | Versatile Video Coding |
| WD | Working Draft |

Mathematical Operators

The mathematical operators used in this application are similar to those used in the C programming language. However, the results of integer division and arithmetic shift operations are defined more precisely, and additional operations are defined, such as exponentiation and real-valued division. Numbering and counting conventions generally begin from 0, e.g., "the first" is equivalent to the 0-th, "the second" is equivalent to the 1-th, etc.

Arithmetic Operators

The following arithmetic operators are defined as follows:
+ Addition
− Subtraction (as a two-argument operator) or negation (as a unary prefix operator)
* Multiplication, including matrix multiplication
$x^y$ Exponentiation. Specifies x to the power of y. In other contexts, such notation is used for superscripting not intended for interpretation as exponentiation.
/ Integer division with truncation of the result toward zero. For example, 7/4 and −7/−4 are truncated to 1 and −7/4 and 7/−4 are truncated to −1.
÷ Used to denote division in mathematical equations where no truncation or rounding is intended.

$$\frac{x}{y}$$

Used to denote division in mathematical equations where no truncation or rounding $$\sum_{i=x}^{y} f(i)$$

The summation of f(i) with i taking all integer values from x up to and including y.
x % y Modulus. Remainder of x divided by y, defined only for integers x and y with x>=0 and y>0.

Logical Operators

The following logical operators are defined as follows:
x&&y Boolean logical "and" of x and y
x||y Boolean logical "or" of x and y
 Boolean logical "not"

x?y:z If x is TRUE or not equal to 0, evaluates to the value of y; otherwise, evaluates to the value of z.

Relational Operators

The following relational operators are defined as follows:
i. Greater than
>=Greater than or equal to
<Less than
<=Less than or equal to
==Equal to
!=Not equal to When a relational operator is applied to a syntax element or variable that has been assigned the value "na" (not applicable), the value "na" is treated as a distinct value for the syntax element or variable. The value "na" is considered not to be equal to any other value.

Bit-Wise Operators

The following bit-wise operators are defined as follows:
& Bit-wise "and". When operating on integer arguments, operates on a two's complement representation of the integer value. When operating on a binary argument that contains fewer bits than another argument, the shorter argument is extended by adding more significant bits equal to 0.
| Bit-wise "or". When operating on integer arguments, operates on a two's complement representation of the integer value. When operating on a binary argument that contains fewer bits than another argument, the shorter argument is extended by adding more significant bits equal to 0.
^ Bit-wise "exclusive or". When operating on integer arguments, operates on a two's complement representation of the integer value. When operating on a binary argument that contains fewer bits than another argument, the shorter argument is extended by adding more significant bits equal to 0.
x>>y Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.
x<<y Arithmetic left shift of a two's complement integer representation of x by y binary digits. This function is defined only for non-negative integer values of y. Bits shifted into the least significant bits (LSBs) as a result of the left shift have a value equal to 0.

Assignment Operators

The following arithmetic operators are defined as follows:
= Assignment operator
++Increment, i.e., x++ is equivalent to x=x+1; when used in an array index, evaluates to the value of the variable prior to the increment operation.
—— Decrement, i.e., x−− is equivalent to x=x−1; when used in an array index, evaluates to the value of the variable prior to the decrement operation.
+=Increment by amount specified, i.e., x+=3 is equivalent to x=x+3, and x+=(−3) is equivalent to x=x+(−3).
−= Decrement by amount specified, i.e., x−=3 is equivalent to x=x−3, and x−=(−3) is equivalent to x=x−(−3).

Range Notation

The following notation is used to specify a range of values:
x=y . . . z x takes on integer values starting from y to z, inclusive, with x, y, and z being integer numbers and z being greater than y.

Mathematical Functions

The following mathematical functions are defined:

$$\text{Abs}(x) = \begin{cases} x; & x >= 0 \\ -x; & x < 0 \end{cases}$$

A sin(x) the trigonometric inverse sine function, operating on an argument x that is in the range of −1.0 to 1.0, inclusive, with an output value in the range of −π÷2 to π÷2, inclusive, in units of radians A tan(x) the trigonometric inverse tangent function, operating on an argument x, with an output value in the range of −π÷2 to π÷2, inclusive, in units of radians $$\text{Atan2}(y, x) = \begin{cases} \text{Atan}\left(\frac{y}{x}\right); & x > 0 \\ \text{Atan}\left(\frac{y}{x}\right) + \pi; & x < 0 \;\&\&\; y >= 0 \\ \text{Atan}\left(\frac{y}{x}\right) - \pi; & x < 0 \;\&\&\; y < 0 \\ +\frac{\pi}{2}; & x == 0 \;\&\&\; y >= 0 \\ -\frac{\pi}{2}; & \text{otherwise} \end{cases}$$

Ceil(x) the smallest integer greater than or equal to x.
lip1$_Y$(x)=Clip3(0, (1<<BitDepth$_Y$)−1, x)
Clip1$_C$(x)=Clip3(0, (1<<BitDepth$_C$)−1, x)

$$\text{Clip}(x, y, z) = \begin{cases} x; & z < x \\ y; & z > y \\ z; & \text{otherwise} \end{cases}$$

Cos(x) the trigonometric cosine function operating on an argument x in units of radians.
Floor(x) the largest integer less than or equal to x.

$$\text{GetCurrMsb}(a, b, c, d) = \begin{cases} c+d; & b-a >= d/2 \\ c-d; & a-b > d/2 \\ c; & \text{otherwise} \end{cases}$$

Ln(x) the natural logarithm of x (the base-e logarithm, where e is the natural logarithm base constant 2.718 281 828 . . . ).
Log 2(x) the base-2 logarithm of x.
Log 10(x) the base-10 logarithm of x.

$$\text{Min}(x, y) = \begin{cases} x; & x <= y \\ y; & x > y \end{cases}$$

$$\text{Max}(x, y) = \begin{cases} x; & x >= y \\ y; & x < y \end{cases}$$

Round(x) = Sign(x)*Floor(Abs(x) + 0.5)

$$\text{Sign}(x) = \begin{cases} 1; & x > 0 \\ 0; & x == 0 \\ -1; & x < 0 \end{cases}$$

Sin(x) the trigonometric sine function operating on an argument x in units of radians Sqrt(x)=$\sqrt{x}$
Swap(x,y)=(y,x)
Tan(x) the trigonometric tangent function operating on an argument x in units of radians Order of Operation Precedence When an order of precedence in an expression is not indicated explicitly by use of parentheses, the following rules apply:

Operations of a higher precedence are evaluated before any operation of a lower precedence.

Operations of the same precedence are evaluated sequentially from left to right.

The table below specifies the precedence of operations from highest to lowest; a higher position in the table indicates a higher precedence.

For those operators that are also used in the C programming language, the order of precedence used in this Specification is the same as used in the C programming language.

TABLE

Operation precedence from highest (at top of table) to lowest (at bottom of table)

operations (with operands x, y, and z)

"x++", "x− −"
"!x", "−x" (as a unary prefix operator)
$x^y$
"x * y", "x/y", "x ÷ y", "x/y", "x % y"

"x + y",

"x − y" (as a two-argument operator),

"$\sum_{i=x}^{y} f(i)$"

"x << y", "x >> y"
"x < y", "x <= y", "x > y", "x >= y"
"x = = y", "x != y"
"x & y"
"x | y"
"x && y"
"x | | y"
"x ? y : z"
"x..y"
"x = y", "x += y", "x −= y"

Text Description of Logical Operations

In the text, a statement of logical operations as would be described mathematically in the following form:

if(condition 0) statement 0 else if(condition 1) statement 1

. . .

else /* informative remark on remaining condition statement n may be described in the following manner:

. . . as follows / . . . the following applies:

If condition 0, statement 0

Otherwise, if condition 1, statement 1

. . .

Otherwise (informative remark on remaining condition), statement n

Each "If . . . Otherwise, if . . . Otherwise, . . . " statement in the text is introduced with " . . . as follows" or " . . . the following applies" immediately followed by "If . . . ". The last condition of the "If . . . Otherwise, if . . . Otherwise, . . . " is always an "Otherwise, . . . ". Interleaved "If . . . Otherwise, if . . . Otherwise, . . . " statements can be identified by matching " . . . as follows" or " . . . the following applies" with the ending "Otherwise . . . ".

In the text, a statement of logical operations as would be described mathematically in the following form:

if(condition 0a && condition 0b) statement 0 else if(condition 1a||condition 1b) statement 1

. . .

else statement n may be described in the following manner:

. . . as follows / . . . the following applies:

If all of the following conditions are true, statement 0:

condition 0a condition 0b

Otherwise, if one or more of the following conditions are true, statement 1:

condition 1a condition 1b

. . .

Otherwise, statement n

In the text, a statement of logical operations as would be described mathematically in the following form:

If(condition 0) statement 0 if(condition 1) statement 1 may be described in the following manner:

When condition 0, statement 0

When condition 1, statement 1

Although embodiments of the disclosure have been primarily described based on video coding, it should be noted that embodiments of the coding system 10, encoder 20 and decoder 30 (and correspondingly the system 10) and the other embodiments described herein may also be configured for still picture processing or coding, or in other words, the processing or coding of an individual picture independent of any preceding or consecutive picture as in video coding. In general only inter-prediction units 244 (encoders) and 344 (decoders) may not be available in case the picture processing coding is limited to a single picture 17. All other functionalities (also referred to as tools or technologies) of the video encoder 20 and video decoder 30 may equally be used for still picture processing, e.g. residual calculation 204/304, transform 206, quantization 208, inverse quantization 210/310, (inverse) transform 212/312, partitioning 262/362, intra-prediction 254/354, and/or loop filtering 220, 320, and entropy coding 270 and entropy decoding 304.

Embodiments, of the encoder 20 and the decoder 30, and functions described herein, with reference to the encoder 20 and the decoder 30, may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which corresponds to a tangible medium such as data storage media, or communication media including any medium that facilitates transfer of a computer program from one place to another, such as, according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limiting, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

What is claimed is:

1. A method of coding being implemented by an encoding device for encoding video data, comprising:
    reducing at least part of Least Significant Bits of Picture Order Counter (POC_LSB) in the video data by omitting one or more last bits of the POC_LSB depending on layer IDs associated with a picture, wherein a number of the one or more last bits omitted is dependent on a difference between a highest temporal layer ID (MaxTID) in a coded video sequence (CVS) and a temporal layer ID (TID) of the picture; and
    coding the reduced POC_LSB.

2. The method of claim 1, wherein the method comprises using a dyadic coding structure of pictures.

3. The method of claim 1, wherein the reducing the POC_LSB by omitting the one or more last bits, comprises:
    for TID>0, reducing the POC_LSB by omitting the one or more last bits, the one or more last bits obtained by the sum of 1 and the difference between the MaxTID and the TID wherein a number POC_by_TID_len is derived by POC_by_TID_len=(MaxTID−TID+1 (TID>0)).

4. The method of claim 1, wherein the method further comprises:
    coding a flag of dyadic temporal ID distribution denoted fixed picture rate for all sub-layers within a bit-stream or coded video sequence (CVS).

5. The method of claim 1, wherein the method further comprises:
    coding a flag of dyadic temporal ID distribution conditionally based on sequence parameters set (SPS) flag of presence dyadic temporal ID distribution flag in a bit-stream.

6. A method of coding being implemented by a decoding device for decoding video data, comprising:
    deriving at least part of Least Significant Bits of Picture Order Counter (POC_LSB) in the video data depending on layer IDs associated with a picture; and
    parsing a flag of dyadic temporal ID distribution denoted fixed picture rate for all sub-layers within a bit-stream or coded video sequence (CVS), or parsing a flag of dyadic temporal ID distribution conditionally based on sequence parameters set (SPS) flag of presence dyadic temporal ID distribution flag in a bit-stream.

7. The method of claim 6, wherein the method comprises using a dyadic coding structure of pictures.

8. The method of claim 6, wherein the method further comprises:
    deriving at least part of the POC_LSB based on at least one of a highest temporal layer ID (MaxTID) in a coded video sequence (CVS) or based on a temporal layer ID (TID) of a picture.

9. The method of claim 8, wherein deriving the at least part of the POC_LSB is based on the difference between the MaxTID and the TID.

10. The method of claim 6, wherein a last bit of the POC_LSB is derived to be 1 when a temporal layer ID (TID) of the picture corresponds to a highest temporal layer ID (MaxTID) in the coded video sequence (CVS), and
    the last bit of the POC_LSB is derived to be 0 when the TID does not correspond to the MaxTID in the CVS.

11. The method of claim 6, wherein omitted one or more last bits of the POC_LSB are derived, for when temporal layer ID (TID)>0, based on an arithmetic left shift by a number of binary digits corresponding to the difference between the highest temporal layer ID (MaxTID) and the TID.

12. The method of claim 11, wherein the omitted one or more last bits of the (POC_LSB are derived based on an expression (TID>0)<<(MaxTID−TID+(TID==0)).

13. The method of claim 11, wherein the omitted one or more last bits of the POC_LSB are derived based on an expression ((TID>0)<<(POC_by_TID_len−1)), wherein POC_by_TID_len=(MaxTID−TID+1 (TID>0)).

14. The method of claim 6, wherein parsing the flag of dyadic temporal ID distribution comprises:
    at least one of parsing dyadic_temporal_nesting_flag in general_hrd_parameters( ) syntax elements or in SPS, or
    setting the dyadic_temporal_nesting_flag equal to a predefined default value when not coded.

15. The method of claim 14, wherein the method further comprises:
    setting the value of a parameter vui_poc_proportional_to_timing_flag to 1 when dyadic_temporal_nesting_flag is equal to 1, or setting the value of the parameter vui_poc_proportional_to_timing_flag as a default value.

16. A decoder, comprising:
one or more processors; and
a computer-readable storage medium coupled to the processors and storing programming for execution by the processors, wherein the programming, when executed by the processors, configures the decoder to:
derive at least part of Least Significant Bits of Picture Order Counter (POC_LSB) in video data depending on layer IDs associated with a picture; and
parse a flag of dyadic temporal ID distribution denoted fixed picture rate for all sub-layers within a bit-stream or coded video sequence (CVS), or parse a flag of dyadic temporal ID distribution conditionally based on sequence parameters set (SPS) flag of presence dyadic temporal ID distribution flag in a bit-stream.

17. An encoder, comprising:
one or more processors; and
a computer-readable storage medium coupled to the processors and storing programming for execution by the processors, wherein the programming, when executed by the processors, configures the encoder to carry out the method according to claim 1.

* * * * *

UNITED STATES PATENT AND TRADEMARK OFFICE
CERTIFICATE OF CORRECTION

PATENT NO. : 12,063,369 B2
APPLICATION NO. : 17/701834
DATED : August 13, 2024
INVENTOR(S) : Maxim Borisovitch Sychev Page 1 of 1

It is certified that error appears in the above-identified patent and that said Letters Patent is hereby corrected as shown below:

On the Title Page

Item [30], Line 2, delete "2020" and insert -- 2019 --.

In the Claims

In Column 68, Line 50, in Claim 12, delete "(POC_LSB" and insert -- (POC_LSB) --.

Signed and Sealed this
Twenty-ninth Day of October, 2024

Katherine Kelly Vidal
*Director of the United States Patent and Trademark Office*